United States Patent [19]

Davis et al.

[11] Patent Number: 4,612,620
[45] Date of Patent: Sep. 16, 1986

[54] APPARATUS FOR COLLECTING SCHEDULED MAINTENANCE DATA

[75] Inventors: Dean T. Davis; Kenneth E. Hays, both of Columbus, Ohio

[73] Assignee: IRD Mechanalysis, Inc., Columbus, Ohio

[21] Appl. No.: 501,624

[22] Filed: Jun. 6, 1983

[51] Int. Cl.$^4$ .................... G01M 7/00; G01M 1/22
[52] U.S. Cl. ...................... 364/551; 73/476; 73/570; 73/579; 73/660; 364/508; 364/550
[58] Field of Search ............... 364/550, 551, 508, 506, 364/900; 73/462, 476, 570, 579, 602, 609, 618, 659, 662, 660

[56] References Cited

U.S. PATENT DOCUMENTS

| | | | |
|---|---|---|---|
| 3,783,680 | 1/1974 | Mason | 73/660 X |
| 4,090,247 | 5/1978 | Martin | 364/900 |
| 4,133,034 | 1/1979 | Etter | 364/483 X |
| 4,184,205 | 1/1980 | Morrow | 73/659 X |
| 4,302,977 | 12/1981 | Sisson et al. | 73/660 X |
| 4,320,662 | 3/1982 | Schaub et al. | 73/660 |
| 4,366,544 | 12/1982 | Shima et al. | 364/550 |
| 4,399,513 | 8/1983 | Sullivan et al. | 364/508 X |
| 4,408,285 | 10/1983 | Sisson et al. | 364/550 |

OTHER PUBLICATIONS

MD-210 Specification Bulletin, Japan, Sep. 1982.
BMC Automated Predictive Maintenance Bulletin D201PM, Jul. 1982.
Automated Vibration Monitor AVMI Bulletin, Technical Electronics Ltd., United Kingdom, Apr. 19, 1982.

Primary Examiner—Errol A. Krass
Assistant Examiner—Kevin J. Teska
Attorney, Agent, or Firm—Mueller and Smith

[57] ABSTRACT

Apparatus for collecting vibration data in accordance with a predetermined schedule. Operable in either a data input or program mode, the apparatus is coupled with a vibration transducer which is located at predetermined coded positions and the data collected are stored in memory. Additionally, visual inspection data may be entered in the memory in the form of a numerical code along with units designations and the like. In a data input mode of operation, the apparatus operates in conjunction with a scheduling facility which offloads the schedule during a transfer mode into the apparatus at the commencement of any given maintenance round. The schedule serves to prompt the operator as to the sequence of data collection locations, additionally providing units, alarm threshold levels and like information. At the end of the scheduled rounds, the data may be offloaded to the processing facility. The apparatus includes logic which permits the analysis of the type of transducer and the requested units signal treatment as well as the automatic carrying out of alarm level comparisons.

12 Claims, 50 Drawing Figures

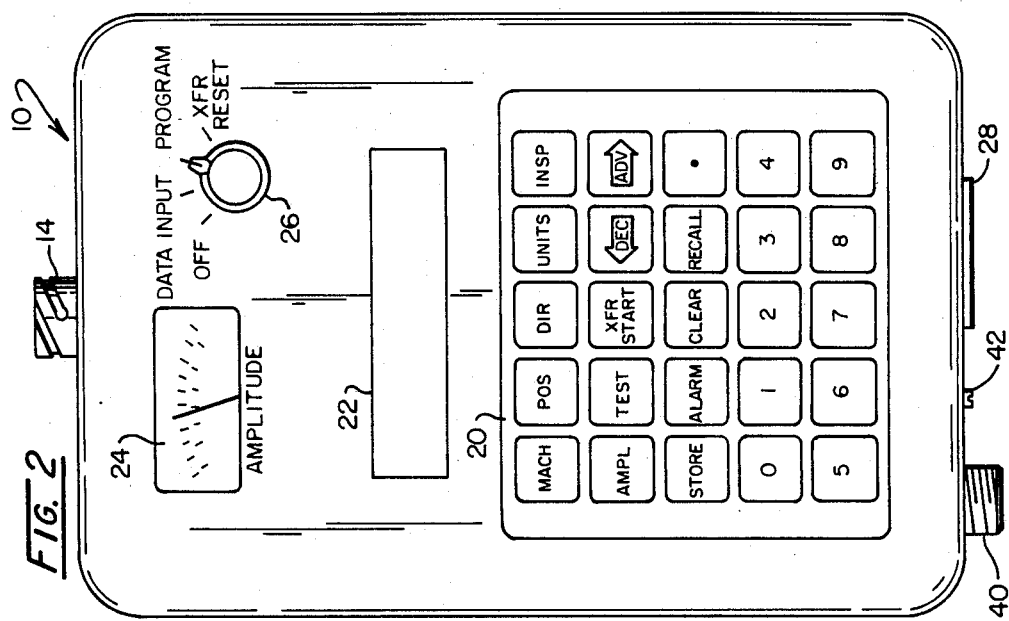
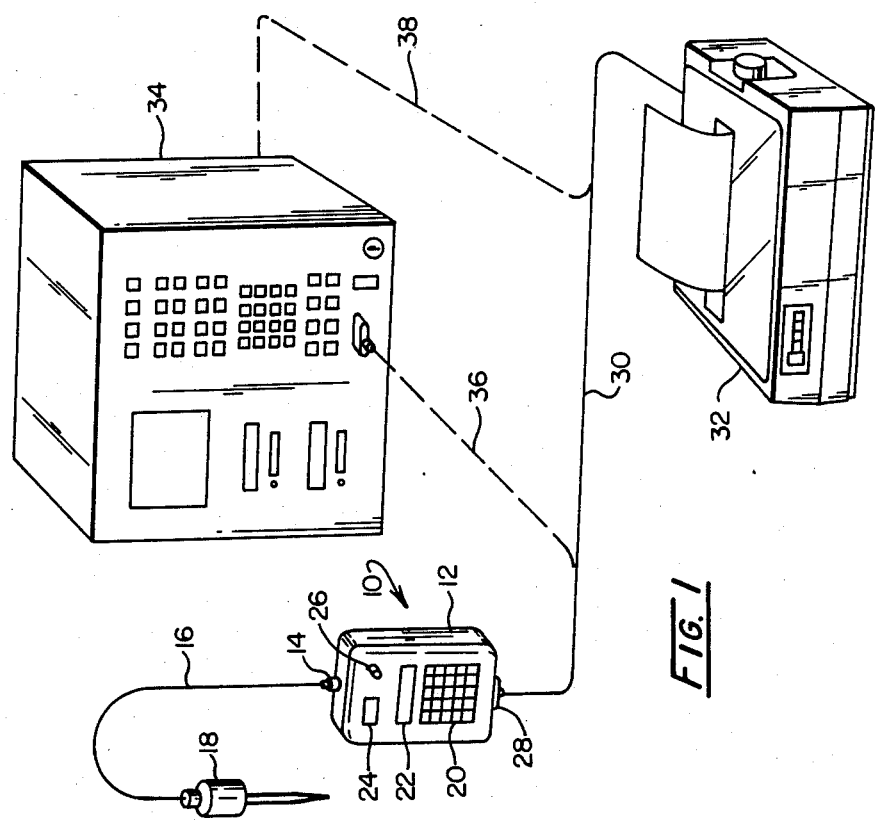
FIG. 2
FIG. 1

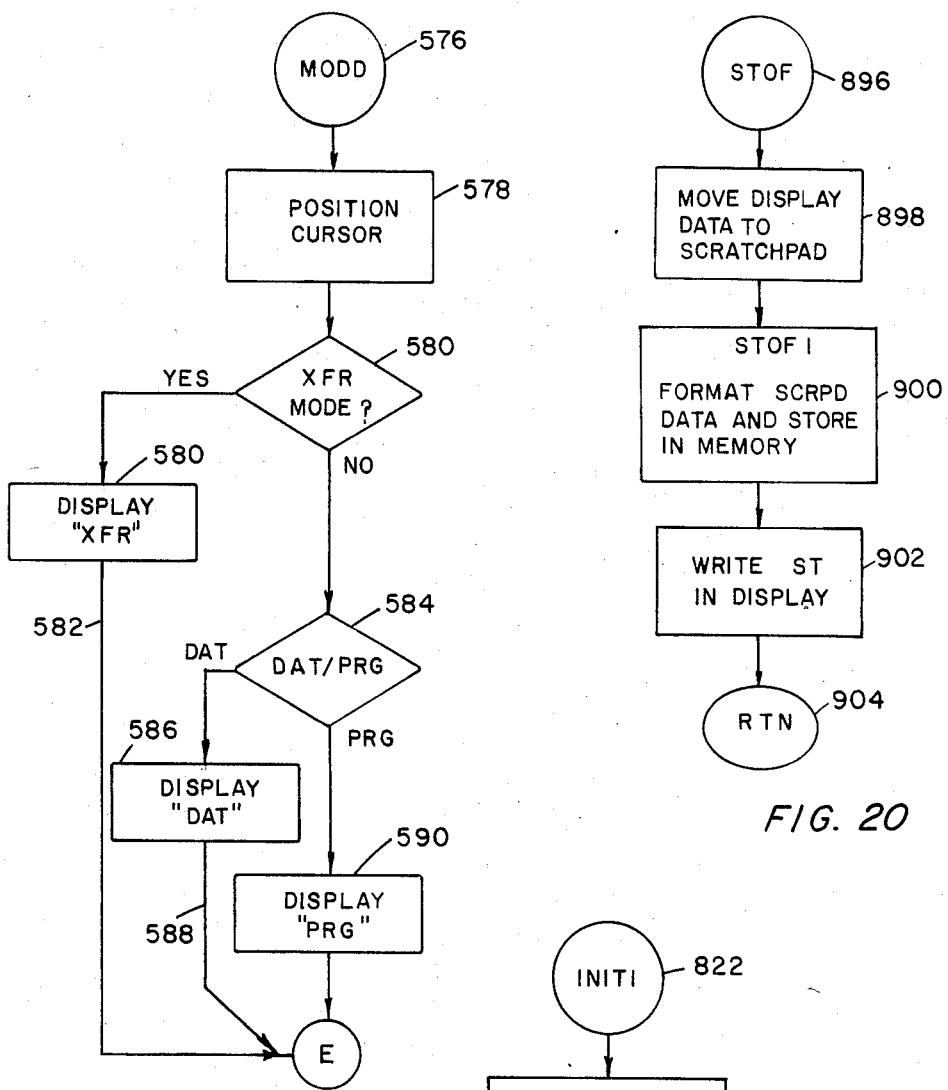
FIG. 14
FIG. 20
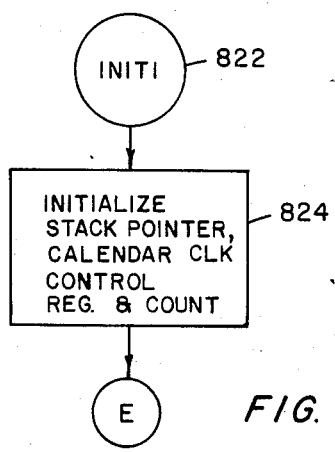
FIG. 17

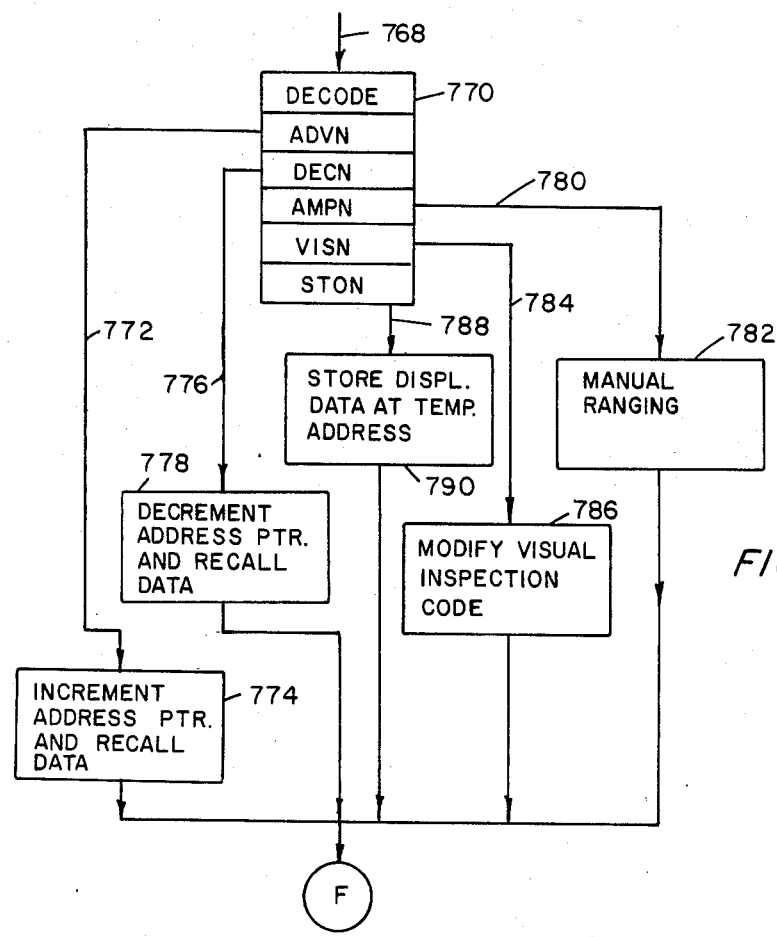
FIG. 16E
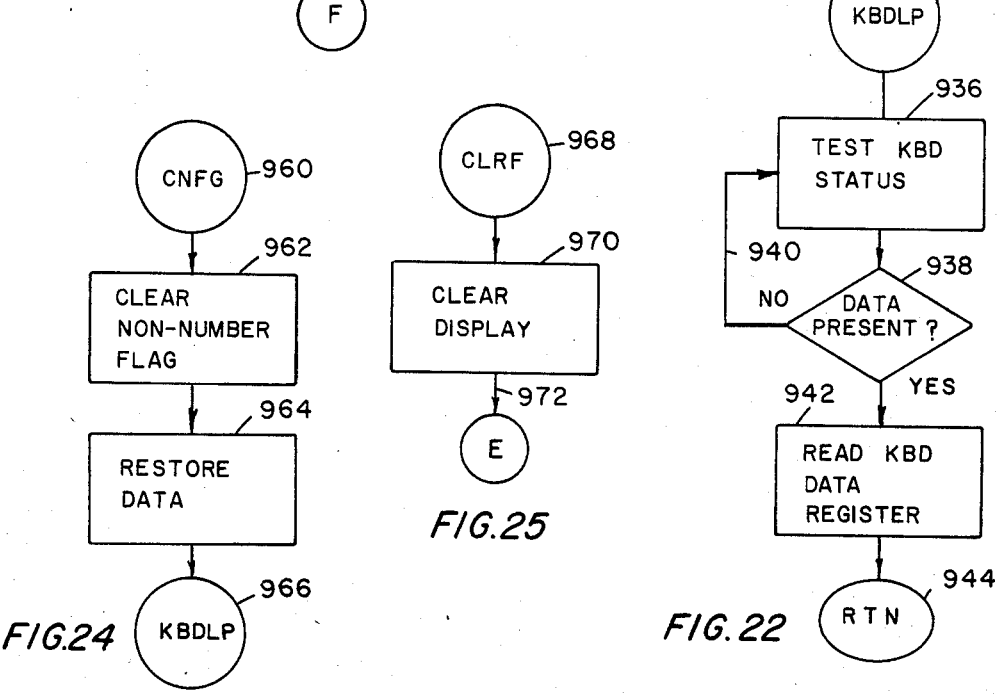
FIG. 24
FIG. 25
FIG. 22

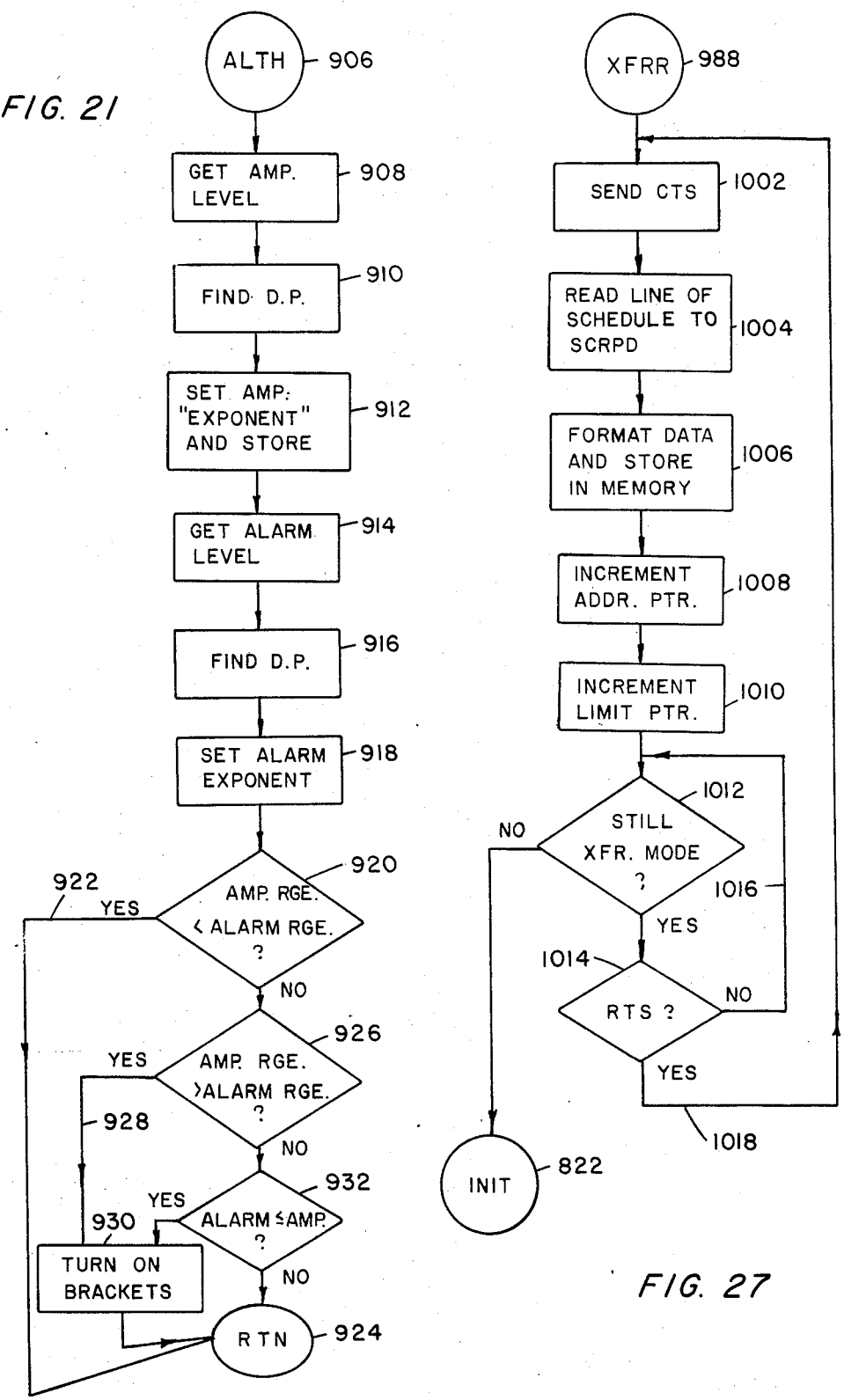

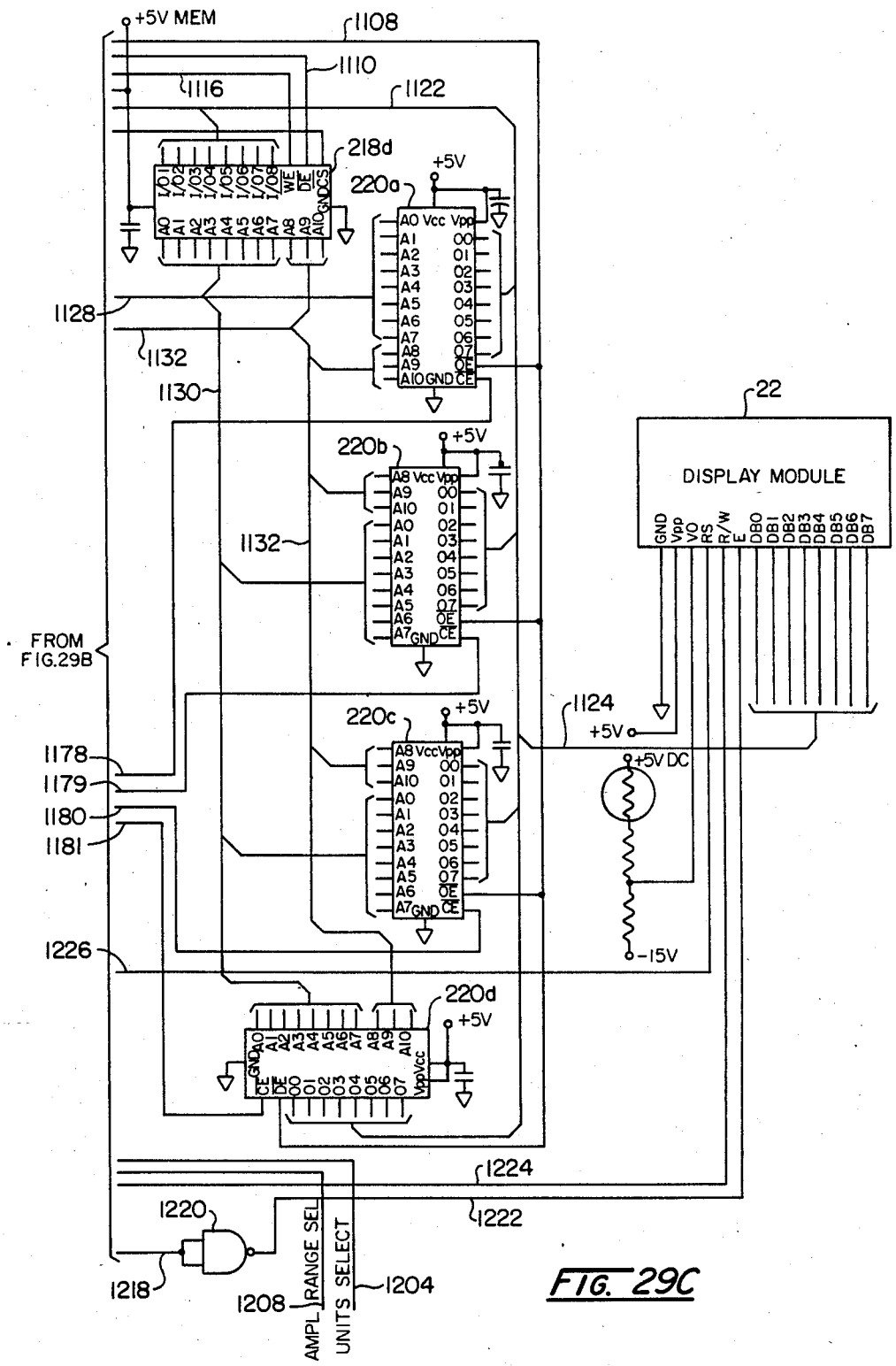

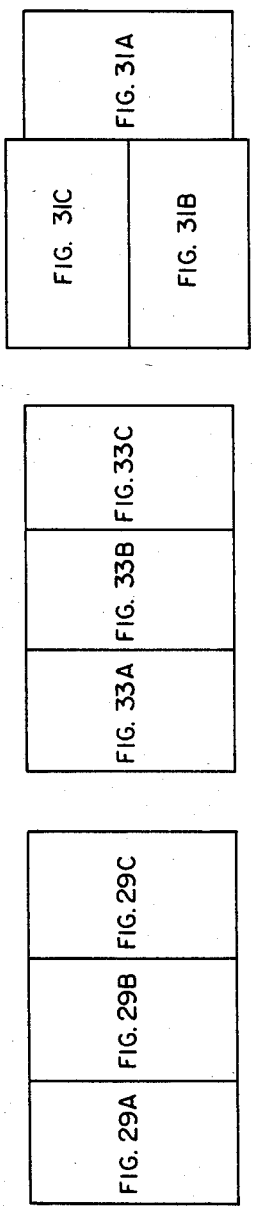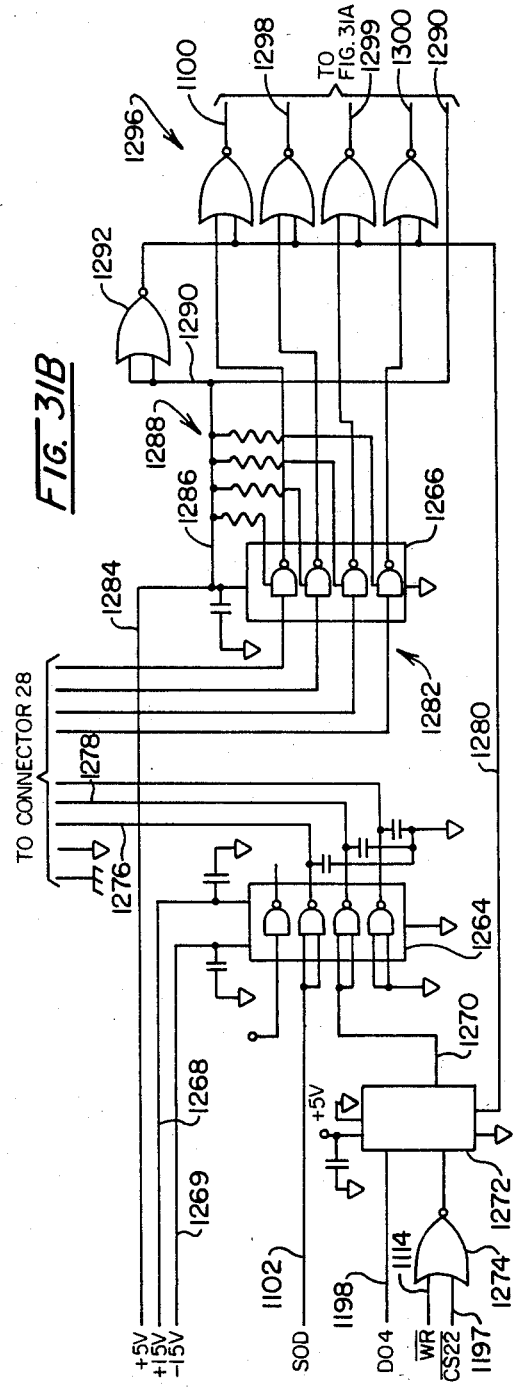

APPARATUS FOR COLLECTING SCHEDULED MAINTENANCE DATA

BACKGROUND

Techniques for the preventive or predictive maintenance of machinery based upon the detection and analysis of vibration have been employed by industry for a considerable period of time. Various approaches to vibration monitoring have been utilized, ranging from the use of rather simple, hand-held vibration meters to highly complex, permanently installed systems which essentially carry out continuous monitoring of machine mounted transducers along with computer based analysis of all monitored data. Such analysis may include, for example, trending techniques for break down prediction, the providing of threshold related comparisons to generate warnings and the like or for carrying out an automatic shut down of machinery to avoid catastrophic failure.

Complexity and costs associated with the latter comprehensive monitoring systems generally have limited their application to correspondingly elaborate industrial processes. Additionally, as such systems have become more sophisticated, the degree of human contribution to an analysis of machine condition, unfortunately, has become more contracted in scope. For the most part, industrial entities experiencing normal rates of growth or expansion commence preventative maintenance procedures utilizing available personnel to manually carry out the reading and recordating of vibrational data. Typically, preventive maintenance engineering personnel will record the amplitude of vibration for a given machine as well as the direction of measurement so carried out and a visual impression of overall machine condition, the latter representing the desirable human component of process maintenance. These data then are hand compiled, comparisons are made by maintenance pesonnel with predetermined vibration threshold levels and the like. Additionally, data collected over predetermined intervals of time may be assembled and examined in time scale fashion to determine trends by appropriate manual calculations. While the occasion for error in collecting, compiling and analyzing machine vibration data by hand is obvious, this basic approach remains cost effective for industrial facilities of lesser scope. Additionally, the manual technique of data collection and analysis does derive an advantageous on-site human inspection of machinery. As the particular industrial facility utilizing a vibration monitoring preventative maintenance program expands or acquires machinery requiring more extensive vibration monitoring, elaborate systems may be employed at correspondingly higher capital investment.

A vibration preventive maintenance system enjoying the advantages of on-site human perceptive input while minimizing the occurrence of human error is desirable if available at reasonable investment levels. In the latter regard, a determination of the value of an investment in vibration monitoring equipment must further consider the amenability such equipment to future upgrading toward more sophisticated capabilities such that the preventive maintenance program may grow in concert with projected growth patterns of the user facility.

SUMMARY

The present invention is addressed to a hand held instrument utilized as a component of a preventive maintenance system. Configured to be operatively coupled with a machine vibration monitoring transducer or pick-up, the instrument incorporates memory which provides for the on-site recording not only of vibration data derived from the transducer, but also of a range of meaningful maintenance information. For example, machine identification, transducer positioning, predetermined alarm threshold levels and a coded representation of the visual condition of the machine may be stored in memory by actuation of a keypad assembly. All of the data taken and entered at the machine site may be displayed by the instrument at the behest of the operator. Further, the operator may recall previously stored data while at the site of machine investigation.

Following the collection of a round of maintenance data, the instrument may be operatively connected with a conventional printer in a serial data transfer arrangement, and an automatically formatted column heading arrangement of collected and stored data including calendar information are caused to be printed out.

Thus, the instrument is suited for use as an entry level preventive maintenance device for industries of lesser scope. However, when combined with a computerized preventive maintenance scheduling and data processing facility, a system is evolved wherein the utility of the instrument advantageously may be expanded. For instance, a scheduled round of maintenance procedures may be automatically transmitted to the memory of the instrument by the processor facility. The operator then receives a sequence of prompting readouts at the display feature as it is carried to progressive machine investigation positions. These prompts follow the predetermined maintenance schedule of the processor facility and in the course of such activity, the operator further is provided on-site alarm indications and the like where appropriate. At the end of a scheduled round of maintenance procedures, the instrument is returned to a central office and operationally reconnected to the processing facility whereupon all data stored in its memory are transmitted to the processor for analysis and appropriate print-out.

Thus with the system of the instant invention, the human errors involved in the course of hand compiling written data are substantially eliminated while advantage associated with the operator's personal inspection is retained. Further, the scheduling of operator maintenance rounds is accurately controlled and the operator is afforded an important recall facility which, in effect, is a file call up of earlier derived data retained in memory.

Another object of the invention provides within a system for carrying out maintenance data collection at identifiable machines and test locations thereon wherein a select type vibration transducer is operationally contacted with a predetermined sequence of these locations for generating vibration signals in connection with a maintenance data program and wherein a data processing and collection scheduling facility is provided for treating machine data, an improved hand held data collection apparatus which is formed to include a housing as well as an input connector for operationally coupling this housing with a vibration transducer and which receives vibration signals therefrom. Contained within the housing is a signal treatment arrangement which receives the vibration signals and selectively treats them, when actuated, to derive predetermined units categorized amplitude signals. A converter is positioned within the housing which responds to these amplitude signals for generating digital signals corresponding therewith and a visually perceptible readout is mounted upon the housing for displaying readout characters corresponding with character signals submitted thereto. A key arrangement is mounted on the housing and is manually actuable for deriving selected function and numeric signals. The housing further supports a data transfer connector for selectively receiving and transferring data signals. Additionally, a mode selection arrangement is provided which is actuable to derive a data transfer and data input mode conditions. The apparatus further includes a memory for selectively retaining data submitted thereto and within the housing is a control circuit which is responsive in the presence of the data transfer mode condition when the data transfer connector is operationally coupled in data transfer relationship with a scheduling facility for selectively effecting the receipt therethrough of schedule data representing a predetermined sequence of identified machines, each test location thereon, the direction of mounting of the vibration transducer for each test location, the vibration parameter unit for each test location, and alarm threshold data for the test locations, for effecting the submittal this schedule data to the memory for retention. The control circuit further is responsive in the data input mode condition to the keyed arrangement actuation for deriving an advance function signal for accessing predetermined memory schedule data and submitting that data as character signals to the readout. Responsiveness of the control further is provided to the schedule data representing a vibration parameter unit derived by the advance function signal to actuate the signal treatment function in correspondence therewith. The control circuit further is responsive to the converter digital signals in the data input mode condition for deriving character signals corresponding therewith and effecting their submittal to the readout and further is responsive to the keyed arrangement actuation deriving a store function signal for effecting the retention by the memory of data corresponding with the character signals effecting the readout display.

Other objects of the invention will, in part, be obvious and will, in part, appear hereinafter. The invention, accordingly, comprises the apparatus and system possessing the construction, combination of elements and arrangement of parts which are exemplified in the following description. For a fuller understanding of the nature and objects of the invention, reference should be had to the following detailed description taken in connection with the accompanying drawings.

BRIEF DESCRIPTION OF THE DRAWINGS

FIG. 1 is a pictorial representation of apparatus according to the invention utilized in conjunction with peripheral devices such as printers and processors;

FIG. 2 is a front view of apparatus according to the invention;

FIG. 14 is a flow diagram of the mode display subroutine of the microinstructions of the control circuit of the invention;

FIGS. 16A-16E are a flow diagram of the recall function subroutine of the microinstructions of the control circuit of the invention;

FIG. 17 is a flow diagram of the initialization subroutine of the microinstructions of the control circuit of the invention;

FIG. 20 is a flow diagram of the store function subroutine of the microinstructions of the control circuit of the invention;

FIG. 21 is a flow diagram of the alarm threshold subroutine of the microinstructions of the control circuit of the invention;

FIG. 22 is a flow diagram of the keyboard loop subroutine of the microinstructions of the control circuit of the invention;

FIG. 24 is a flow diagram of the clear non-numeric flag subroutine of the microinstructions of the control circuit of the invention;

FIG. 25 is a flow diagram of the clear function subroutine of the control circuit of the invention;

FIG. 27 is a flow diagram of the transfer/receive subroutine of the microinstructions of the control circuit of the invention;

FIGS. 29A–29C combine to form a schematic diagram of the microprocessor related circuitry of the apparatus of the invention;

FIG. 30 is a diagram showing the proper orientation of FIGS. 29A–29C;

FIGS. 31A–31C combine to provide a schematic diagram of additional control circuitry of the apparatus of the invention;

FIG. 32 is a diagram showing the proper mutual orientations of FIGS. 31A–31C;

FIG. 34 is a diagram showing the proper mutual orientation for FIGS. 33A–33C.

DETAILED DESCRIPTION

Figure 3A:
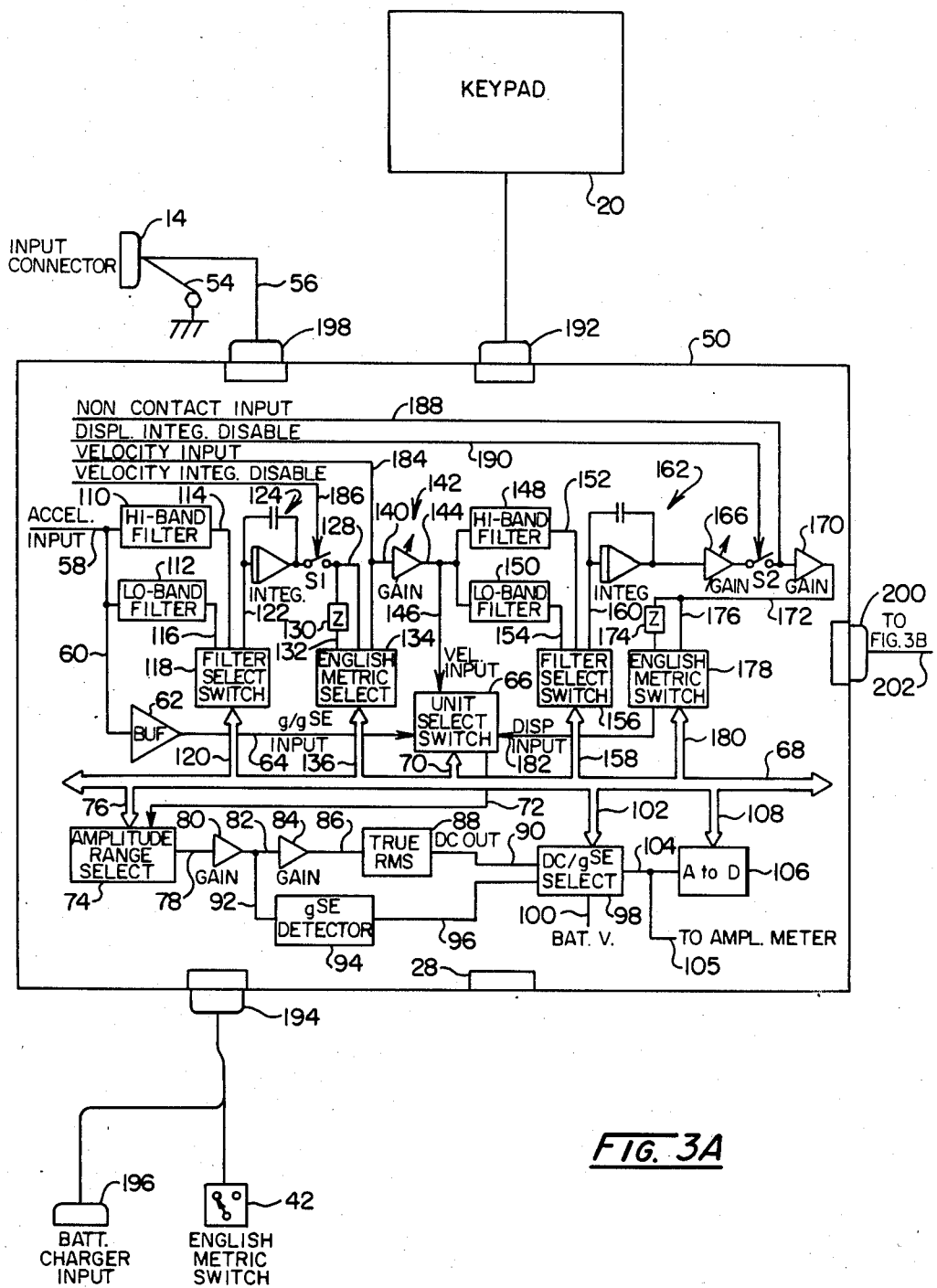
FIGS. 3A and 3B are a broad block schematic representation of the circuit of the invention as utilized by the apparatus of FIG. 2.

The instrument embodying the present invention is a conveniently sized, hand-held device which may be carried by a maintenance operator in the course of performing periodic maintenance rounds. As the operator proceeds to monitor vibration characteristics at each of a series or sequence of machines and positions thereon, the desirable opportunity for on-site visual and audible inspection is provided. However, the occasion for error on the part of the operator is considerably diminished through the use of microprocessor based memory recordation of all essential data including codes associated with the operator's visual inspection. At the completion of a round of scheduled measurements, the memory retained data, in appropriately coded format, may be transferred to devices and systems providing any of a variety of features ranging from direct print-out to relatively permanent memory retention and analysis. By astute selection of such supporting devices in consonance with the particular needs of a user facility, the instrument forms a principal component of a predictive or preventive maintenance system which may "grow" in capability and complexity as the user facility itself so develops.

Looking to FIG. 1, the instrument or apparatus according to the invention is represented generally at 10 as having a rectangularly shaped housing 12 which supports an input connector 14 serving, in turn, to provide for the inputting of vibration signals via cable 16 emanating from a vibration transducer 18. The measurements carried out through the use of transducers as at 18 may vary to suit the needs of the operator, for example, certain of these transducers measure acceleration characteristics of vibration, others velocity of vibration, while still others respond to the amplitude of displacement of vibration. The front panel of instrument 10 supports a keypad assembly 20, a readout 22 providing digital, alphanumerically designated information using a liquid crystal display (LCD), an analog or meter readout 24 and an operational mode selection switch 26. Shown extending 1 oppositely from input connector 14 is a data transfer connector or terminal 28. This terminal may be connected via a cable to any of a variety of system support devices. In its more elementary utilization, the readout terminal 28 may be connected, as represented by line 30, to a conventional printer 32. In this regard, the microprocessor component of instrument 10 is programmed to format the data collected and retained in memory such that the printer 32 provides a columnar printed arrangement identifying the calendar date, machine numbers, locations of monitored points upon such machines and the relative orientation of transducer 18, i.e. horizontal, vertically or in axial alignment. ASCII coding is utilized by instrument 10 for conventional printer compatibility.

More sophisticated readout arrangements may be provided with a monitoring system utilizing instrument 10. For example, a machine condition processor as represented generally at 34 may be coupled with instrument 10 through terminal 28 as represented by dashed line 36. Having computing capability in and of themselves, devices as at 34 provide for a bi-directional transmission of information and data with respect to instrument 10. For example, full maintenance scheduling may be provided by the processor 34 which is transmitted by cable 36 on a periodic basis to instrument 10 such that it may be operated in a data input mode wherein the operator is sequentially prompted as to a predetermined sequence of vibration measurements to be made. Additional data such as alarm threshold levels and the like also may be transmitted from the processor 34 to instrument 10 for providing on-site information to the operator. When data which have been collected are transferred into processor 34, analysis may be carried out thereon utilizing numerous techniques so as to develop trending information and the like. Processor 34 itself may provide permanent records utilizing printer 32 by data transmission thereto along a cable represented by dashed line 38.

Referring to FIG. 2, a frontal view of the operational or working face of the instrument 10 is provided in enhanced detail. The figure shows that the transfer terminal or connector 28 is of an elongate variety and, preferably, is present as a conventional RS232 type. The same side of the instrument 10 additionally contains a connector 40 which is utilized for periodic recharging of the batteries contained within the housing 12 as well as a small screwdriver actuated switch component 42 which provides an operator selection for either English or metric unit readout. The keypad assembly 20 is shown to be comprised of 25 individual keys, 14 of which are utilized in a functional mode. Mode switch 26 is shown having positions labeled "OFF", "DATA INPUT", "PROGRAM" and "XFR RESET", the latter indicating "transfer" or reset. The program mode selection of operation of the instrument 10 (which alternately may be referred to as a "manual" mode) is intended for the earlier described less elaborate system use wherein programming and the like is carried out only through the use of keyboard 20 by the operator and outputting typically is to a direct readout device by such as printer 32. On the other hand, when mode switch 26 is in the "DATA INPUT" position (which alternately may be referred to as an "automatic" mode), the instrument 10 is intended for utilization in conjuction with processing systems such as represented at 34 in FIG. 1. When switch 26 is positioned in the "XFR RESET" orientation, a transfer mode may be entered for effecting transfer unidirectionally to a printer as at 32 or in bidirectional communication with processors as at 34.

In the discourse to follow, a brief description is provided of the utilization of instrument 10 initially in a program operational mode then a data input operational mode of performance, a transfer mode performance being discussed in conjunction with each. The circuit arrangement of the instrument then is described in general fashion, following which the discussion turns to the program of the microprocessor control of instrument 10, following which a detailed description is provided of the circuit components of the device.

Because of the necessity for maintaining the viability of memory within instrument 10 on a continuing basis, processor circuitry is continuously energized even though switch 26 is an "OFF" position. Further, a check of battery energy levels is carried out in conjunction with each initialization routine of the control program. Such initialization takes place upon each movement of mode switch 26 from the "OFF" orientation to the remaining three orientations. A low battery indication stemming from an initialization procedure will be represented in readout 22 as a flashing cursor and asterisk.

At the commencement of any data collection activity, the operator of instrument 10 is instructed to carry out a test procedure by actuating the keyboard assembly 22 functional key identified as "TEST" following the movement of mode switch 26 into either the "PROGRAM" or "DATA INPUT" orientations. As a consequence of this manipulation, the readout 22 will indicate a test mode by publication of the term "TST", as well as indicate an adequate battery level by publication of the term "OK". In the event the battery levels are unacceptably low, then the display 22 will indicate that situation by publication of the term "LO". Because the instrument 10 retains calendar and real time data, the initial test procedure also provides an opportunity for the operator to adjust for any discrepancy in the time readout. Accordingly, the month, day and year are displayed along with indicated time and a cursor which initially is positioned at the lower left-hand corner of display 22. This readout is represented in Example 1 below.

EXAMPLE 1

| TST OK | |
|---|---|
| 10 M - 16 D - 82 | 16:25 |

By selectively depressing the decriment or advance function keys (DEC or ADV) of assembly 20, the operator manipulates the cursor beneath that component of time and date needing correction. By actuating a desired numeric key of assembly 20 following the positioning of the cursor beneath a calendar or time digit desired to be changed, the display will be altered and a resetting procedure is completed by subsequent actuation of the "STORE" function key. To aid in evaluating battery levels, the analog readout meter 24 provides for a battery level indication along a lower positioned scale during the test mode of operation. Exit from the test mode of operation is effected by the operator again actuating the function key labeled "TEST".

Assuming that the operator has elected a program mode of operation by appropriate adjustment of mode switch 26, the display 22 will initially read out the term "PRG" to show this mode. An initial actuation of the machine function key, labeled "MACH" and subsequent actuation of appropriate numerical keys provides for the identification of that machine number which is read out in display 22 at the lower left-hand corner as represented in Example 2 below. Similarly, actuation of the position function key, labeled "POS" followed by a numerical entry from the numerical keys provides for an appropriate display of the elected number to the right of the machine identification in readout 22. Actuation of the transducer directional orientation function key labeled "DIR" permits the insertion in readout 22 of an appropriate letter V (vertical), H (horizontal) or A (axial alignment) depending upon the number of actuations of the direction keys, respectively, from one to three. Next, the operator provides for units selection by actuation of the "UNITS" key, successive actuations from one to four times in sequence presenting a readout at display 22, respectively, for displacement, velocity, acceleration, or a high frequency specialized readout for detecting bearing failure and the like identified by the trademark "Spike Energy". Depending upon the presence of English or metric units as elected at switch 42, appropriate units designations are displayed, for example, "MILS" and "IN/S" describe, respectively, displacement and velocity in English units. Similarly, "g" designates acceleration, while "SE" denotes "Spike Energy" for either English or metric designations. The operator also may manually insert a visual inspection code by actuation of the function key of assembly 20 labeled "INSP". Insertion of inspection data is provided in accordance with a prearranged visual inspection menu having a numerical coding, for example as follows:

0—No Inspection
1—Machine Normal
2—Down for Maintenance
3—Fluctuating Vibration
4—Hot Bearing
5—Bad Belts
6—Abnormal Noise
7—Leaks
8—Loose/Broken Parts
9—Machine Overheating
.—Other Conditions (Explain)

The display of the inspection code at readout 22 is provided at the lower right-hand corner thereof.

Vibration readings commence with the proper positioning of transducer 18 at a machine monitoring location. The resultant data in appropriate units are displayed at readout 22 while simultaneously being presented in analog fashion at meter 24. When the displayed vibration data are appropriately stable, the entire assemblage of data as displayed at readout 22 may be submitted to memory for storage by actuation of the function key of assembly 20 labeled "STORE". As this actuation of the STORE key takes place, the letters "ST" appear in readout 22, the readings are stabilized and submitted to memory. An exemplary display having been so stored is shown hereinbelow at Example 2. In that example, the number "437" indicates machine number, the number "5" indicates position, the letter "A" indicates direction of transducer, the units are shown as inches per second (IN/S) and the inspection code is shown to be number "4".

EXAMPLE 2

| PRG 6.02 | ST | |
|---|---|---|
| 437 5 A | IN/S | 4 |

Where pick-ups or transducers 18 are selected of a variety measuring acceleration or velocity and a units read-out is desired in displacement, then the control of instrument 10 automatically carries out one or more steps of integration. Because in the procedures for electronically carrying out integration noise will be generated generally as a function of frequency, an improved output is achieved through the use of more than one pre-integration filter stages. Accordingly, in order to provide a low frequency integration without sacrifice to proper performance at higher frequencies, the control arrangement of the instrument provides for the election of a high band or low band filtering in accordance with frequencies recognized. This automatic selection is displayed at read-out 22 as an appropriate letter "H" or "L" adjacent the displacement units identification.

Additionally, the control circuitry of instrument 10 automatically selects one of four amplitude range elections to facilitate readout accuracy. However, from time to time, the operator will desire to manually override such range selection, for example, when a reading occurs essentially at the juncture between two ranges. For such situations, the operator may wish to himself elect an amplitude readout range. To carry out such manual range selection, the function key of assembly 20 labeled "AMPL" is utilized. By actuating the key a predetermined number of times, a range of signal attenuations or sensitizing may be elected commencing in sequence from a high level toward a low level. The initial actuation of the "AMPL" labeled key provides for the least sensitive range to value 100 in English units or 3,000 in metric units, while a second actuation of the key elects a range to value 10 in English units or 300 in metric units. The third actuation of the key provides for a range to value 1.0 in English units or 30 metric units and a fourth actuation of the key provides the most sensitive amplitude range of value to 0.1 in English units or 3 in metric units. A fifth actuation of the key returns the instrument to automatic range selection.

When operating within the program mode of operation, once a measurement or data collection at a given machine number and position number has been made through the storage step, the operator will depress the "CLEAR" function key and the advance key labeled "ADV". This will cause the program to advance to the next position in memory for receiving data. On the other hand, should the operator wish to return to an earlier reading or should the operator have manually preprogrammed instrument 10 for a scheduled collection of data of a series of machines and positions thereon, then the next desired machine number and position number may be accessed using the numerical keys in conjunction with the corresponding function keys identified as "MACH" and "POS" along with a subsequent actuation of the key of assembly 20 labeled "RECALL". With the latter actuation, the term "RCL" is displayed at readout 22 and the processor carries out a matching of the entered machine and position number with corresponding numbers in memory. If no such machine and position number occurs in the memory, then the term "ERR" for error will appear in readout 22. Data which may be recalled for display at readout 22 includes the amplitude readings or the like, vibration data, machine, position and direction numbers, inspection code numbers and alarm levels. Concerning the latter vibration alarm levels, entry of such data in a program mode is made from keyboard assembly 20 in conjunction with machine and position number. Such entry is carried out by actuating the function key labeled "ALARM" followed by the entry of appropriate numerical data by actuation of the numerical keys. Four spaces are allocated at LCD readout 22, for the display of entered and recovered alarm levels which are stored upon the above-noted actuation of the function key labeled "STORE". The alarm level display occurs within readout 22 at the upper right-hand corner thereof. In the event that a vibration reading exceeds a memory retained alarm level value, a display of the latter will occur within brackets.

At the end of a given round of data collection, the operator, in the simplest system embodiment, couples data transfer terminal 28 with a printer as at 32 and the data will automatically be printed in appropriately formatted form showing machine numbers and all collected data as well as any alarm levels which may be in memory in columnar fashion. Transfer of this material to a printer as at 32 is carried out upon appropriate interconnection therewith utilizing cable 30 and actuation of both the mode switch 26 to an "XFR" orientation and the transfer start, "XFR START" labeled key of assembly 20. Generally, a memory capacity permitting a schedule of 400 measurement points is desired in typical utilization of instrument 10.

In the event that instrument 10 is used as a component of a more sophisticated system in a data input mode, then the predictive maintenance schedule or plan for any given day or appropriate interval of time is loaded into instrument 10 from a logic device as described at 34 in conjunction with FIG. 1. Loading of such data takes place via a cable as at 36 which is coupled to data transfer terminal 28. In this data input mode, the operator initially carries out a test procedure as described above in conjunction with program mode operation. Following this test procedure and the storage of any alterations in calendar or date information, the display 22 is cleared by a second actuation of the "TEST" key of assembly 20 and the function switch 26 will be positioned at the "DATA INPUT" location. In the automatic mode, the term "DAT" initially is displayed alone in readout 22 until the advance, "ADV", key of assembly 20 is actuated. Upon such actuation, the readout 22 will provide the operator with the first machine number, transducer location and position and unit information for collecing vibration data at a first station of the schedule. A typical readout at this point in the procedure is shown in Example 3. Thus, the example shows that the operator is instructed to read a vibration displacement in mils at machine number 1120 and at position number 10 with the transducer in a horizontal orientation. Note that the mils indication is published in conjunction with an identification (L) of the previously automatically selected low frequency band filter.

EXAMPLE 3

| DAT | | | |
| --- | --- | --- | --- |
| 1120 | 10 | H | MILS,L |

The operator then attaches the transducer at the appropriate location on the machine and instrument 10 treats the vibration signals and displays the resultant vibration data both at the analog meter 24 and at the digital readout 22. An example of such a readout is represented at Example 4.

EXAMPLE 4

| DAT | 1.23 | | |
| --- | --- | --- | --- |
| 1120 | 10 | H | MILS,L |

Should the displacement reading be stable and otherwise desirable, then, as before, the operator may actuate the "STORE" labeled key of assembly 20 and the term "ST" appears at readout 22 as represented in Example 5.

EXAMPLE 5

| DAT  | 1.23 | ST |        |
|------|------|----|--------|
| 1120 | 10   | H  | MILS,L |

If the operator wishes to check the alarm level for the measurement thus completed, the "ALARM" key of assembly 20 is actuated and the alarm level for the given machine number location and transducer position as well as units is added to the readout 22 in the generally upper right-hand region thereof as represented as the value 1.42 in Example 6 below.

EXAMPLE 6

| DAT  | 1.23 | ST | 1.42   |
|------|------|----|--------|
| 1120 | 10   | H  | MILS,L |

The obtaining of alarm level data from memory must follow the display of the machine number, location, transducer position and units as obtained as indicated above. Should the vibration measurement which has been taken exceed the alarm level in memory, such alarm level will be displayed at readout 22 automatically in conjunction with brackets as shown having an exemplary value of 1.12 in Example 7 below.

EXAMPLE 7

| DAT  | 1.23 | ST | [1.12] |
|------|------|----|--------|
| 1120 | 10   | H  | MILS,L |

The above-described visual inspection code data are inserted by the operator by actuation of the key labeled "INSP" followed by the actuation of appropriate numerical code key as described above. Such information is submitted to memory in conjunction with the noted "STORE" key actuation. Where the operator does not select one of the visual inspection code digits, then a 0 code automatically is stored in memory which indicates a no inspection condition for the machine position reading taken. The readout 22, however, remains blank for such an arrangement. A readout for entry of an inspection code "4" is represented in Example 8.

EXAMPLE 8

| DAT  | 1.23 | ST | 1.42   |   |
|------|------|----|--------|---|
| 1120 | 10   | H  | MILS,L | 4 |

Upon the collection and storage of all desired data at a given machine location, the operator then actuates the key labeled "CLEAR" and subsequently, the advance key labeled "ADV". The instrument 10 then presents the numbers associated with the next data collection reading to be made. This sequence for a given round continues until all machine positions have been accommodated for, whereupon the term "END" is displayed at readout 22. Where storage of data at a given position is not desired, the operator does not actuate the "STORE" labeled key but merely actuates the advance key.

As in the case of program mode performance, the operator is given the opportunity to adjust sensitivity of displacement readout through appropriate numbers of actuations of the key of assembly 20 labeled "AMPL" and, further, may execute a recall function by actuation of the appropriately labeled key of assembly 20. The latter function in data input mode initially brings forward the previous block of data stored in memory. Additionally, the operator has the opportunity of actuating the advance, "ADV", or decrement, "DEC" keys of assembly 20 to access and display data blocks sequentially forwardly in the schedule or rearwardly. As before, for all recall functions, the processor control of instrument 10 carries out an analysis of the appropriateness of a transducer type. Such transducers are typically referred to as "pick-ups". Thus, readout 22 displays the term "PKU" where such pick-ups are inappropriate or "not legal". The processor further investigates the position of the English/metric switch 42 with respect to the units displayed. In the event that an inconsistency is present, then readout 22 displays the term "E/M?". Threshold or alarm limits also are reviewed for each recalled block of data, brackets being displayed where alarm thresholds are exceeded. As before, the exit from a recall function procedure occurs with the second actuation of the "RECALL" labeled key of assembly 20. When this occurs, the display at readout 22 is cleared and the particular mode, readout "PRG" or "DAT" as determined by mode switch 22 is displayed.

At the end of a data collection round, the operator returns to the location of a processor as at 34 and connects the instrument 10 thereto as described in FIG. 1 in conjunction with cable 36. The instrument 10 is made ready for transfer of collected data to processor 34 by moving mode selection switch to the XFR position and actuating the key labeled "XFR START". Of course, appropriate actuation of switches and the like is necessary with respect to the processor 34. With this arrangement, the data is unloaded to the processor 34, the unloading procedure generally requiring about 10 minutes of time. Following unloading, the instrument 10 then may be loaded with a next schedule for the next round of predictive maintenance readings.

Figure 3B:
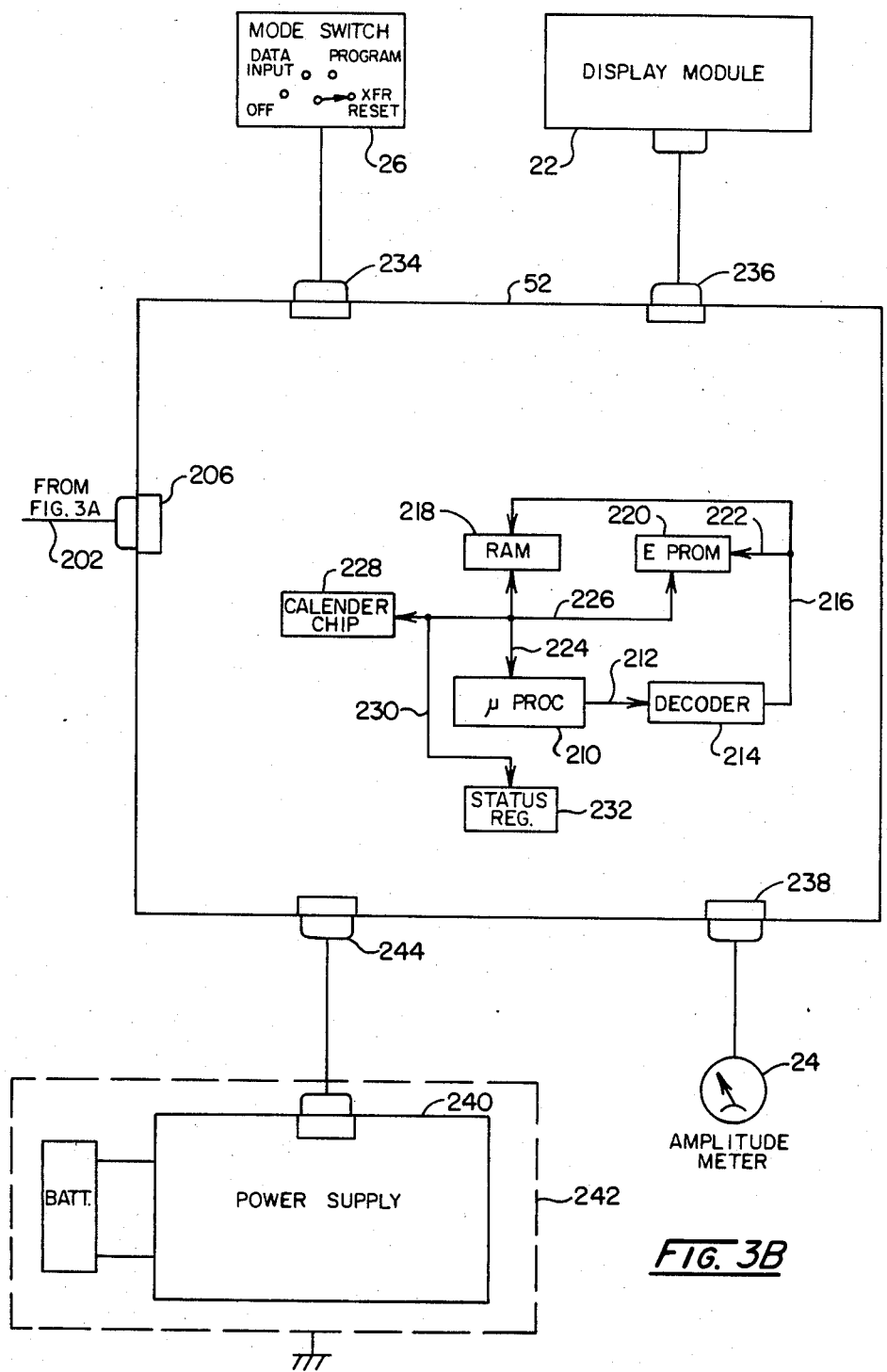

Referring to FIGS. 3A and 3B, a broad diagrammatic representation of the arrangement of circuitry and control components of the instrument 10 is revealed. These components generally are mounted upon a minimum number of circuit supporting boards which are arranged within the housing 12 in a manner promoting portability and compactness. Two principal circuit board components are utilized for carrying circuitry, a signal conditioner board represented by border 50 and a microprocessor and interconnection board represented by border 52.

Looking initially to the signal conditioning functions represented in conjunction with border 50 and shown at FIG. 3A, the earlier described input connector is schematically represented again with the identification numeral 14. This connector 14 is represented as being coupled with chassis ground through line 54 and into the circuit supported within border 50 as represented at line 56. The input connector 14 may be coupled with three types of transducers or pick-ups 18, for example, an accelerometer type, a velocity type, or a displacement or non-contact type pick-up. The latter transducers, for example, are marketed under the respective model designations 970, 544 and 403 by IRD Mechanalysis, Inc., Columbus, Ohio. Assuming that an accelerometer type transducer has been elected by the operator and acceleration or "Spike Energy" units are desired as an output, the resultant accelerometer type transducer input signals are represented as entering the signal conditioning function at line 58. The system will recognize the presence of the accelerometer input and direct these signals through the path represented by line 60 to a buffer stage 62, thence along line 64 to one input of a unit selection switch function represented by block 66, operating under the control of the microprocessor of instrument 10 as asserted from along a bus 68 and auxiliary bus path 70. Under the instructions from the microprocessor, the switching function 66 directs the received signal along a path represented by line 72 to an amplitude range select network 74. Network 74, operating under the control of the microprocessor from along bus 68 and auxiliary path 76, serves to attenuate the signal received from line 72 to provide a range or sensitivity selection to achieve a most efficient readout. The attentuated output of network 74 is directed along line 78 through a gain amplification stage 80. From stage 80, the treated signal is directed along line 82 to a next serially disposed gain application stage 84, and thence along line 86 to a true RMS derivation network represented at block 88. The RMS network provides a d.c. level output at line 90 corresponding with a power relationship for the monitored accelerated signal.

The signal at line 82 alternately is directed along line 92 to a "Spike Energy" detector network represented at block 94. Signals representing "Spike Energy" values are generally in a higher frequency range of from about 5 kHz to 50 kHz and serve to monitor defects in bearings and the like. The output of network 94 is provided as a d.c. output voltage at line 96.

Both line 90 extending from the true RMS network 88 and line 96 extending from the "Spike Energy" detector network 94 are directed to the input of a selection network represented by block 98. Selection network 98 also receives an input corresponding with the voltage level of the battery power supply of instrument 10 as represented at line 100. Under control of the microprocessor of instrument 10 as represented by auxiliary path 102, network 98 selects the appropriate signal from lines 90, 96 or 100 depending upon the mode control at hand and passes the signal to an output represented at line 104. This output serves to drive the analog meter 24 as represented at line 105 either with respect to the amplitude of the signal being monitored or with respect to battery voltage level and also is introduced to an analog-to-digital converter represented at block 106 operating under the control of the microprocessor function of instrument 10 and coupled therewith as represented by auxiliary path 108 extending from bus 68. Network 106 derives an 8-bit digital representation of the signal at line 104 which is presented in appropriately coordinated fashion along principal bus 68 for further treatment including visual display outputs at readout 22.

Again assuming that the operator has elected to utilize an accelerometer type transducer but, additionally, instrument 10 is either programmed or an election of vibration parameter units is made to provide a readout in velocity, then the signal at line 58 is directed to the inputs of high band and low band filters represented, respectively, at blocks 110 and 112. As indicated earlier herein, these filters serve the function of providing a more efficient and noise avoiding arrangement for a subsequent integration stage. Depending upon the frequency of the signal input at line 58, one output from filters 110 and 112 as represented, respectively, at lines 114 and 116 is elected by the microprocessor control by asserting a control over a filter selection switch function represented by block 118. The control over filter selection switching from the microprocessor function of instrument 10 is represented by auxiliary path 120 extending from principal bus 68. When selecting velocity units for the accelerometer type pick-up, the low band filter 112 is automatically elected. The appropriately filtered signal as elected at switching function 118 then is directed along line 122 to the input of a velocity integration stage represented generally at 124. The output of integration stage 124, at line 126, corresponds with velocity and is directed through a closed switch function S1 to line 128 where it is presented in parallel directly and through a selected impedance represented at block 130 within line 132 to an English/metric selection function represented at block 134. Function 134 operates in conjunction with the microprocessor originated control of instrument 10 as represented by auxiliary bus path 136 extending from principal bus 168 and serves to develop an output signal at line 138 which is adjusted for the particular English or metric output selected in conjunction with the setting of switch 42 (FIG. 2). Inasmuch as a simple ratio exists between this selection, the impedance represented at block 130 provides for appropriate derivation of the signal at line 138. Line 138 is directed to line 140 which, in turn, is directed to the input of an adjustable gain amplification stage 142. The output of stage 142 at line 144 is coupled with line 146 which, in turn, is directed to an input of the unit selection switch function represented at block 66 and described earlier herein. This selection, then directs the resultant signal along line 72 to the amplitude range selection function 74, thence along the earlier-described path including true RMS function 88 to lines 104, 106 leading to amplitude meter function 26 and to conversion function 106 providing for a digital conversion of the resultant signal and transference to further control stages.

Again assuming that an accelerometer type transducer derived signal again is presented at input line 58 and a displacement units readout is desired either by preprogramming or by election of the operator, filter selection switching function 118 elects an appropriate filtering of the input signal at filter functions 110 or 112 and, as before, passes the resultant filtered signal to the input of integration stage 124. From integration stage 124, the integrated signal passes through switch function S1 and is directed without alteration through the English/metric selection function 134 to again be presented to gain amplification stage 142. The signal then is presented along output line 144 to the input of a second pre-integration filtering function including a high band filtering network represented at block 148 and a low band filter function 150. Filtering functions 148 and 150 perform for the same purpose as corresponding pre-integration stage filtering functions 110 and 112 and provide outputs, respectively, at lines 152 and 154 which are directed to a filter selection switching function represented at block 156. Controlled from the microprocessor function of instrument 10 as represented by auxiliary bus path 158 extending from bus 68, the select function 150 serves to provide an appropriately filtered output at line 160 which is directed to the input of a displacement integration stage represented at 162.

The resultant output thereof at line 164 is a signal corresponding with displacement and is directed to the input of a selectable gain amplification function 166, the output thereof at line 168 of which is directed through a closed switch function S2 to the input of a buffer and gain stage 170. The output of stage 170 at line 172, as before, leads both directly along line 176 and through a select impedance represented at block 174 to the inputs of an English/metric selection function represented at block 178. Operating under the control of the microprocessor function of instrument 10 as represented by auxiliary path 180 leading from principal bus 68, the signal introduced to function 178 is adjusted with respect to the election made at switch 42 and the resultant signal is directed along line 182 to the earlier described unit selection switching function 66. As before, the signal then is directed along line 72 to the amplitude range selection or attentuation function represented at block 72, thence through appropriate gain stages to be converted at true RMS function 88 to a d.c. output at line 90. Ultimatley, this signal is directed both to amplitude meter 24 from along line 105 and to the earlier-described analog-to-digital conversion function 106 for deriving digital characterized signals corresponding therewith.

Where the operator elects to utilize a transducer as at 18 which derives a velocity categorized vibration signal, such signal is introduced to the signal conditioning function from along line 184. Simultaneously, the transducer develops a velocity integrator stage disable signal along line 186. The latter signal serves, in effect, to open the solid-state switch function represented at S1. Where a velocity units output is desired, the signal asserted along line 184 is introduced, as before, through gain amplification stage 142, and thence is directed through lines 144 and 146 to the units selection switch function represented at block 66. As before, the signal then is transferred from along line 72 to the amplitude range select function represented at block 74. The signal then is treated in the same manner as described above with respect to the utilization of accelerometer type transducer inputs.

Where a displacement units reading is desired with the velocity categorized transducer 18, then the treated signal at line 144 from amplification stage 142, as before is directed to the pre-integration filter stages 148 and 150, the appropriate one of which is elected by filter select switch function 150 and the filtered signal is introduced into displacement integration stage 162 from along line 160.

Where the transducer or pick-up 18 (FIG. 1) serves to provide a readout corresponding with displacement, the resultant output signals are presented along line 188. For the exemplary transducer identified above, the type of pick-up is conventionally referred to as a "non-contact" variety as labeled in the drawing. Simultaneously with the provision of signals along line 188, a signal condition is provided along line 190 representing the type of pick-up at hand and serves to disable the displacement integration stage 162 by opening the solid-state switch represented at S2. Accordingly, the displacement categorized signal at line 188 is introduced to the input of buffer stage 170, thence along line 172 to the English/metric switch function represented at block 178 and, thence along line 182 to the unit select switch function represented at block 66. The output of block 66 as represented at line 72 leads to the amplitude range select function represented at block 74 and the resultant selectively attenuated signal is treated as described in conjunction with the earlier discussed pick-up signals to be presented ultimately at the analog-to-digital conversion function 106, thence through bus 108 to the processing control function.

Also shown associated with the components within boundary 50 is the keypad 20 coupled thereto through a connector 192, the data transfer connector terminal 28, a connector 194 receiving inputs from English/metric switch 42 as well as from a battery charger input 196. Similarly, line 56 from input connector 14 is shown coupled with a connector 198. While these connectors 192, 194, 196 and input 28 are represented as associated physically with a circuit board as represented by boundary 50, the inputs or outputs associated therewith are transferred to other functions within the system. In similar fashion, the association of the components thus far described with further control features mounted upon other circuit boards is represented as occurring though a connector 200 and line 202 which extends to a corresponding connector 206 associated with a circuit mounting structure corresponding with boundary 52.

Referring to FIG. 3B, a circuit mounting structure is depicted schematically by the border 52 as carrying a microprocessor represented by block 210. The microprocessor selected for the function at block 10, for example, may be provided as a conventionally marketed type 8085 generally having a CMOS structuring. Microprocessor function 210 is associated in conventional fashion as represented by line 212 with a decoder function represented at block 214. The latter function operates to appropriately direct or elect support functions as represented by its association through line 216 with random access memory (RAM) function 218 and a read only memory function represented by block 220 and associated from line 216 through line 222. Similarly, the microprocessor is shown associated with the memory functions 218 and 220 from along lines 224 and 226. Line 226 is shown directed to a calendar function represented at block 228 which serves to provide time, month, day and year data. Line 226 also is shown coupled through line 230 to a status register function represented at block 232. The latter function serves, for example, to monitor external devices such as mode switch 26. The external connections to the circuit mounting arrangement represented at border 52 include an input from the mode switch function represented at block 26 in FIG. 3B as well as connector 234 and further association with the module representing readout or display 22 as represented at connector 236. Additionally, the amplitude meter coupling is shown provided through a connector 238, while the input from a battery supply 240 is represented as extending from within a chassis shield represented by dashed boundary 242 to a connector 244.

Figure 4A:
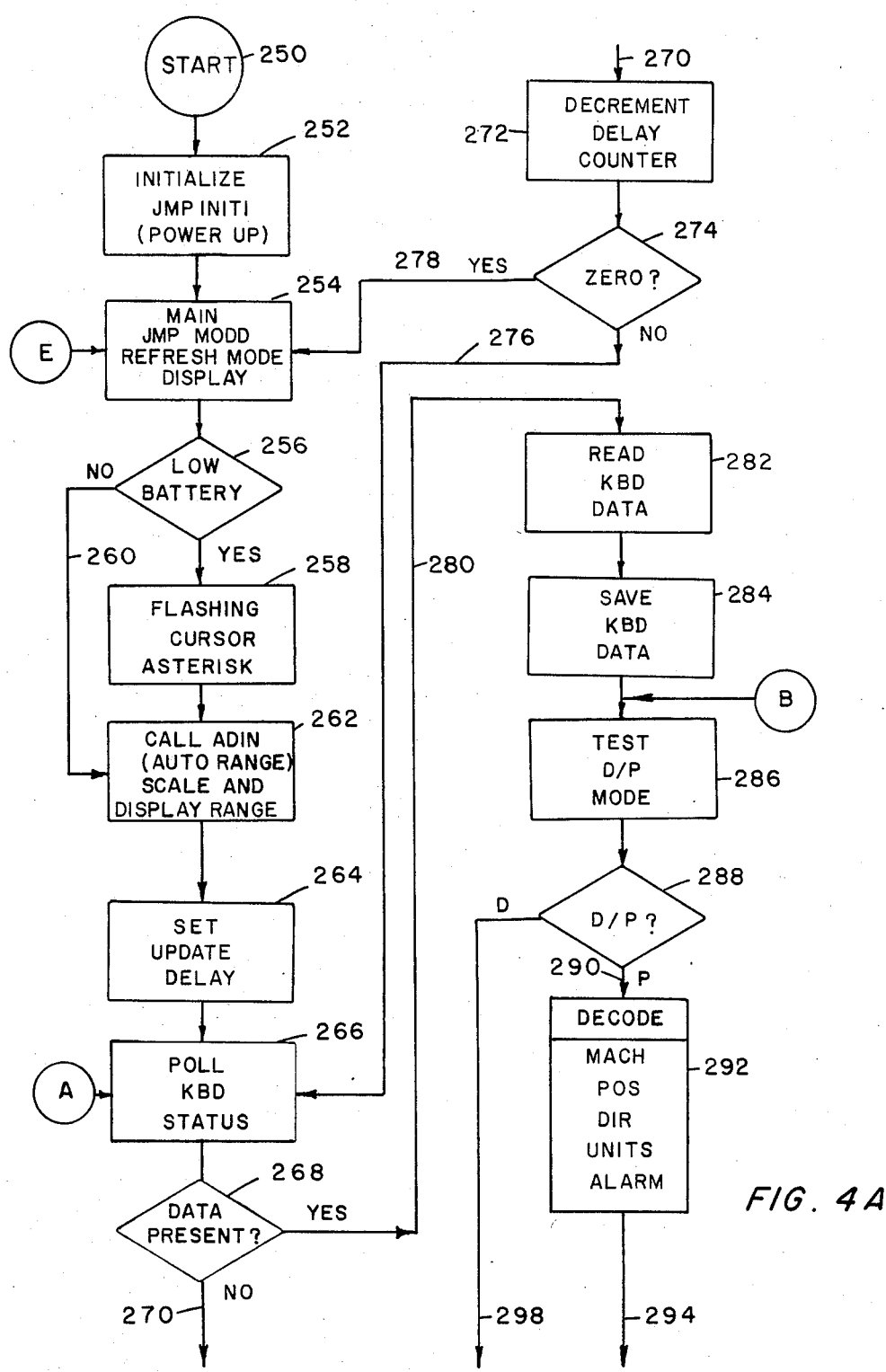
FIGS. 4A and 4B are a flow diagram of the principal program of the microinstructions of the control circuit of the invention.
Figure 4B:
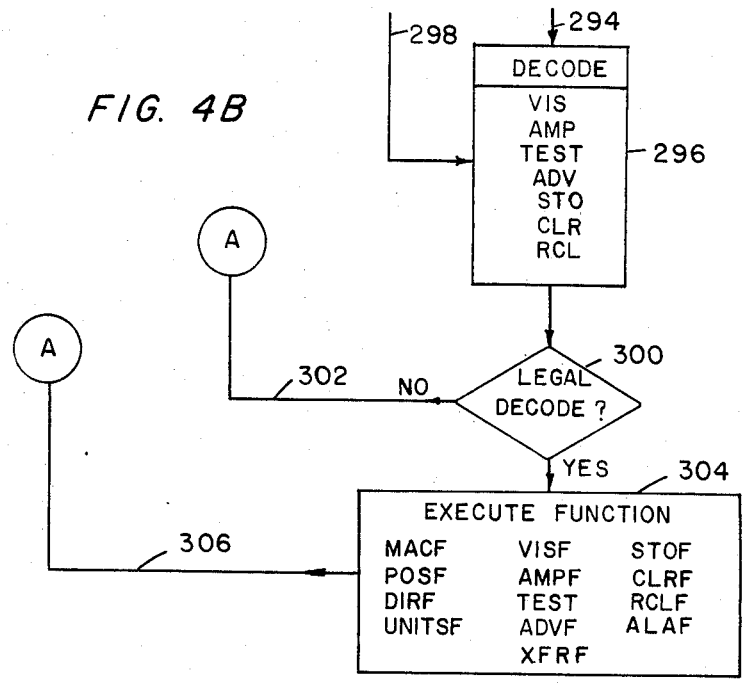
Figure 28:
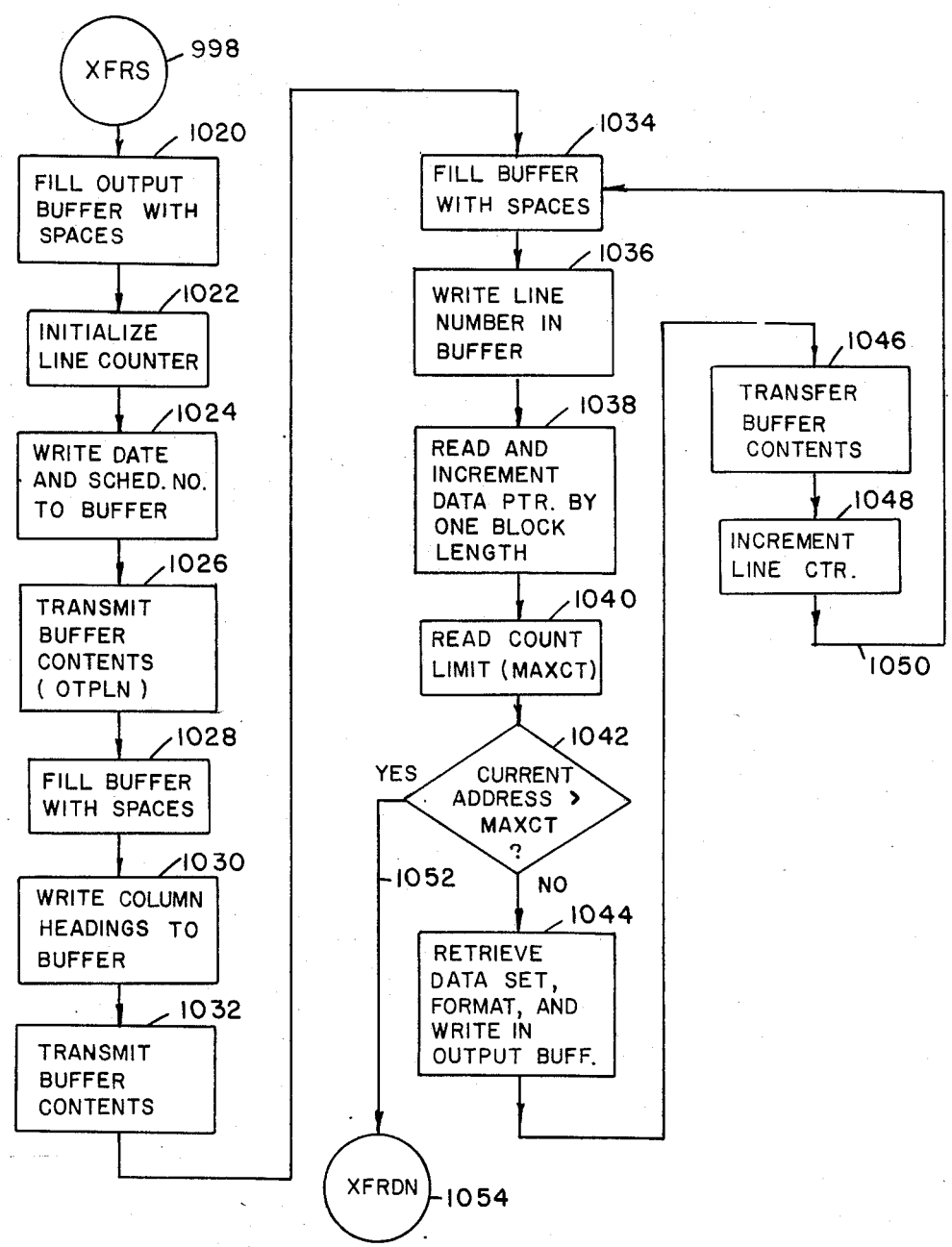
FIG. 28 is a flow diagram of the transfer/send subroutine of the microinstructions of the control circuit of the invention.

The microinstructions under which microprocessor function 210 operates and which are retained within the read only memory function at block 220 are described in the flow charts extending from FIGS. 4A–4B to 28. Referring to FIGS. 4A and 4B, FIG. 4B should be read in conjunction with FIG. 4A as being positioned directly therebeneath. These figures show the general or overall program structure. Looking initially to FIG. 4A, this general program is shown to commence at start position 250. Upon start-up, as represented at block 252, conventional initialization procedures are carried out which serve to set all registers, pointers and counters for an initial operation, such initialization procedures generally being carried out by a string of power-up subroutines. Following initialization, as represented at block 254, the program transitions to a mode display routine wherein the output provided at the upper left-hand corner of readout 22 shows a program, data input or transfer-reset mode condition by the symbols "PRG", "DAT", or "XFR". In effect, the subroutine serves to effect provide a display of that operational mode to which mode switch 26 is directed. As represented at terminal or node E, this instruction is periodically re-entered to carry out a refreshing of the display of the elected mode. Following the mode display, as represented at decision block 256, the program carries out a check for a low battery flag and in the event that such flag is present, as represented at block 258 a flashing cursor as well as asterisk is displayed at readout 22. Where the query at block 256 is in the negative and battery levels are appropriate, as represented by line 260, the program progresses to an analog-to-digital input routine represented at block 262. At this juncture, the program commences to assimilate data and the automatic ranging of the data as described in conjunction with block 74 in FIG. 3A is carried on. Additionally, the program looks to the English/metric switch 42 position which will be provided as an appropriate flag. Thus all of the proper vibration parameter units along with display information are collected. However, it is desirable that the display of received vibrational data not be updated too rapidly. For example, the signal conditioning low frequency filters as described, for example, at blocks 112 and 150 in FIG. 3A require settlement intervals to establish valid steady-state readings. Further, there generally will be a time constant associated with the true RMS function represented at block 88 in FIG. 3A. Thus, delay is provided which is compatible with the settlement time and such delay is carried out as represented at block 264 wherein an update frequency of about ½ second is provided.

The program then commences to test the keyboard status as represented at block 266. In effect, this function surveys the keyboard to determine whether or not the operator is requesting some additional service as will be represented by the depression of a key. Following a polling of the keyboard, as represented at block 268 query is made as to whether data are present and where not present, as represented at line 270, the program decrements a delay counter as represented at block 272. Where such decrementation has not reached a zero value representing a one-half second delay, then a query as represented at block 274 will result in a negative response and a polling loop ensues out as represented by line 276 leading to the keyboard test status block 266. In this regard, any time a key function is depressed by the operator, a servicing of that actuation of the key will be carried out. In the event of an affirmative response at query 274, then as represented at line 278 the program returns to block 254 and the display is refreshed.

In the event that the query at block 268 shows that data are present, then as represented at line 280 and block 282, the keyboard data are read and, as represented at block 284, such data are saved. This retention of data is carried out inasmuch as there are subset functions which are available in the manual mode of operation but not available in automatic mode of performance. Thus, the next operation as represented at block 286 determines whether the instrument is in an automatic or manual mode as developed from mode switch 26. The determination as to whether a data input or program mode flag is present is represented by block 288. In the event that a program mode is at hand, then as represented at line 290, the program commences to decode functional data from the keyboard as listed at block 292. In this regard, the program mode decoding will accept signals representing actuation of the machine number, position, direction, units and alarm function keys. Following a decoding of these keys, the program continues in program mode as represented at line 294 leading to block 296 in FIG. 4B. Where an automatic mode flag is detected at block 288, this same decoding function represented at block 296 is accessed as represented by by-pass line 298.

Block 296 shows that for the data input mode as well as the test mode, the program permits the decoding of the visual inspection (VIS) key, the amplitude range selecting key, the test function key, the advance or decrement keys, the storage key, a clear key actuation as well as a recall key actuation. It may be recalled, that the visual inspection key provides for a menu selection of a numerical code as to machine condition. The amplitude key permits a manual ranging mode overriding automatic ranging features. The test function key permits the setting of an internal calendar clock and other features including the testing of the function of the analog-to-digital converter as represented at block 106 and a measurement of battery voltage rather than just providing for a flag showing low battery condition. The advance and decrement counter permits the alteration of an internal pointer to permit the entry of a new data set or to retrieve a data set automatically. These keys also are used for cursor manipulation in the test mode. The store function permits the storage of data from the display of submittal thereof to internal memory and the recall function permits the retrieving of a previous set of readings.

Where a key actuation is made, a query will be carried out as represented at block 300 determining whether the decoded function key is legal. In the event that it is not legal, as represented at line 302 and node A return is made to a keyboard polling instruction represented in FIG. 4A at block 266. Where the decoding of a key is legal, then the program progresses to execute whatever function has been selected and the program will branch to one of several service routines as are listed at block 304. Upon the carrying out of an appropriate one of these function or service routines, the main program then returns to the main polling loop as represented at line 306 and node A, the latter returning the program to the keyboard polling instruction represented at block 266.

Figure 5:
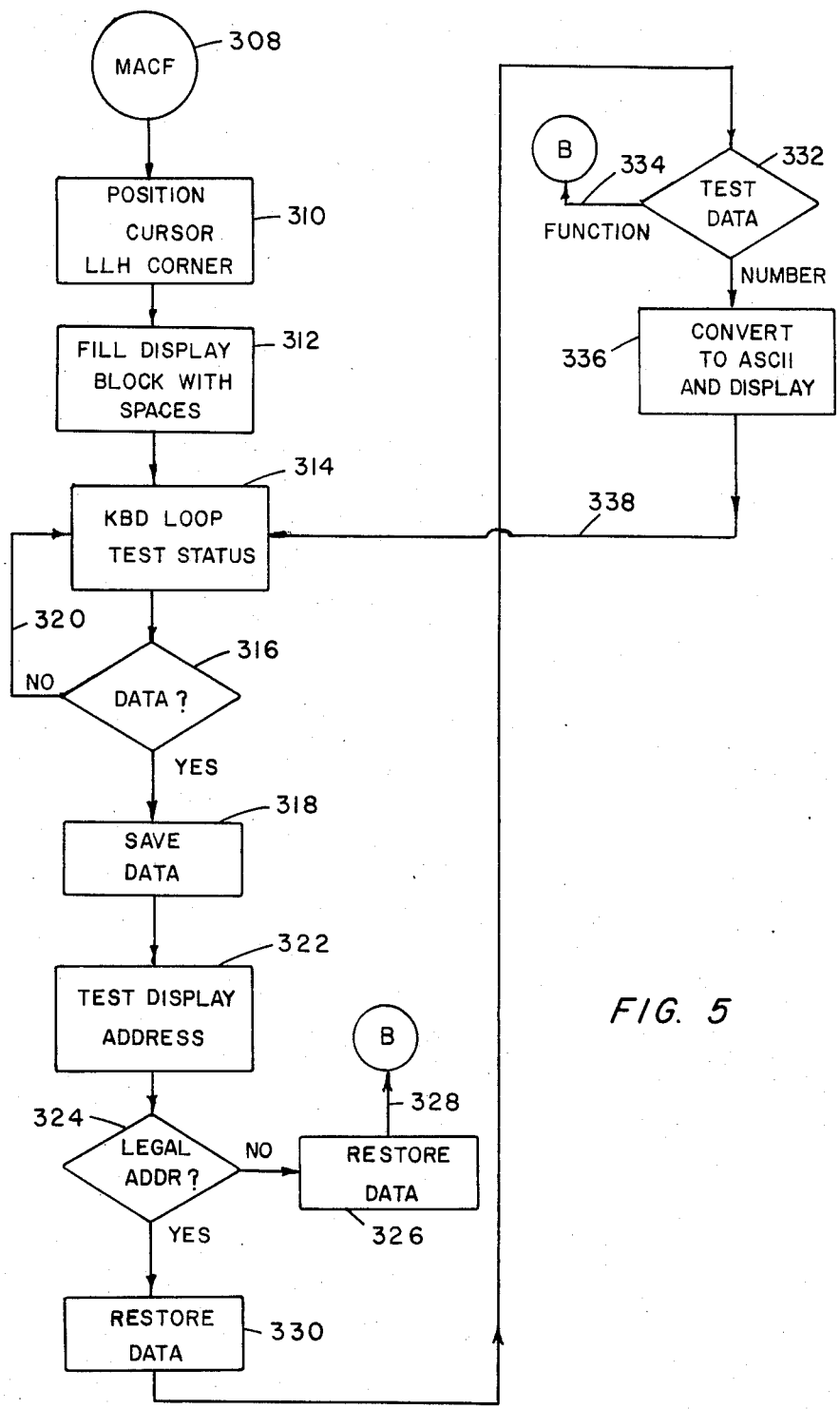
FIG. 5 is a flow diagram of the machine function subroutine of the microinstructions of the control circuit of the invention.

Referring to FIG. 5, a flow chart showing the machine function service routine is presented. Entry into this routine is represented at terminal 308 which leads to a first instruction to position the cursor at the lower left-hand corner of readout 22 as represented at block 310. This instruction prepares for the reception of up to 4 digits and the cursor itself, is not made visible. The program then progresses to fill the display block with spaces as represented at block 312, a number up to 4 digits potentially being utilized. However, this may not be the case, accordingly, to assure that those digit spaces remain blank if nothing is entered, the instruction at block 312 is provided.

The service routine then progresses to test the status of the keyboard as represented at block 314 in preparation for the receipt of a machine number from the numeric keys. Where data are present as represented by the inquiry at block 316, then such data are retained as represented at block 318. On the other hand, where no numerical data have been entered, the program loops as represented at line 320 to await the insertion of a number. Upon the entry of a number, as represented at block 322, a procedure is carried out to test the inserted data. In this regard, as represented at inquiry block 324 if the address represented by the entry of the operator is not legal, for example, having more than 4 digits, the program progresses to block 326 wherein the data are restored and the routine returns to node B at FIG. 4A as represented at line 328. At this position, the main program then again carries out the mode testing and decoding of function keys.

Figure 6:
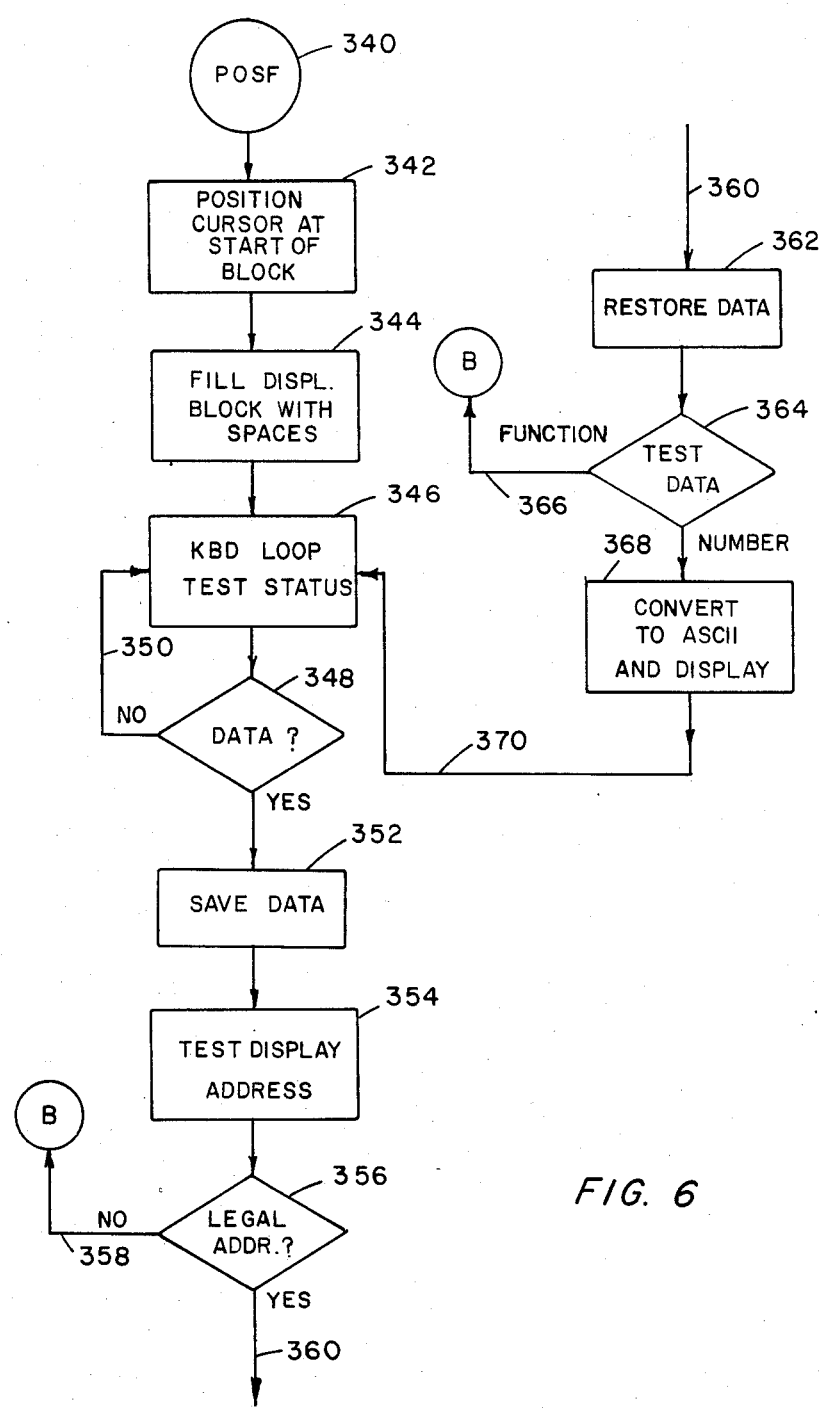
FIG. 6 is a flow diagram of the position function subroutine of the microinstructions of the control circuits of the invention.
Figure 7:
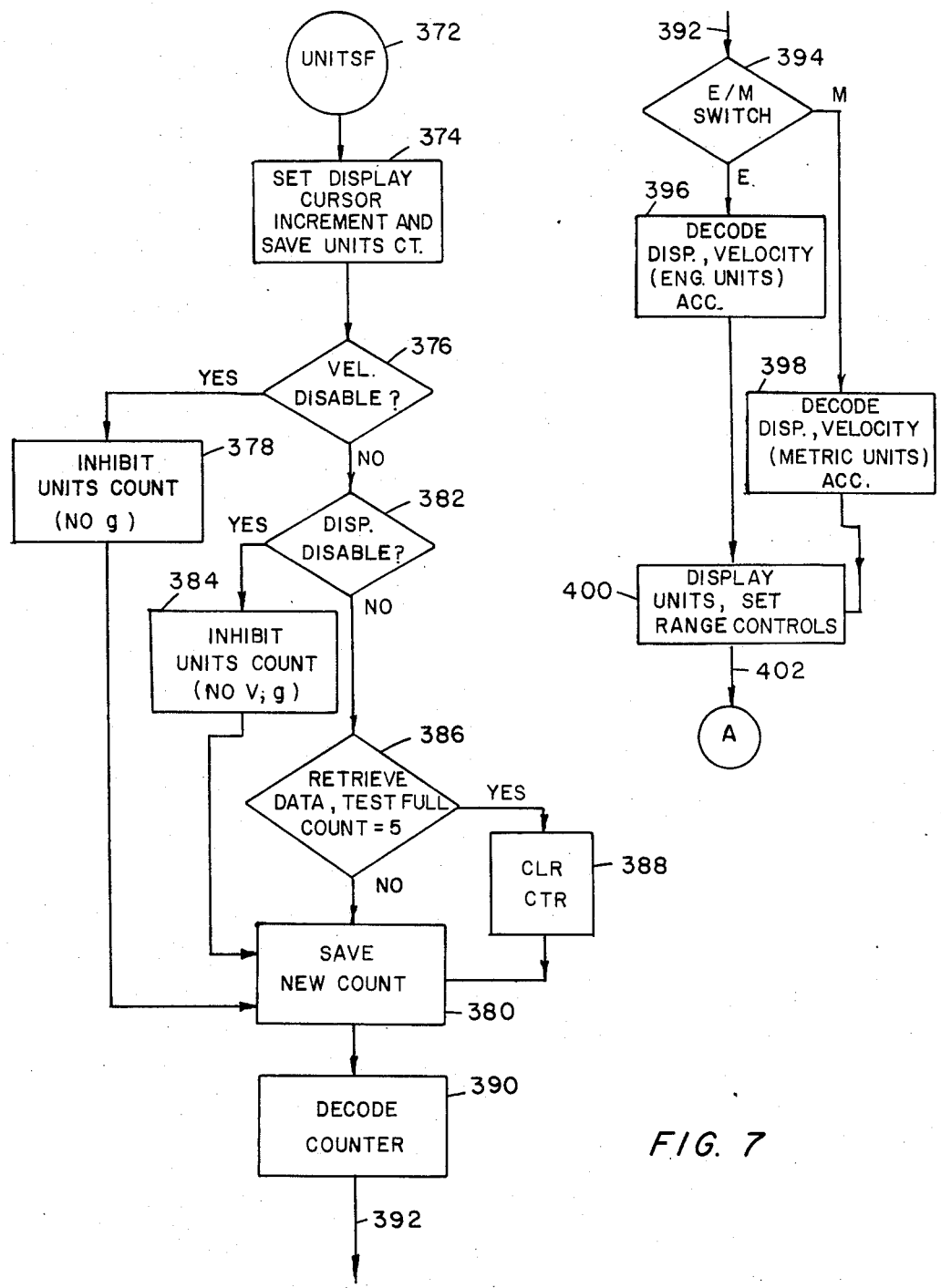
FIG. 7 is a flow diagram of the units function subroutine of the microinstructions of the control circuit of the invention.

In the event the inquiry at block 324 is in the affirmative, then as represented at block 330, the data are restored and the program proceeds to the inquiry represented at block 332 wherein a determination is made as to whether a function or a number key has generated the data. A function key actuation will cause reentry into the main program as represented by line 334 leading to node B as above described. This will have indicated that the operator has determined to carry out another function. However, where numerical data have been received, then as represented at block 336, such numerical data are converted to ASCII format and displayed at readout 22. Following this display, as represented at loop line 338 leading to block 314, the keyboard status is again tested to determine the presence of another key actuation.

Where the operator has actuated a position function key which has been appropriately decoded as represented at block 292, then the position function service routine is carried out. Referring to FIG. 6, entry into this routine is represented at terminal 340 and an initial positioning of a non-illuminated cursor at the commencement of a 2-digit available block is carried out as represented at block 342. As before, the two block portion of readout 22 is filled with blank spaces as represented at block 344, following which the keyboard is tested for the presence of data as represented at block 346. Accordingly, as represented at block 348, an inquiry is made as to whether data are present and, if that is not the case, as represented at polling loop line 350, the routine awaits the depression of a key on the part of the operator. Where a determination is made at block 348 that data are present, then such data are saved as represented at block 352 and the routine carries out a test for the display address as represented at block 354. Accordingly, as represented at block 356, a determination is made as to whether more than two digits are present, in the event that is the case, the address is illegal and, as represented at line 358, the routine returns to node B of the main program as represented at FIG. 4A. Where the determination at block 356 shows the address to be legal, then the routine continues as represented at line 360, the data being restored as represented at block 362 and tested to deterine whether a number has been inserted or a function key has been actuated as represented at block 364. Where a function key has been actuated, then as represented at line 366, the routine returns to the main program as shown at FIG. 4A, the operator having elected to carry out a different function. Where the query at block 364 shows that numerical data are present, then as represented at block 368 the number is converted to ASCII format and displayed at readout 22. As represented at line 370, the routine then loops to block 346 to await an indication of a next key depression.

Where the main program has decoded a legal actuation of the units key of assembly 20, then the program turns to the appropriate service routine labeled "UNITSF". It may be recalled that such legal actuation occurs only in the manual operational mode. Referring to FIG. 7, this routine is shown to be entered at terminal 372 and the initial operation carried out is to set the display cursor as above described as well as to increment a counter. This function is represented at block 374. It may be recalled that the units selection by the operator is based upon a number of actuations of the units key. Thus, a counter is utilized for the determination of which of the five types of units will have been selected by the operator. A determination also is made as to the type of transducer or pick-up 18 which is being utilized by the operator. Thus, it becomes necessary to coordinate the type of transducer 18 utilized and the units selection made by the operator such that valid data are derived. The counter utilized in this routine provides a displacement read-out for zero and one conditions of the counter (based upon filtering selection), a velocity indication for a two count, an acceleration indication for a count of 3 and a Spike Energy indication for a count of 4. Displacement and velocity units vary with English/metric election. The pick-ups or transducers 18 utilized by the operator are arranged having appropriate pin groundings such that a selective inhibition of switches S1 and S2 may be provided as represented at lines 186 and 190. The condition of these switches is represented by appropriate flags. Accordingly, as represented at blocks 376, where the velocity integration stage 124 is disabled by the opening of switch S1, then as represented at block 378 the units counter is inhibited, inasmuch as no acceleration type units can occur. The program then commences to block 380 wherein the count is saved. Where the inquiry at block 376 indicates that the integration stage 124 is not disabled by the opening of switch S1, then the inquiry is made as to whether the displacement integration stage 162 is disabled by the opening of switch S2. This query is represented at block 382 and indicates that where switch S2 is open, then as represented at block 384, the units counter is inhibited inasmuch as no acceleration or velocity units can be available. A negative response to the query at block 382 leads to the inquiry at block 386 wherein a test is made as to whether a legal count is present in the units counter. Where such count is greater than 4, then, as represented at block 388, the counter is cleared and the program loops to block 380. Where the determination at block 386 represents a legal value, the count is saved as represented at block 380 and, as represented at block 390, the units counter is decoded. The routine then progresses as represented by line 392 to the inquiry represented at block 394 wherein a test of the English/metrics unit switch 42 is made. Where switch 42 provides for English unit readouts, then as represented at block 396, displacement and velocity are read out in English units and acceleration is read out in standard acceleration units, either as a "g" or "SE". Where the inquiry at block 394 shows that the switch 42 is in a metric orientation, then as represented at block 398, displacement and velocity unit readouts are in metric values and acceleration, as before, is read out as a "g" or "SE". From blocks 396 and 398, the program progresses to the instruction represented at block 400 wherein the appropriate units are displayed and the range control switches associated with the amplitude range selection function represented at block 74 are set. The routine then returns to the main program as represented at line 402 and node A leading to the keyboard polling instruction at block 266.

Figures 8, 9:
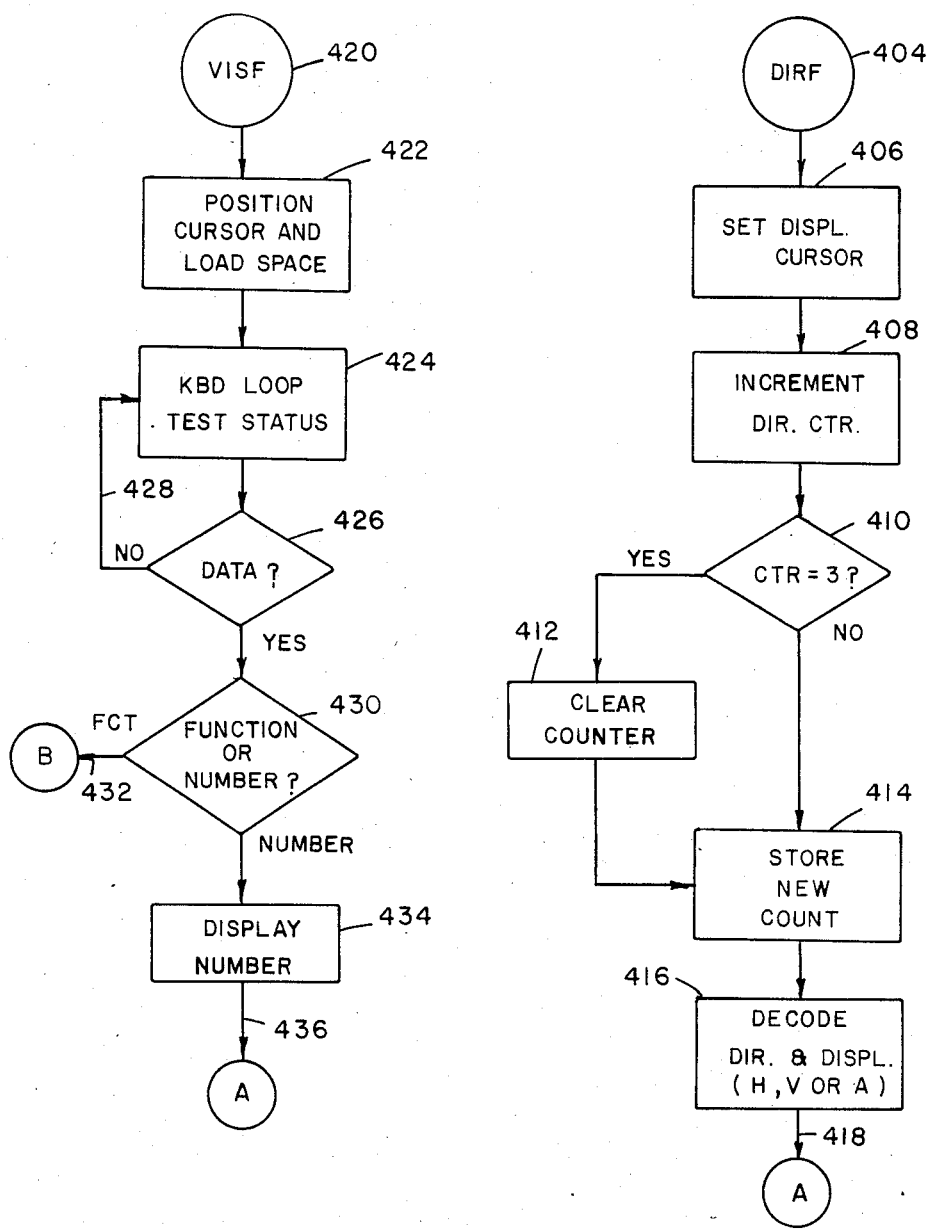
FIG. 8 is a flow diagram of the direction function subroutine of the microinstructions of the control circuit of the invention.
FIG. 9 is a flow diagram of the visual inspection function subroutine of the microinstructions of the control circuit of the invention.
Figure 10:
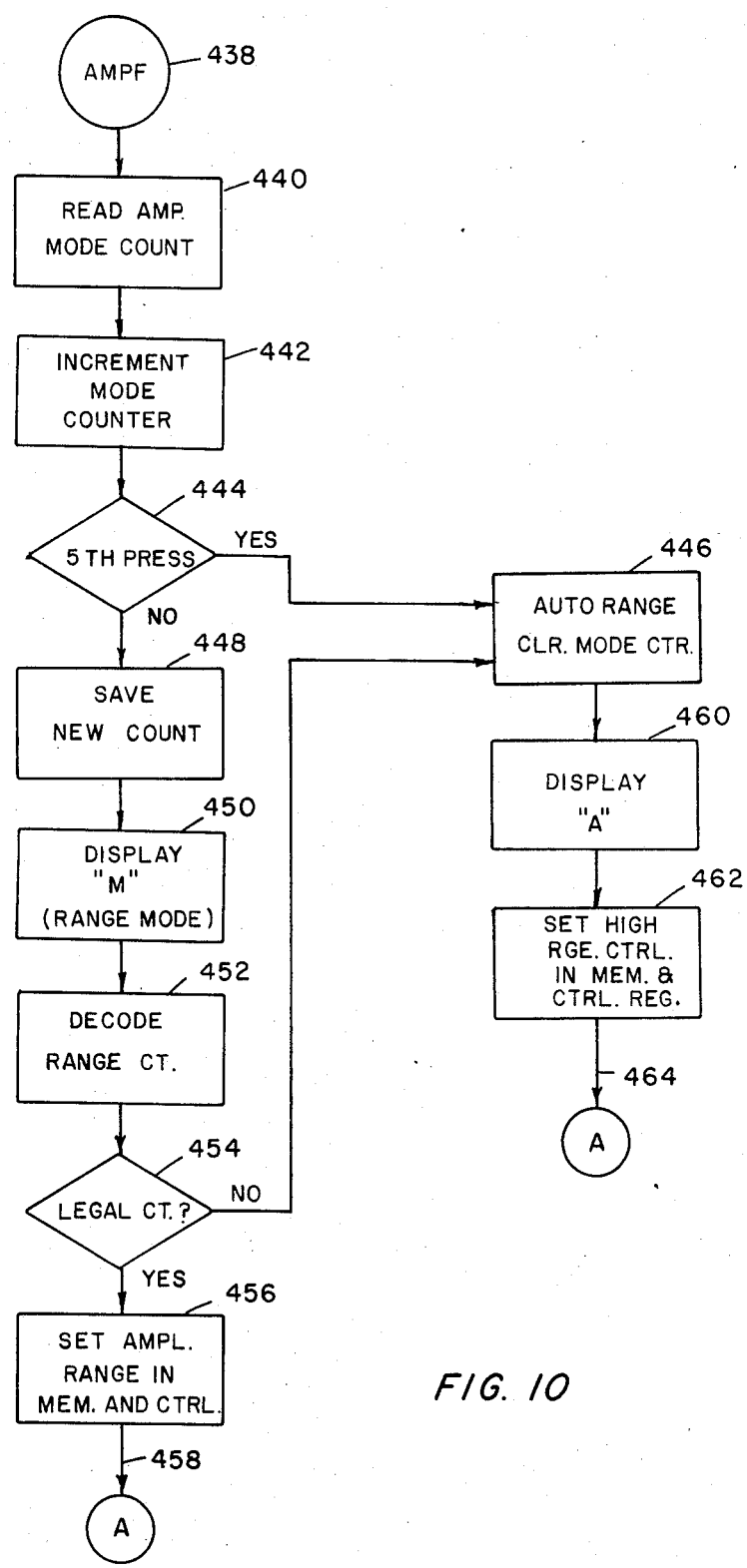
FIG. 10 is a flow diagram of the amplitude function subroutine of the microinstructions of the control circuit of the invention.

Turning to FIG. 8, where the main program has decoded an actuation of the direction function key of assembly 20, then the service routine labeled "DIRF" is entered as represented at terminal 404. As before, the initial instruction as represented at block 406 is to set the display cursor at the first position of the readout location, the cursor being invisible. Inasmuch as the direction input is counter controlled in conjunction with a number of actuations of the direction key of assembly 20, a counter function operating in modulo 3 is provided for outputting a display as H, B or A. Based upon the number of actuations of the key, the direction counter is incremented as represented at block 408 and, following such incrementation, as represented at block 410, a determination is made as to whether the counter position is at 3. If such is the case, then an illegal count is present and, as represented at block 412, the counter is cleared and the routine loops to block 414 where the cleared count is stored and the service routine is permitted to return to the main program. In the event that the query at block 410 is in the negative, then, the valid count is stored as represented at block 414 and the program progresses to the instructions as at block 416 wherein the count is decoded and the appropriate direction of transducer 18 symbol, H, B or A, is displayed at readout 22. The routine then progresses as represented at line 418 to node A returning to the main program at block 266 wherein the keyboard assembly 20 is polled for a next actuation.

Where the decoding function of the main program determines that the visual inspection key "INSP" has been actuated validly, then the service routine represented at FIG. 9 is entered into as represented at terminal 420 labeled "VISF". As before, the routine serves to position an invisible cursor at the first location for visual inspection readout (0 through 7) and the space is loaded with a zero. This instruction is represented at block 422. From block 422, the routine looks to an input from keyboard assembly 20 as represented by the keyboard loop test status block 424. As part of the status test, as represented at block 426, a determination is made as to whether data have been entered through the actuation of a key. Where no such data have entered, as represented at polling loop line 428, the routine awaits the operator's actuation of an appropriate inspection condition number. Where the inquiry at block 426 indicates that data have been received, then, as represented at block 430, a determination is made as to whether the key actuation is of a function key or a numerical variety. Where a function key has been depressed, then as represented at line 432, the routine returns to the main program as represented at FIG. 4A, the operator having chosen to go to another function rather than insert visual inspection data. Where the inquiry at block 430 indicates that a numerical key has been actuated, then as represented at block 434, the selected number is displayed at readout 22. As represented at line 436 and node A, the routine then returns to the main program at block 266 wherein the keyboard status is polled.

Where the operator has elected to override automatic range selection as described in conjunction with block 74 in FIG. 3A, the function key labeled "AMPL" will be actuated a predetermined number of times. This overriding feature becomes valuable, for example, where readouts are at the lower level of a range and the operator would like to convert the reading to a level higher on the scale. During manual ranging, an initial actuation of the range select button will cause the system to commence with the highest range and downrange each time the key is actuated until five actuations have taken place whereupon the instrument returns to an automatic ranging mode. Looking to FIG. 10, entry into the manual range selection mode is represented at terminal 438 labeled "AMF". The first instruction within this routine is represented at block 440 wherein the amplitude mode counter is read, following which the counter is incremented as represented at block 442. Following such incrementation, as represented at block 444, a determination is made as to whether a fifth actuation of the key has been made and where that is the case, as represented at block 446, the routine returns to automatic ranging and the mode counter is cleared. Where the "AMPL" key has not been actuated five times, then as represented at block 448, the count is saved and the routine displays "M" representing that a manual range model is at hand as represented at block 450. This letter appears to the right of the amplitude reading in readout 22. The range count is then decoded as represented at block 542, whereupon a determination is made as to whether the count is legal as represented at inquiry block 454. Where determination is made that the count is not legal, then the service routine clears the mode counter and undertakes automatic ranging as represented at block 446. Conversely, where the inquiry at block 454 shows the count to be legal, then as represented at block 456, the elected amplitude range is set in memory and a control register. Upon such insertion in memory and control register, as represented at line 458 and node A, the routine returns to the main program block 266 wherein the keyboard assembly 20 is polled for a next key actuation.

Returning to block 446, where the automatic range is re-entered due to an illegal count or fifth depression of the AMPL key, then as represented at block 460 an "A" is displayed to the right of the amplitude reading and, as represented at block 462 the highest range is automatically elected, such election being submitted to memory and a control register. The routine then exits as represented at line 464 and node A to the main program block 266 wherein the keyboard is polled for a next actuation.

It may be recalled from FIG. 4A at block 262, that the analog-to-digital converter function described in conjunction with block 106 in FIG. 3A is read about every one-half second. This is carried out by calling an ADIN service routine as is described in conjunction with FIGS. 11A and 11B. Referring to those figures, the routine is entered as represented at terminal 462 whereupon the status of the converter is saved as represented at block 464 and the program then reads the A/D converter 106 as represented at block 466. Under the preferred design, a full scale reading corresponds with a binary number of 200 out of a possible value of 256. Accordingly, as represented at block 468, a determination as to whether an overscale condition exists, ie. over binary value 200. In the event of an affirmative determination, as represented at line 470 the routine goes to another, uprange routine, the entry to which is represented at node C, such subroutine serving to adjust to an on scale condition. Where a full scale value has not been reached, then as represented at block 472 the digital reading is saved and the program proceeds to the inquiry at block 474 determining whether a manual or automatic ranging mode is at hand. Where a manual mode is at hand, as represented at line 476 and block 478, the reading is scaled and saved. On the other hand, where an automatic mode is at hand, then a determination is made as to whether an underscale condition exists, such condition representing 7½ percent of full scale over threshold value between ranges. In the event of an affirmative determination at block 480, as represented at line 482, the routine progresses to a more sensitive range by entering a downrange subroutine indicated by node D. In the event the query at block 480 indicates that an underscale situation does not exist, then, as represented at block 478, the digital reading is saved and scaled. The program then progresses as represented at line 484 and illustrated in FIG. 11B to the query represented at block 486 wherein a determination as to whether English or metric units have been selected at switch 42. Where a metric range has been elected, then as represented at block 488, the digital reading is multiplied by 15 in keeping with a full scale value for metric readings of 3,000, it being recalled that a maximum scale binary value of 200 was elected. The resultant multiplied value then is converted to binary coded decimal format as represented at block 490 and the resultant four BCD digits are stored in a scratchpad register as represented at block 492. A determination then must be made as to the location of the decimal point and this is carried out by reading the range counter and decoding it as represented at block 494 followed by the positioning of the decimal point as represented at block 496. Following such positioning, as represented at block 498, the reading is displayed at readout 22.

Where switch 42 is adjusted to provide for English unit readout, then the query at block 486 leads to the instruction at block 500 wherein the digital reading procured is multiplied by 5 and the value 1 is subtracted therefrom the evolve the English output, a full scale valuation for English units being 999. Following this alteration, the resultant value is converted to binary coded decimal form as represented at block 502 and is stored in a scratchpad register as represented at block 504. To determine appropriate decimal point positioning, the range counter is read and decoded as repesented at block 506 and the decimal point is appropriately positioned as represented at block 508. Following such positioning, the reading is displayed at readout 22 as represented at block 498.

Figure 11A:
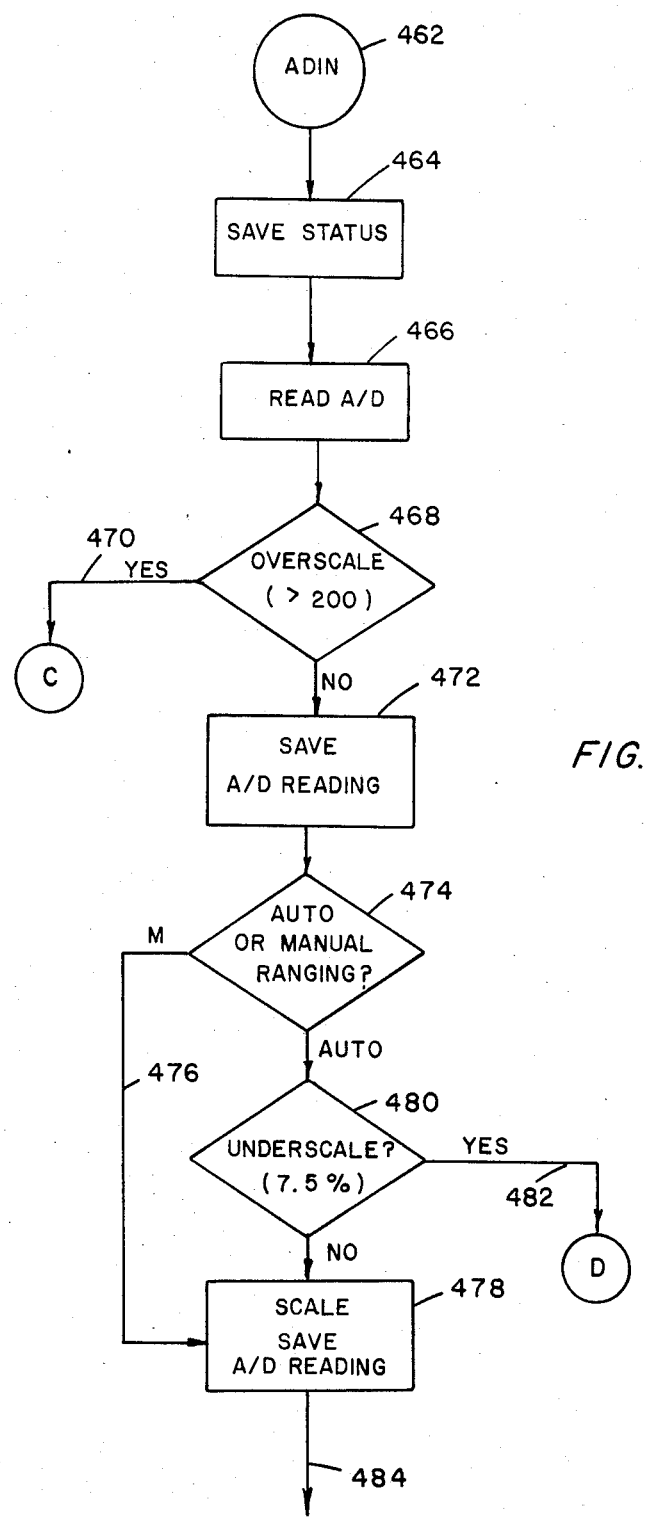
FIGS. 11A and 11B are a flow diagram of the analog-to-digital input subroutine of the microinstructions of the control circuit of the invention.
Figure 11B:
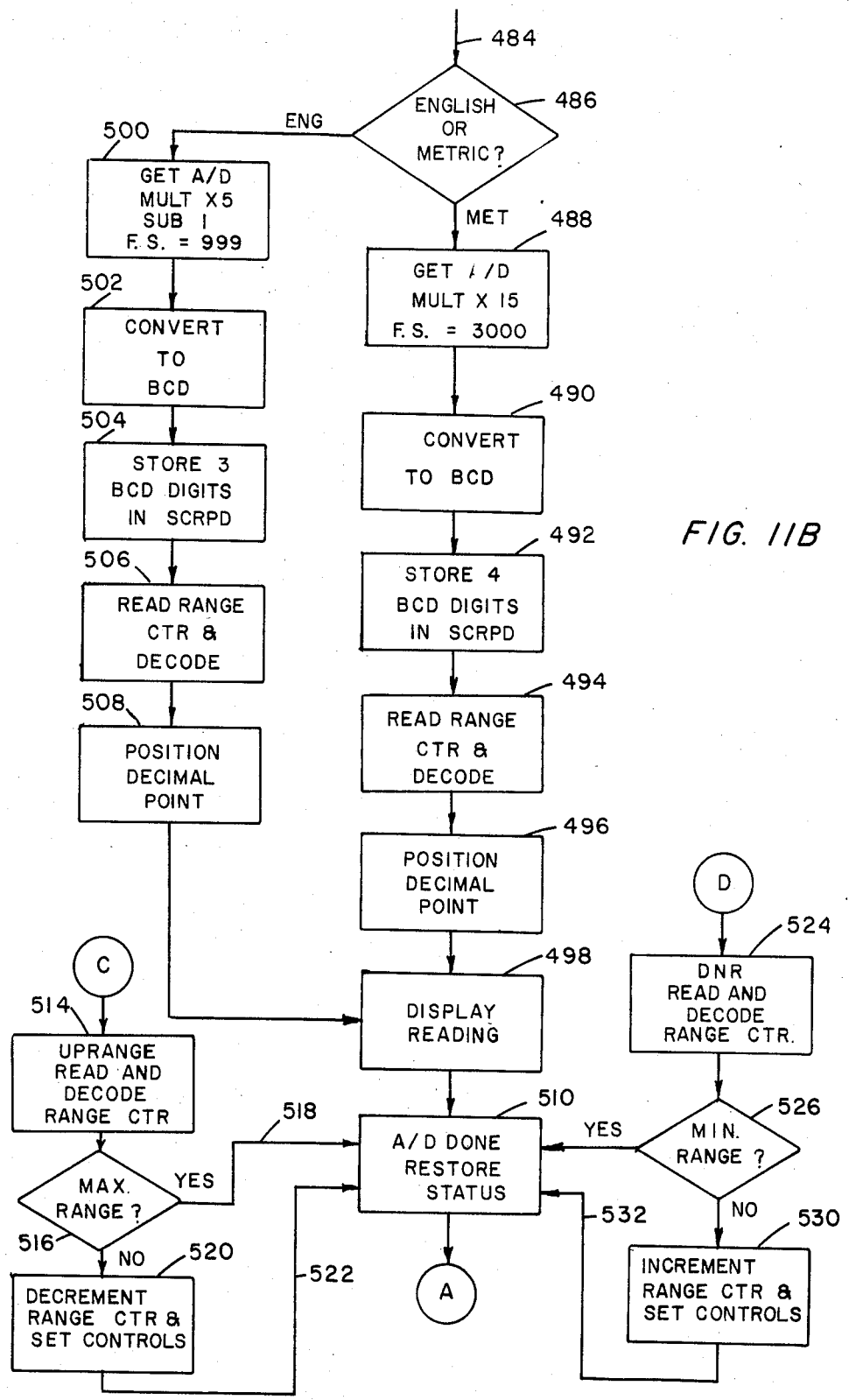

Block 510 indicates that the analog-to-digital routine is completed, conversion and appropriate treatment being carried out along with display. Inasmuch as the ADIN service routine may be called in the course of other activities within the program, the status of all registers is maintained such that the main program may return to any subroutines then under way. Accordingly, following such restoration as represented at line 512 and node A, the main program is re-entered at block 266 wherein the keyboard status is polled.

Where an overscale is determined as described in conjunction with block 468 and node C, then an uprange subroutine is carried out, as represented by node C leading to block 514 in FIG. 11B. In this subroutine, the range counter is read and decoded and, as represented at block 516 a determination is made as to whether the instrument is at its maximum range setting. Where this is the case, as represented at line 518, an exit is made from the ADIN service routine as represented at block 510 and line 512. An affirmative indication at block 516 also results in the display of the signal "OVR" in readout 22 representing an overflow condition. Where the determination at block 516 shows that a maximum range is not established, then as represented at block 520 the range counter is decremented and controls are set accordingly, a less sensitive range being selected. Following the decrementing of the range counter, as represented at line 522, the routine restores the status of any registers as represented at block 510 and returns to the main program as represented at line 512 and node A.

Where an underscale determination is made as represented at block 480 and the routine progresses to a downrange subroutine as represented at node D, then as shown at block 524, the range counter is read and decoded. Following such decoding, as represented at block 526, a determination is made as to whether the instrument is operating at its minimum range, ie. maximum sensitivity and if that is the case, then as depicted by line 528, the subroutine restores the status of all registers and re-enters the main program as represented by line 512 and node A. In the event that a minimum or most sensitive range is not present, then as represented at block 530, the range counter is incremented and appropriate controls are set. Following such incrementation, as represented at line 532, the routine returns to the main program as described in connection with block 510, line 512 and node A.

Figure 12:
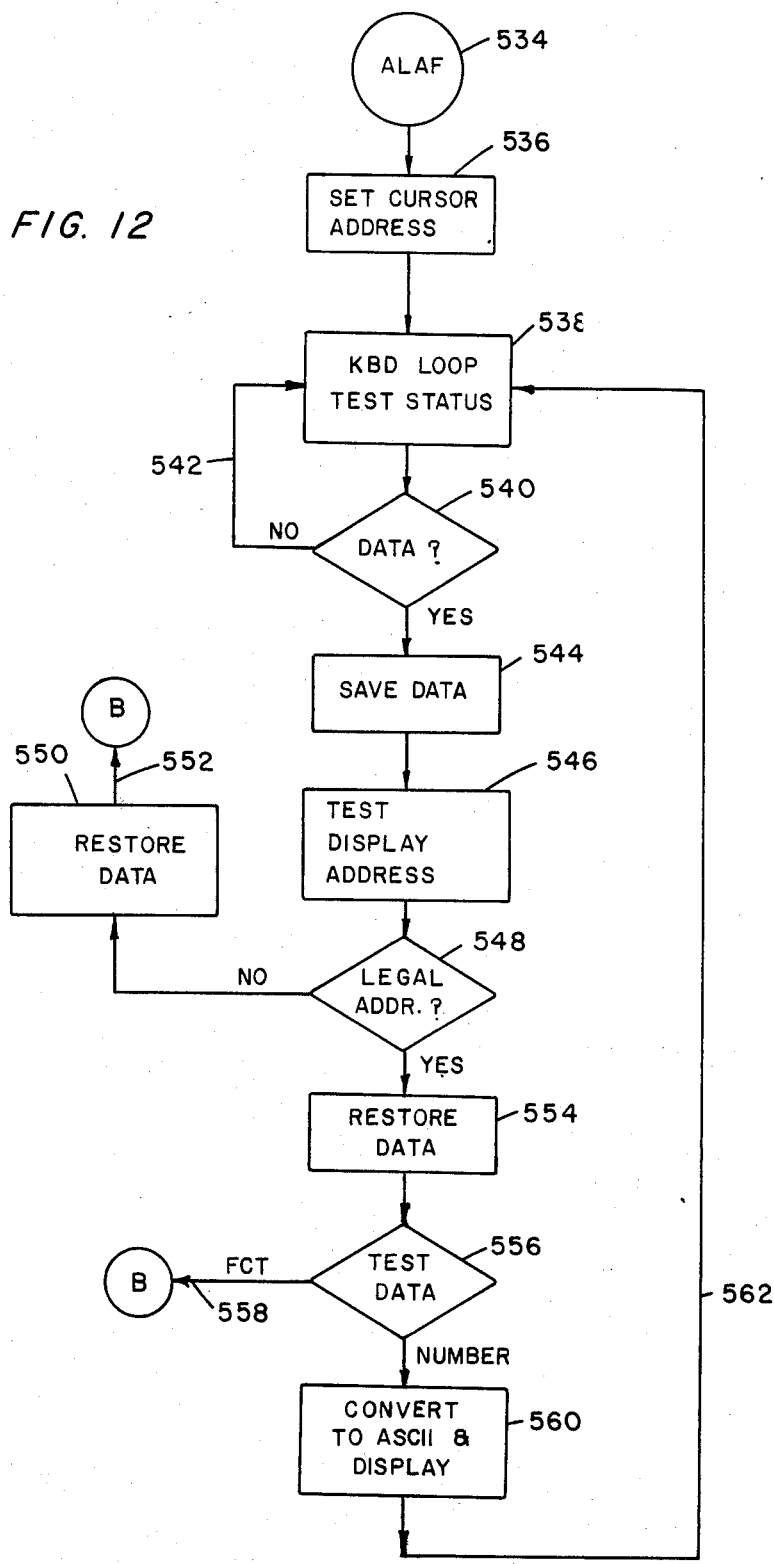
FIG. 12 is a flow diagram of the alarm function subroutine of the microinstructions of the control circuit of the invention.

For uses of instrument 10 in conjunction with more basic devices such as printer 32 or tape recording devices or the like, it may be desirable to establish a pint-out schedule which includes such information as alarm levels. To generate appropriate print-outs, the memory function of instrument 10 is utilized and the alarm levels may be inputted from the keyboard assembly 20. Turning to FIG. 12, the alarm function input service routine, "ALAF" is shown commencing with terminal 534. Accordingly, when the alarm function key of assembly 20 is actuated, the instant service routine positions the invisible cursor at the appropriate first digit of the alarm readout address as represented at block 536. The routine then awaits the inputting of digital data as represented at block 538 and inquiry block 540. At the latter block, an inquiry is made as to whether data have been generated from keyboard assembly 20. In the event of a negative response, then, as represented by loop line 542, the routine awaits such data input. Where data are received, as represented at block 544, the data are saved and, as represented at block 546, the display address is tested to determine whether the address is in the appropriate alarm function field. A determination then is made as to whether the address is legal in terms of numbers of digits as represented at block 548. Where this determination is in the negative, as represented at block 550, data are restored and as represented at line 552 and node B, a return is made to the main program as represented by the same node depiction in FIG. 4A. Where a legal address is at hand, then the data are restored as represented at block 554 and, as represented at block 556, a determination is made to whether the data developed have been generated from a numerical key or a function key of assembly 20. Where a function key has been depressed as represented at line 558 and node B, a return is made to the main program as represented at FIG. 4A, the operator having determined to carry out a different function. Where numerical data are present, then as represented at block 560, such data are converted to ASCII format and displayed at readout 22. The service routine then loops as represented by line 562 to block 538 wherein the keyboard status is again examined.

Figure 13:
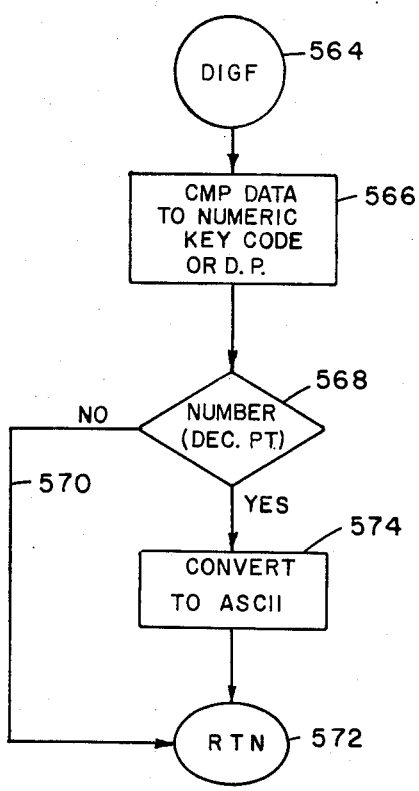
FIG. 13 is a flow diagram of the digits function subroutine of the microinstructions of the control circuit of the invention.

Referring to FIG. 13, a test routine is depicted which is called upon repeatedly to test data to determine whether a number or function signal has been outputted from keyboard 20. For example, the routine has been utilized in conjunction with successive blocks 332 and 336 or 364 and 368. The test function, labeled "DIGF" and shown commencing at terminal 564, initially carries out a comparison of data to numeric key code or looks to the presence of a decimal point as represented at block 566. The routine then queries whether a number or decimal point is present as represented at block 568. In the event that there is no such number or decimal point, then as represented at line 570 the subroutine returns to the initial program as represented at 572. In the event of an affirmative response to the query posed at block 568, then as represented at block 574 an appropriate table look-up is carried out to convert the data to ASCII format. Following such conversion, the subroutine returns to the program from which it was called as represented at 572.

Referring to FIG. 14, a mode display subroutine identified as "MODD" is shown commencing at terminal 576. This mode display subroutine is called for in the main program at block 254 and serves to monitor the orientation of mode switch 26. Accordingly, as represented at block 578, the invisible cursor is positioned at the upper left-hand corner of readout 22 and the routine makes an initial determination as to whether the switch is oriented in the transfer mode orientation as represented at block 580. In the event such orientation is at hand, then as represented at block 582, the term "XFR" is displayed at readout 22. As represented by line 582, the subroutine then returns as represented by node E to the main program as represented by the same notation in conjunction with block 24. In the event the query at block 580 is in the negative, then as represented at block 584, an inquiry is made as to whether switch 26 is oriented at the DATA INPUT or PROGRAM positions. Where the switch is in a DATA INPUT position, then as represented by block 586, the term "DAT" is displayed and as represented at line 588 the routine returns to the main program at node E. Where the inquiry at block 584 indicates that switch 26 is in a program orientation, then as represented by block 590, the term "PRG" is displayed and the subroutine returns to the main program at block 254 as represented by node E.

Figure 15A:
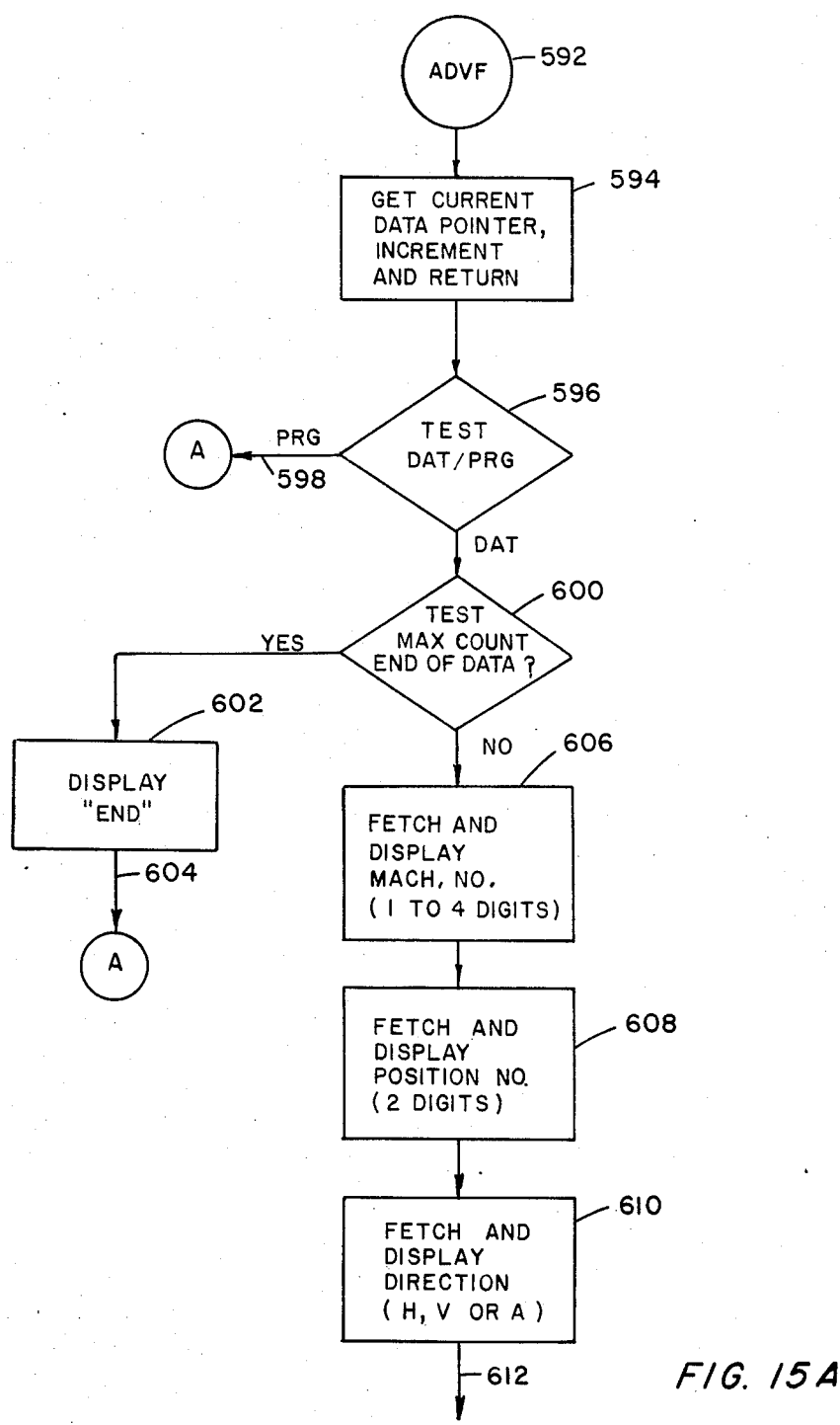
FIGS. 15A and 15B are a flow diagram of the advance function subroutine of the microinstructions of the control circuit of the invention.
Figure 15B:
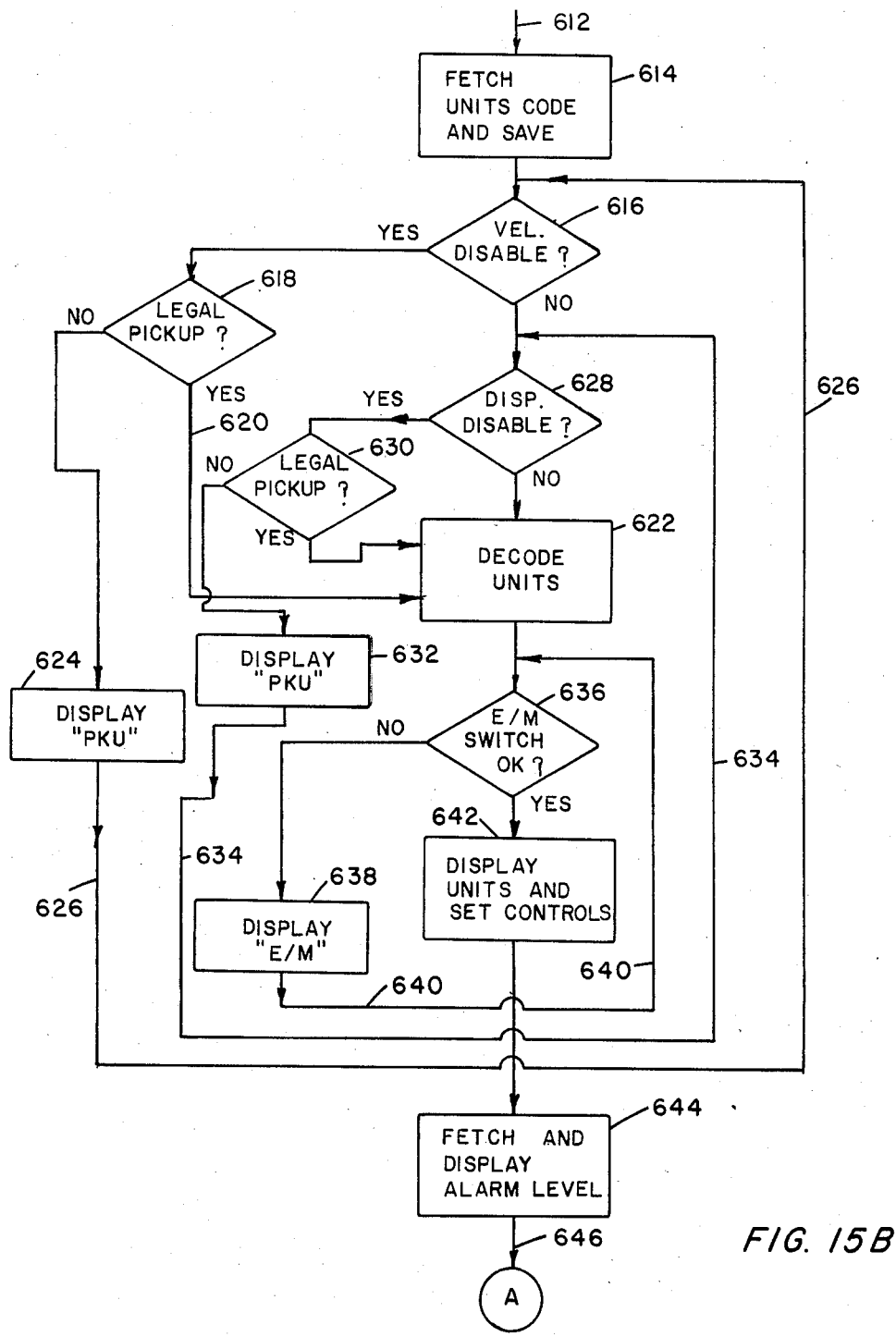
Figure 16A:
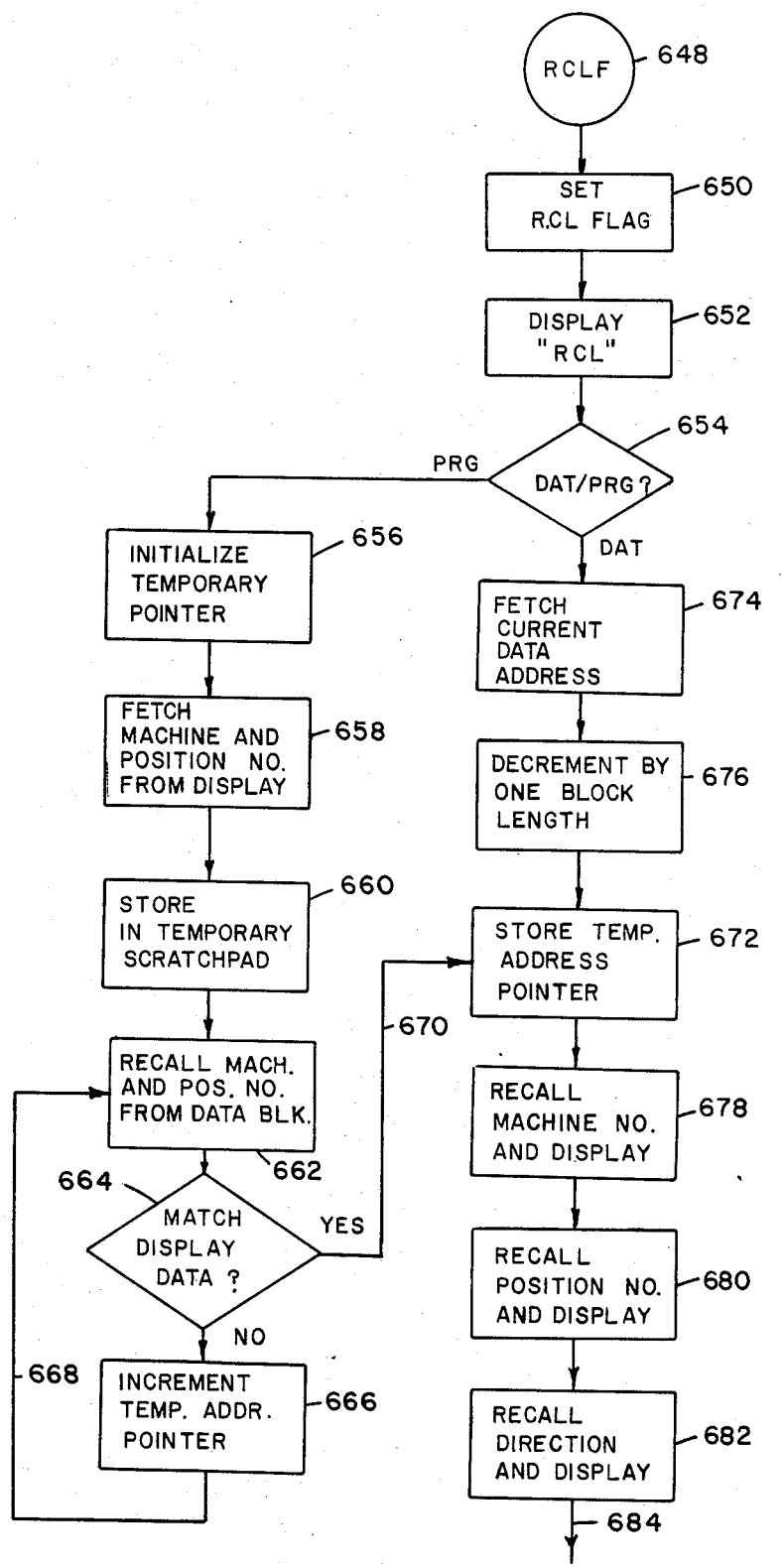
Figure 16B:
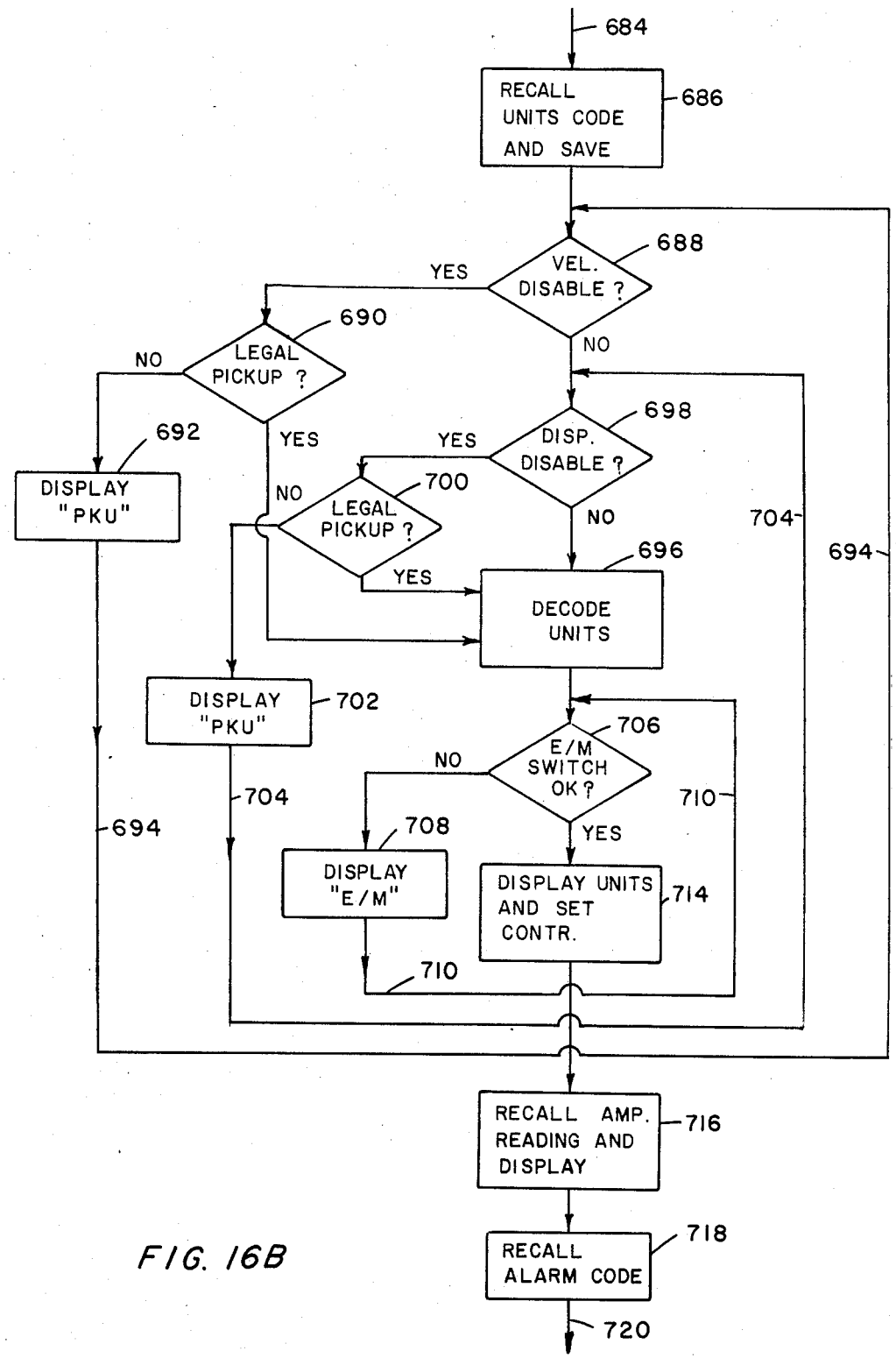
Figure 16C:
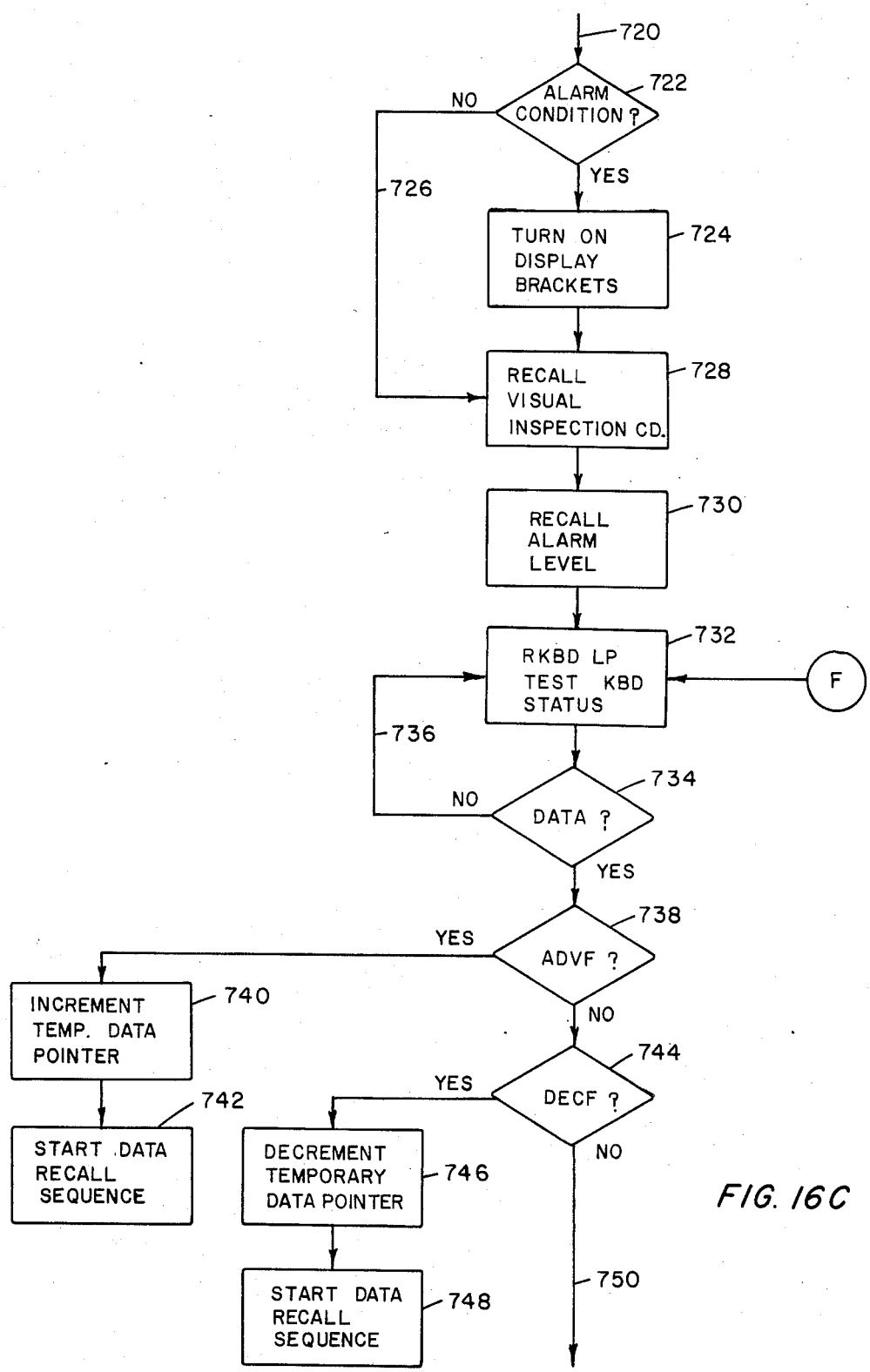
Figure 16D:
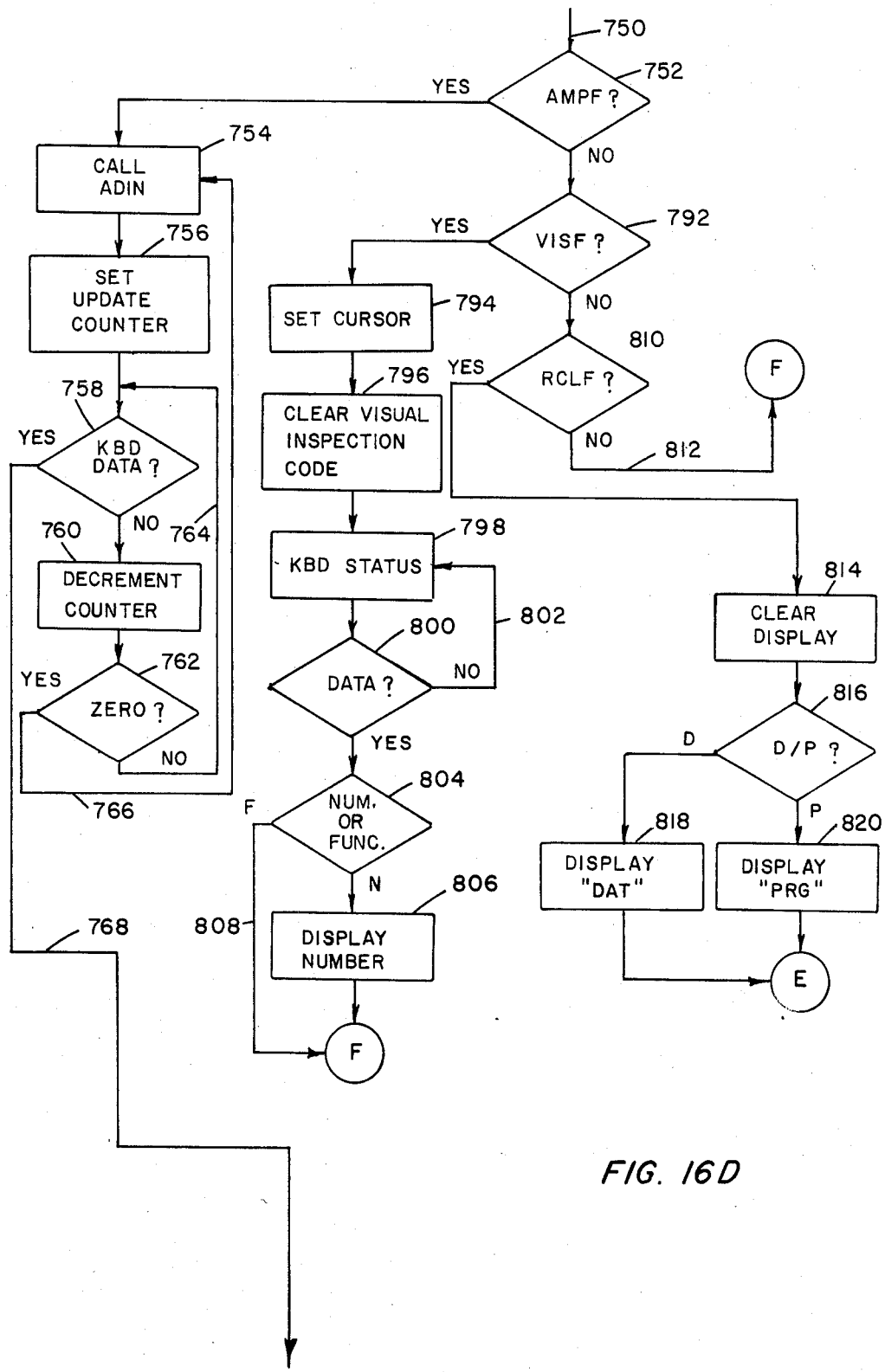

Referring to FIGS. 15A and 15B, the advance function service routine as described in conjunction with block 304 is illustrated as commencing with terminal 592 labeled "ADVF". The advance function is carried out in response to a legal actuation of the advance key labeled "ADV" and, as represented at block 594, initially looks to the current address or data pointer, increments the final length of the data block and returns. Following this activity, as represented at block 596, an inquiry is made as to whether switch 26 is in a program or data input mode. Where a program mode of operation is at hand, as represented at line 598 and node A, the main program is reaccessed at block 266. This follows inasmuch as in a program mode, for the most part, all that is desired is to move the point forward in order to carry out a next manual entry of data. However, where in a data input mode, the operator will wish to retrieve schedule information which is stored in memory such that a vibrational reading may be taken and stored in conjunction with such data. Additionally, the advance will apprise the operator of what form of measurement to make and where to make it. Accordingly, where the switch 26 is in a program mode as determined by the query at block 596, as represented at block 600, a test is made of an appropriate register to determine whether or not the entire schedule has been accounted for. If the query at block 600 represents an end of data, then as represented at block 602 the term "END" is displayed and as represented at line 604 and node A, the main program is reaccessed at block 266.

Where the end of data max count as determined at block 600 is not reached, then as represented at block 606 the next scheduled machine number is fetched and displayed. This display will range from 1 to 4 digits in length. As represented at block 608, the program then fetches and displays position number for the transducer 18, two digit spaces being available for such readout. As represented at block 610, the service routine then fetches and displays the requisite direction for measurement being indicated by the letters H, V, or A. The program then progresses as represented by line 612 to block 614 of FIG. 15B wherein the units code is fetched and saved.

Inasmuch as the operator may utilize an incorrect transducer or pick-up 18 for the scheduled data retained within instrument 10 in the data input mode, the instant service routine checks to determine the appropriateness of such transducer. In the program mode arrangement described in conjunction with FIG. 7, the operator was prevented from entering improper units data. However, in the data input mode, in accordance with the instant invention, the operator is caused to alter the pick-up or transducer 18 to a correct one by the display of an error message. Accordingly, as represented at block 616 a determination is made as to whether the velocity integration stage 124 has been disabled by virtue of a signal applied to switch S1 along line 186. In the event that stage 124 is disabled, then as represented by block 618, a determination is made as to whether a legal transducer 18 is attached by virtue of comparing the units code appropriate to the effective opening of switch S1. Where, for example, an acceleration units datum is present in memory, the query at block 618 will result in a yes answer and, as represented at line 620, the units will be decoded as represented at block 622. However, where the query made in conjunction with block 618 is in the negative, as represented at block 624 the term "PKU" representing pick-up will be displayed at readout 22 and, as represented by loop line 626, the routine will loop until such time as a proper pick-up is provided. Where the inquiry at block 616 results in a negative response and integration stage 124 is active, then, as represented at block 628, an inquiry is made as to whether the displacement integration stage 162 is disabled by virtue of the effective opening of switch S2. Where the stage is disabled, as represented at block 630, a next determination is made as to whether the pick-up or transducer 18 is legal or proper. For example, a velocity signal will be generated from an accelerometer type pick-up for the instant logic. Where the determination at block 630 shows that the pick-up is not legal, then, as represented at block 632, the term "PKU" will appear at readout 22. Additionally, as represented by loop line 634, the control program will dwell until such time as an appropriate transducer 18 is affixed to instrument 10.

Following the above analysis of the transducer utilization in conjunction with scheduled units measurement, the routine then progresses to the inquiry at block 636 wherein the orientation of English/metrics selection switch 42 is checked. Where that switch is in the wrong orientation for the scheduled readout, then, as represented at block 638, the readout 22 will display the term "E/M" representing an incorrect switch position. As represented by loop line 640, the routine will dwell in that position until such time as switch 42 is properly adjusted.

With a proper switch 42 orientation, the program then proceeds to block 642 wherein the appropriate units are displayed and controls are set. Following the instructions at block 642, the program then progresses to block 644 at which position, any alarm levels which may be stored in the maintenance schedule are brought forth and displayed. Any other data which may be stored will be brought up and displayed in conjunction with the instructions at block 644. With such display, as represented by line 646 and node A, the routine exits to the main program keyboard polling instruction as represented at block 266 in FIG. 4A.

In the event that the operator wishes to re-examine data and information which has been stored previously in the memory of instrument 10, the recall function is utilized, a key with that label being provided within assembly 20. Such recall, for example, may be to revise data in which the confidence level of the operator was not sufficient or to revise earlier inserted visual condition data for the machine being considered. The recall service routine is developed in conjunction with the main program at block 304 as described in conjunction with FIG. 4B and, referring to FIG. 16A-16E, the recall function is entered at terminal 648 labeled "RCLF". Upon entry into this routine, as represented at block 650, a recall flag is set to provide assurance to the control program that the recall function is under way, pointers being manipulated in the course of this more detailed routine.

As represented at block 652, the routine then carries out a display of the term "RCL" at readout 22, following which a determination is made as to whether instrument 10 is in a data input or program mode as represented at decision block 654. This distinguishment between the modes is necessary, inasmuch as in the program mode approach to this function, a search for desired data must be carried out with respect to an entered machine and position number. Assuming that the determination at block 654 shows a program mode of operation, then the routine progresses to the instructions at block 656 wherein a temporary address pointer is set up which serves to commence comparative analysis at the beginning of the entire block of data retained within memory. The comparison is made from the machine and position number which the operator has inserted manually and are presented at readout 22. Thus, as represented at block 658, the program fetches the machine and position number from that display. As represented at block 660, the procured machine and position number then are stored in temporary scratchpad register. The routine then progresses to block 662 wherein instructions are provided for recalling the elected machine and position number from the data block and carrying out comparisons between recalled and desired data in accordance with the instructions at block 664. Accordingly, where a match is not present between the displayed data and that recalled, the routine progress to block 666 wherein the temporary address pointer described above is incremented to a next successive position in memory. With such incrementation, as represented by loop line 668, the routine returns to block 662 and carries out this incremental comparison procedure until a match of displayed and recalled data is detected in accordance with block 664. With such a match being present, as represented in line 670, the routine stores the temporary address pointer as represented at block 672. This step is important, inasmuch as the current data address must be saved such that the program can return to that location later in the routine.

From the instructions in block 672, the data input and program modes follow a generally common program. Accordingly, returning to block 654, where the recall function is initiated when instrument 10 is in a data input mode, then as represented at block 674, the current data address is fetched and, as represented at block 676 the address is decremented by one block length. Accordingly, in the data input mode the operator will recall the last data block in sequential order. Returning to block 672, with the storage of the temporary address pointer, the program commences to recall data stored at that position. In this regard, block 678 indicates that the machine number is recalled and displayed, the position number is recalled and displayed as represented at block 680, the direction is recalled and displayed as represented at block 682 and as represented at line 684 and block 686, the units code is recalled and saved. Looking to FIG. 16B, the recall function next is seen to carry out a check of the units recalled and their appropriateness with respect to the type of transducer or pick-up 18 utilized. Thus, an analysis is carried out similar to that described in conjunction with FIG. 15B and the advance function service routine. In this regard, as represented at block 688, an initial determination is made as to whether the velocity integration stage 124 has been disabled. In the event that it is disabled, then as represented at block 690, an inquiry is made as to whether the transducer 18 coupled with unit 10 is legal for a condition of stage 124 disablement. In the event that it is not, as represented at block 692, the term "PKU" is displayed at readout 22 and, as represented at loop line 694 the program dwells until such time as a proper transducer is installed. Where the inquiry at block 690 results in an affirmative answer, then the program progresses to block 696 wherein the units recalled are decoded.

Where the inquiry at block 688 results in a negative response the routine progresses to the inquiry represented at block 698 which determines whether integration stage 162 is disabled. In the event that switch S2 is open, then the program proceeds to block 700 at which position a determination as to whether the transducer 18 is legal is made. In the event of a negative answer to the inquiry, then as represented at block 702 the term "PKU" is displayed at readout 22 and as depicted by loop line 704 the routine dwells until such time as an appropriate transducer is coupled to instrument 10. Where the inquiry at block 700 results in an affirmative response, then the routine progresses to decode the units as represented at block 696. This activity also takes place in the presence of a negative response to the query posed at block 698. Upon decoding the units in memory, the routine then determines whether the units recalled are appropriate to the orientation of English/metric switch 42 as represented at block 706. Where a discrepancy exists between the position of switch 42 and the recall units, then as represented at block 708, the term "E/M" is displayed at readout 22 and as represented by loop line 710, the routine dwells until such time as proper switch orientation is effected. Where the query at block 706 is answered in the affirmative, then the routine carries out a display of the units at readout 22 and a setting of controls as represented at block 714. The program then proceeds to recall the amplitude reading and effect the display thereof at readout 22 as represented at block 716 as well as to recall the alarm level as represented at block 718. The routine then progresses as represented by line 720 to block 722 in FIG. 16C. It may be observed that block 722 looks to the presence of an alarm condition. In this regard, at any time that the alarm level and amplitude information are present at readout 22, a determination will be made for an alarm condition. In the event that an alarm condition does exist, then as represented at block 724, the amplitude display is enclosed in brackets at readout 22. In the event that no alarm condition exists, then as represented by line 726 and block 728, the routine progresses to recall the visual inspection code. This same instruction is reached following the display of brackets as represented at block 724. Upon recalling the visual inspection code, the alarm level is recalled as represented at block 730.

At this juncture, the operator has the opportunity to observe the recalled data displayed at readout 22 and the routine permits a decision as to whether to revise any of the values so displayed. Further, the operator may wish to look again at a reading previous to that displayed or sequentially advanced from that and the program now permits the calling up of other blocks of data for revision. Looking to block 732, an instruction is given to test the keyboard status, a minor subroutine (FIG. 22) being available for that purpose. The service routine then progresses to the inquiry at block 734 as to whether data are present and in the event of a negative response, as represented by loop line 736, the program dwells until such data become present. An affirmative response to the query at block 734 leads to a next query represented at block 738 determining whether the advance key has been actuated. Where that is the case, then as represented by block 740, the temporary data pointer is incremented and, as represented at block 742, the data recall sequence is recommenced with respect to the block of data to which the temporary data pointer has been incremented. Where the advance key has not been actuated, then as represented at block 744, a determination is made as to whether the decrement key of assembly 20 has been actuated. In the event that it has, then the routine proceeds as represented at block 746 to decrement the temporary data pointer. Upon completion of this movement, as represented at block 748 the data recall sequence is recommenced. Where the determination at block 744 is negative, then as represented at line 750 and block 752 at FIG. 16D, an inquiry is made as to whether the amplitude key has been actuated. In the instant mode, such actuation represents a desire on the part of the operator to update an amplitude reading. In this regard, with an affirmative response to the inquiry at block 752, as represented at block 754, the analog-to-digital input program (ADIN) described in conjunction with FIGS. 11A and 11B is called. Upon completion of the ADIN serive routine, as represented at block 756, the update counter described in conjunction with block 264 in FIG. 4A is set to arrange for half second update timing. The routine then progresses to the inquiry at block 758 wherein a determination is made as to whether keyboard data are present. In the event of a negative response, then as represented at block 760, the update counter is decremented and the program progresses to the inquiry at block 762 wherein an inquiry is made as to whether the counter has reached zero. In the event that it has not, the routine loops as represented at line 764 to the input to block 758. Where a zero valuation is determined as represented at block 762, then the routine returns to the ADIN service routine represented at block 754 as depicted by loop line 766.

Where the inquiry represented at block 758 indicates that keyboard data are present, then as represented by line 768 leading to block 770 in FIG. 16E, the data are decoded such that the keyboard command can be carried out. For example, an actuation of the advance key as represented at line 772 will result in the incrementing of the address pointer and the recalling of data as described above and as indicated at block 774. Similarly, as represented at line 776, a command decrement from keyboard assembly 20 results in the instruction at block 778 wherein the address pointer is decremented and data are recalled. An actuation of the amplitude key of assembly 20 is represented at line 780 leading to block 782 wherein manual ranging is permitted to be carried out. An actuation of the visual inspection key, as represented at line 784 leads to the instruction at block 786 permitting the modification of the visual inspection code and, as represented at line 788, an actuation of the store key of assembly 20 results in the instructions as represented at block 790 wherein the display data is stored at a temporary address. Following the instructions represented at blocks 774, 778, 782, 786 and 790, the routine is shown to return to node F leading to block 732 in FIG. 16C at which position, the keyboard again is tested for entries.

Returning to FIG. 16D, with a negative response to the inquiry at block 752, the service routine progresses to determine whether the visual inspection key has been actuated as represented at block 792. Where this is the case, the operator wishes to update the visual inspection code and, as represented at block 794, the cursor, remaining invisible, is set at the appropriate position within readout 22 and, as represented at block 796 the then present visual inspection code is cleared. Following the clearing of this inspection code, as represented at block 798, the routine awaits a keyboard assembly 20 command, and as represented at block 800, a query is made as to whether data are present from the keyboard. In the event of a negative response, then as represented at loop line 802, the routine dwells until an input is received. Where data are present, then as represented at block 804, a test is made to determine whether the data represent the actuation of a numeric or functional key within assembly 20. In the event that a numerical key has been actuated, then as represented at block 806 the corresponding number is displayed at readout 22. The routine then progresses to node F leading to the keyboard polling function of block 732 as described in FIG. 16C. Where the test at block 804 indicates that a function key has been actuated, then as represented at line 808 leading to node F, the keyboard polling instruction at block 732 is reaccessed.

Where the inquiry at block 792 indicates that the visual inspection key has not been actuated, then as represented at block 810 a determination is made as to whether the recall key of assembly 20 has been actuated. The reacll mode of performance of instrument 10 can be terminated only by a second actuation of that key. Accordingly, where no such actuation is present as represented at line 812, the routine returns to the node F position leading to block 732. On the other hand, where the test at block 810 indicates that the recall key has been actuated, then as represented at block 814, the display at readout 22 is cleared and, as represented at block 816, a determination is made as to the position of mode switch 26 with respect to program or data input operation. Where data input operation is at hand, then as represented at block 818, the term "DAT" is displayed at readout 22 and the service routine is exited as represented by node E leading to block 254 in FIG. 4A. Where the test at block 816 indicates that a manual mode orientation is established at switch 26, then as represented at block 820, the term "PRG" is displayed at readout 22 and the service routine is exited as described in conjunction with node E.

Where desired, the number of keyboard functions to which the program responds may be expanded beyond those represented at blocks 752 and 792 or as cataloged at block 770. For example, such expansion may include alarm level, machine number, position, direction and units designation.

Looking to FIG. 17, the INITI or initialization subroutine called for a block 252 in FIG. 4A is described as commencing at terminal 822 labeled "INITI". The instructions given for this subroutine are represented at block 824 and call for typical power up exercises including the initialization of the stack pointer, the setting of the calendar clock functions with respect to the load features thereof in accordance with the oscillator input actually being used in conjunction therewith. All control registers and counters are initialized. Following this procedure, the subroutine exits at node E shown leading to block 254 in FIG. 4A.

Figure 18A:
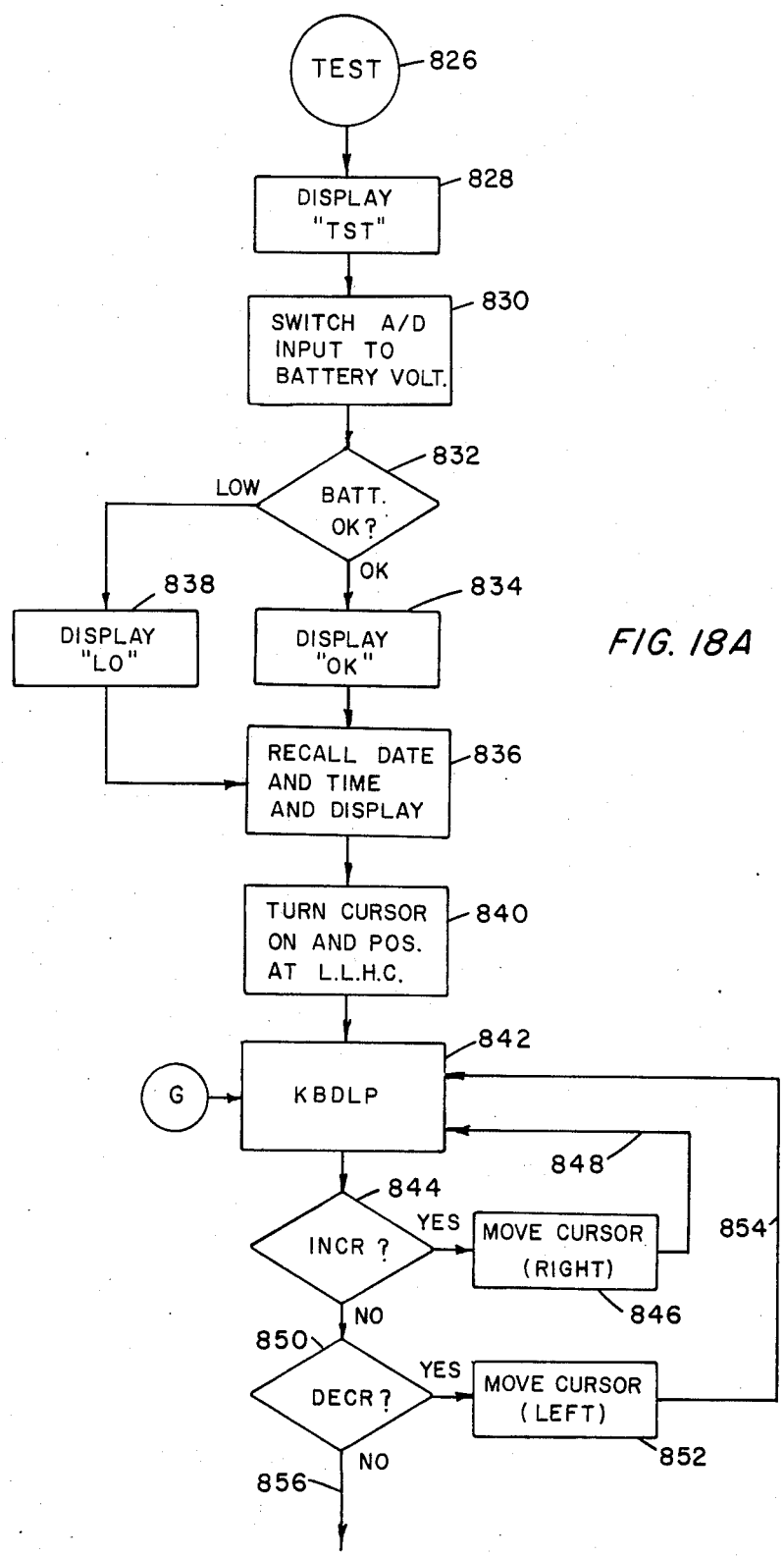
FIGS. 18A and 18B are a flow diagram of the test subroutine of the microinstructions of the control circuit of the invention.
Figure 18B:
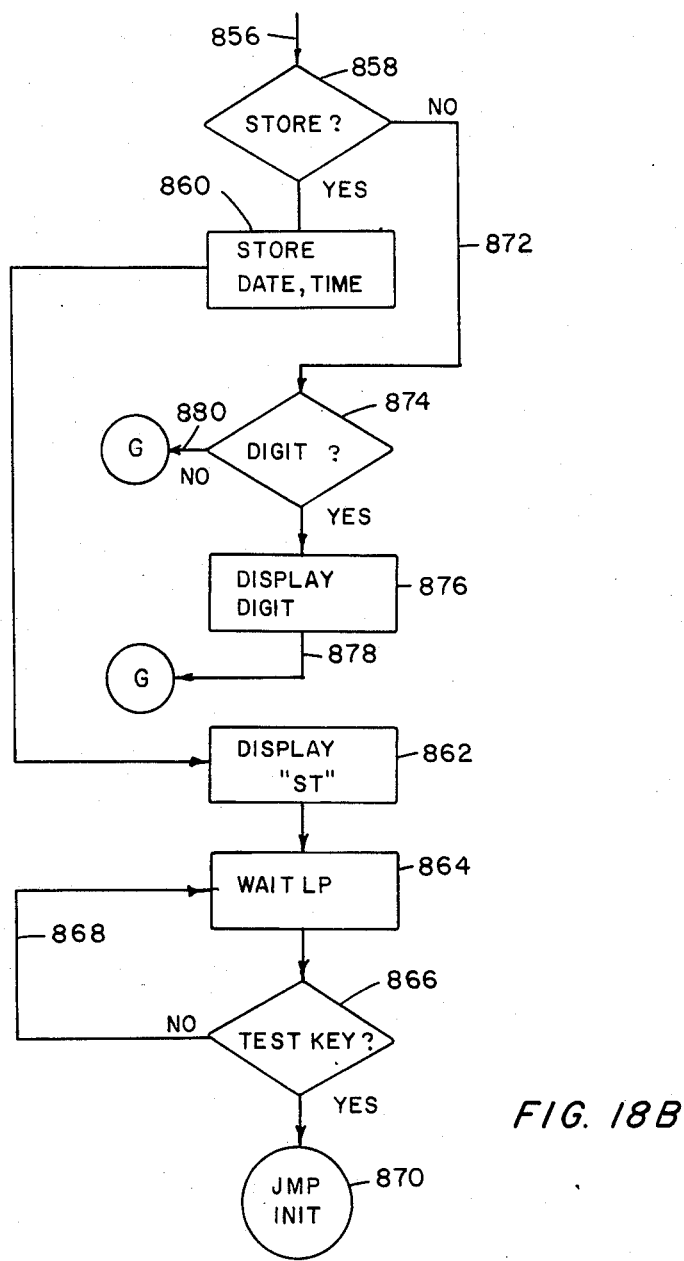

Referring to FIGS. 18A and 18B, the control program for a test procedure of instrument 10 is depicted. This test procedure has been described earlier in conjunction with the exemplary readout display described in conjunction with Example 1. The control service routine is entered as represented in conjunction with block 304 of FIG. 4B and is shown in FIG. 18A to commence with terminal 826 leading to a first instruction at block 828 causing the term "TST" to be displayed in the upper left-hand corner of readout 22. Following this display, as represented at block 830, the battery voltage input 100 to select function 98 in FIG. 3A is asserted such that the line 106 to the amplitude meter 24 is representative of battery voltage which is read on a lower scale of the meter. The program then proceeds to the query at block 832 determining whether the voltage level of the battery is adequate. Where it is adequate, as represented at block 834, the term "OK" is displayed at readout 22. Next, as represented at block 836 the date and time are recalled and displayed as shown in Example 1. Where the inquiry at block 82 shows a low battery condition, then as represented at block 838, the term "LO" is displayed at readout 22 and the program progresses to above-described block 836. The program then turns the cursor visibly on and positions it at the lower left-hand corner of readout 3 as described at block 840. The service routine then looks for an operator input for carrying out any adjustments to the date and time display as represented at keyboard loop (KBDLP) block 842. Where the advance key of assembly 20 is actuated at this point in time, as represented at block 844 an incrementation of the cursor is called for and as represented at block 846 the cursor is moved one increment to the right in readout 22. Following such movement, as represented at loop line 848 the routine returns to the keyboard loop input at block 842. Where the advance key is not actuated by the operator, the routine progresses to the inquiry at block 850 wherein a determination as to whether the decrement key within assembly 20 has been actuated. Where this is the case, as represented at block 852, the cursor is moved in a left direction one increment. Following such movement, as represented at loop line 854, the routine returns to the keyboard loop monitoring function represented at block 842. Where a negative response is derived in conjunction with the inquiry at block 850, as represented at line 856 leading to block 858 in FIG. 18B, a determination is made as to whether the operator has elected to store the data initially displayed. This is carried out by actuating the STORE key of assembly 20. Accordingly, where an affirmative indication results from the query at block 858, as represented at block 860 the date and time displayed are stored. The routine then progresses to block 862 showing a next instruction for displaying the term "ST" in readout 22. Following such storage, as represented at block 864, the routine enters a wait loop pending the operator's election to exit the test mode. This election is made by again actuating the test key of assembly 20 and the determination as to whether such actuation has been made is provided at block 866. Where no second actuation of the test key is made, then as represented by loop line 868 the routine dwells until the test key is actuated.

An affirmative response to the query at block 866 indicates that the operator has elected to leave the test routine and, as represented at node 870, a position as represented earlier at block 252 of the main program in FIG. 4A (JMP INITI) is entered.

Returning to the query as to whether the STORE key has been actuated by the operator described in conjunction with block 858, in the event that no such actuation has been provided, then as represented by line 872, the routine progresses to the query represented at block 874 wherein the determination is made as to whether a digit resulting from the actuation of a numerical key of assembly 20 has been presented to the program. In the event of an affirmative response, then the selected digit is displayed as represented at block 876. Following such display, as represented at line 878 and node G, the routine returns to the keyboard monitoring instructions described in conjunction with block 842. Similarly, in the event that no numerical key has been depressed, then as represented at line 880 and node G, the routine returns to the keyboard monitoring function described at block 842. Thus, with the service test routine as above described, the operator may position the cursor beneath the digital information displayed at readout 22 and by subsequently actuating a numerical key and a store key, the calendar or time information can be altered. Generally, such an adjustment of values will take place at the commencement of any given schedule of maintenance rounds.

Figures 19, 23:
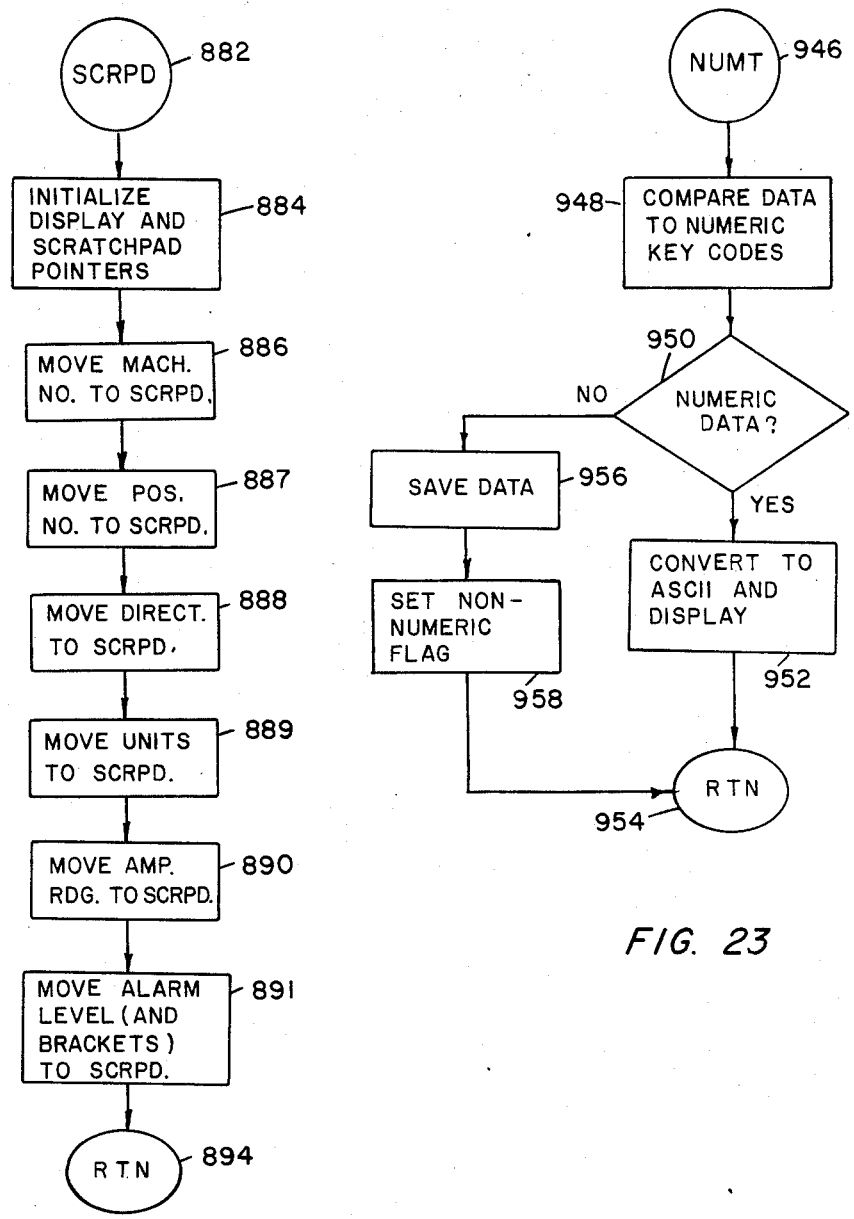
FIG. 19 is a flow diagram of the scratchpad subroutine of the microinstructions of the control circuit of the invention.
FIG. 23 is a flow diagram of the data numeric subroutine of the microinstructions of the control circuit of the invention.

Referring to FIG. 19, a utility routine is described which may be categorized as a "Display To Scratchpad Transfer" routine. The routine is used in accepting data from other devices or also when data are stored in the memory of instrument 10 from the readout 22. The routine, labeled "SCRPD" at terminal 882 generally is called in the course of a transfer function and also in conjunction with carrying out a store function. At the commencement of the routine, as represented at block 884, both readout or display and scratchpad pointers are initialized. One of these pointers sets up the initial field position in the display at readout 22, for example, at the start of machine number and the other pointer sets up a corresponding location in the support or scratchpad block of memory. In this regard, such instruction is set forth at block 884. Upon initialization of the pointers, as represented at block 886, the machine number is moved to scratchpad. Then, as represented at the succession of block 887-891, the digits representing position, direction, units, amplitude reading and alarm level along with brackets if present are moved to the scratchpad register. Following this manipulation, then the program may turn the data into more compact, BCD form for simplifying the management thereof. At the termination of movement of all data to scratchpad, as represented at terminal 894, the utility routine returns to the position from which it was called.

Referring to FIG. 20, the store function service routine described in conjunction with block 304 of FIG. 4B is detailed. This routine, labeled "STOF" is shown to be entered at terminal 896, whereupon it calls the scratchpad (SCRPD) routine described above in connection with FIG. 19. The displayed data thus is moved to scratchpad memory and the routine progresses to the instructions represented at block 900. Under these instructions, the scatchpad data are fomatted to more convenient form and stored in memory, following which, the term "ST" is displayed at readout 22. With this display, as represented at terminal 904, the routine returns to the position from which it was called. The calling of the routine can either be by the operator actuation of the store key or by a data input routine.

In the course of the principal and service programs, where alarm data are present and vibration related readings are called for readout at display 22, then the program will call an alarm threshold subroutine labeled "ALTH" in FIG. 21 and shown the commence with terminal 906. As represented at block 908, the amplitude level to be examined is procured following which, as represented at block 910, the location of the decimal point for that level is determined. With the arrangement at hand, in effect, a determination of what power of 10 is involved with the three digit number and a form of "exponent" is developed based upon the position thereof. Accordingly, as represented at block 912, the exponent location of the amplitude reading is determined and stored. The routine then procures the alarm level from storage as represented at block 914 and determines, as before, the decimal point location for that alarm level as represented at block 916. The alarm level "exponent" is then set and the routine carries out a comparison of decimal point locations. In this regard, as represented at block 920, an initial determination is made as to whether the decimal point of the amplitude reading is within a range which is greater than the corresponding decimal point position range of the alarm value. Thus, no particularly complex computation is needed for this initial test. In the event that no alarm condition exists, then as represented by line 922 the subroutine returns as represented at line 924 to an alarm threshold analysis completion position in the program as represented by return terminal 924. Where the query at block 920 determines that the amplitude decimal point range is not less than the alarm range, then as represented at block 926, a determination s made as to whether the amplitude decimal point range is greater than the alarm range and in the event of an affirmative response, as represented at line 928 and instruction block 930, the brackets are turned on within display 22 surmounting the amplitude reading. The program then returns as represented at terminal 924. Where the inquiry at block 926 results in a negative response, then the ranges of the decimal points of the two values generally will line up and a straightforward comparison of the values is made as represented at block 932. Where the alarm value is less than the amplitude reading value, then the routine progresses to block 930 to turn on the brackets. However, where the opposite is the case, then the routine progresses, as before, to return terminal 924.

Referring to FIG. 22, a utility routine called for frequently in conjunction with determining whether or not a key has been actuated within assembly 20 is shown to be entered at terminal 934 labeled "KBDLP". As represented at block 936, the first instruction of this utility routine is to test the status of the keyboard of assembly 20. This test is carried out with the query represented at block 938 wherein a determination as to whether any data are present from the keyboard. In the event of a negative response to this query, as represented by loop line 940, the routine dwells or loops until such time as data are present. With an affirmative response to block 938, as represented at block 942 the keyboard data register is read and, as represented at terminal 944 the routine returns to the position from which it was called.

Referring to FIG. 23, another utility subroutine is displayed as commencing with terminal 946 and which is labeled "NUMT". This subroutine determines whether or not a numerical or digit key of assembly 20 has been actuated or whether a function key has been actuated by the operator. In the event that a function key is actuated, it is convenient to set a flag in memory to indicate that a non-numeric key has been actuated and function is required to be executed. Accordingly, as represented at block 948, the data developed from keyboard assembly 20 are compared to numeric key codes. As represented at block 950, a determination is made as to whether the data are numeric and if that is the case, as represented at block 952, the data are converted to ASCII and displayed, whereupon the subroutine returns to its position of entry as represented by terminal 954. Where the inquiry at block 950 determines that numeric data are not present, then the resultant functional data are saved as represented at block 956 and as represented at block 958, a non-numeric flag is set to alert the program to be called for a functional execution.

FIG. 24 illustrates another utility subroutine which is called to clear the non-numeric flag set in conjunction with block 958 of FIG. 23. This subroutine is shown to commence at terminal 960 labeled "CNFG" and proceeds to clear the non-number flag as represented by the instruction at block 962. The functional data then are restored for decoding and the corresponding function is executed. The subroutine then, as represented at terminal 966, returns to the keyboard loop described in conjunction with FIG. 22.

FIG. 25 illustrates the election of a clear function as represented at block 304 in FIG. 4B. This function is carried out by the operator actuating the clear function key within assembly 20 and is shown entered at terminal 968. As represented at block 970, with the actuation of the clear key, the display at readout 22 initially becomes blank and the program returns as represented at line 972 and node E to the position of block 254 in FIG. 4A.

Accordingly, the mode is always refreshed in correspondence with the position of mode switch 26. Additionally, there always will be some units displayed inasmuch as it is not desirable to open circuit the signal conditioner functions as described in connection with FIG. 3A. This also assures that the readout meter 24 maintains a desirable stability.

Figure 26:
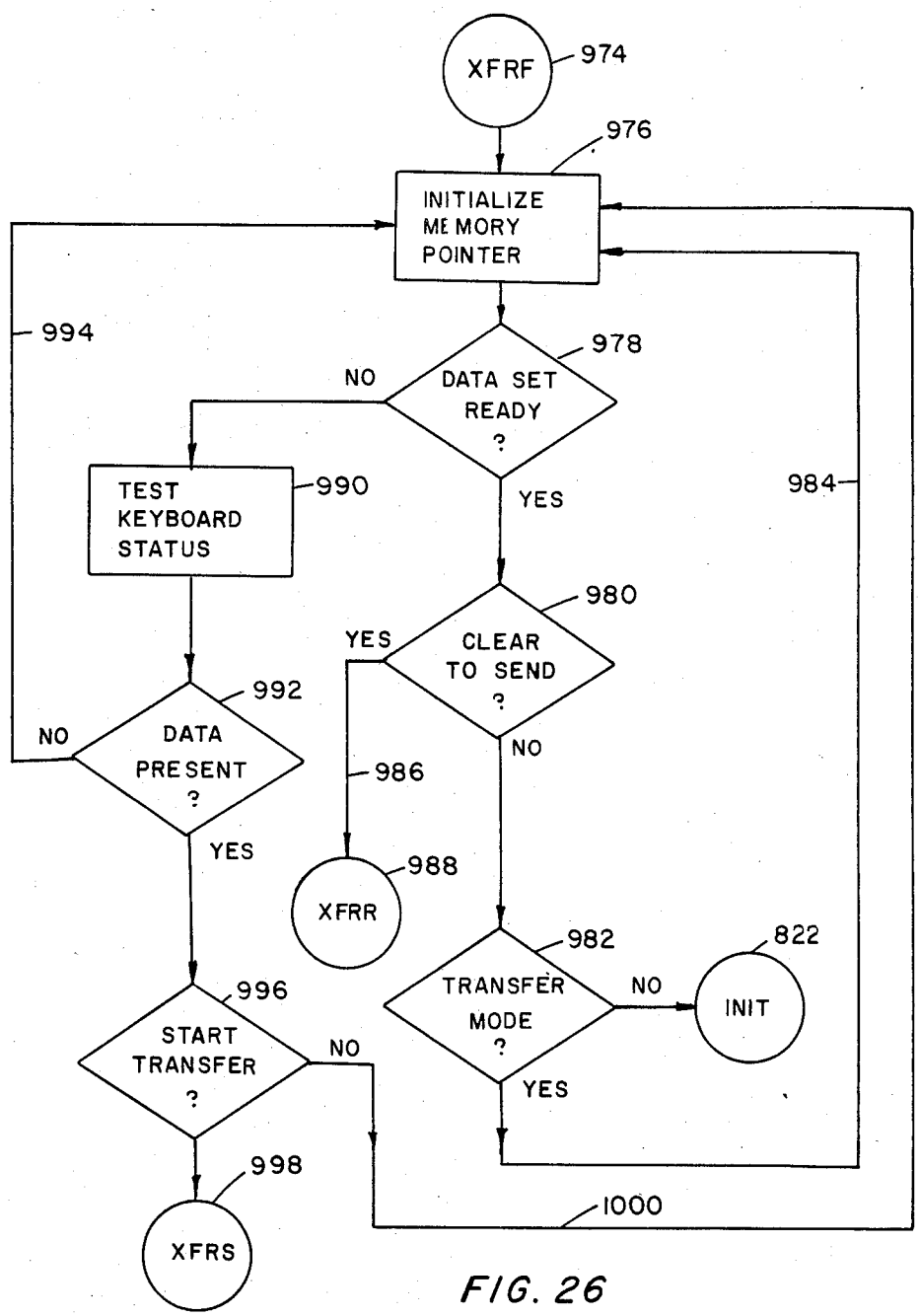
FIG. 26 is a flow diagram of the transfer function subroutine of the microinstructions of the control circuit of the invention.

Referring to FIG. 26, the service routine for use in carrying out the transfer of data either from instrument 10 to peripheral units or from such unit to the instrument 10 is revealed, the election of such function being made in conjunction with the main program block listing 304 as described in conjunction with FIG. 4B. Generally, even more basic printing devices as at 32 will appear to the program as a transmitting device. As a consequence, receiving loops and request to send type signals are required. The transfer function initially is entered into by the operator manipulation of mode switch 26 to the "XFR" orientation. Looking to FIG. 26, the transfer function service routine is shown entered at terminal 974 which causes the mode message "XFR" to be displayed at readout 22. The instant subroutine then initializes a memory pointer, inasmuch as the beginning of the data blocks must be identified to accommodate for either the loading of data into memory or the reading of data out of memory. Where a peripheral device such as processor 34 is utilized, such device will provide a data set ready signal indicating that a transmission to instrument 10 is desired. Such device then will send a clear to send or request to send signal. Thus, the instant subroutine commences to check for the presence of such flags as represented by the inquiries at block 978 and 980. Also, as represented at block 982, a continuous check is made as to the presence of the transfer mode, removal from this mode providing for an exit from the instant subroutine. In the latter regard, note that the negative inquiry at block 982 provides for return to an initialization subroutine described in conjunction with FIG. 17 and associated with main program block 252. Where the inquiry at block 982 is in the affirmative and the transfer mode continues, then the routine loops as represented by loop line 984.

Looking to a condition wherein data are received from a peripheral device, where the inquiry at block 978 or a dats set ready input is in the affirmative, and the corresponding inquiry for a CTS signal as represented at block 980 is in the affirmative, then as represented at line 986, a receiving loop is entered as represented at terminal 988 labeled "XFRR" and described in conjunction with FIG. 27.

Where a transfer of data is at hand, the inquiry at block 978 awaiting a data set ready input, will be in the negative and, as represented at block 990, the status of the keyboard of assembly 20 is monitored. Where data are not present, as represented at loop line 994, the subroutine returns to its entry point at block 976. On the other hand, where an affirmative response is received in conjunction with the query at block 992, then as represented at block 996 if the transfer key labeled "XFR START" of assembly 20 has been pushed, the routine progresses to carry out a data transfer subroutine as represented at terminal 998 representing a transfer start or send routine labeled "XFRS". This subroutine is described in conjunction with FIG. 28.

Now considering the reception of data, reference is made to FIG. 27 where the transfer receive routine is illustrated as commencing with terminal 988 and, as represented at block 1002, the routine provides for the sending of a clear to send flag or signal. As represented at block 1004, a line of the earlier described schedule information then is read into scratched memory. Recall, that such information is transmitted via RS232 input terminal 40. The noted line of schedule will always be a fixed block length. The data then are formatted, for example, in BCD form as represented at block 1006 and stored in memory, spaces remaining within the fixed block lengths in the absence of sufficient data such that corresponding components of data always are in the same location.

As represented at block 1008, the address pointer then is incremented and, as represented at block 1010, a limit pointer is incremented which will indicate the end of the data which has been stored. The latter pointer provides for showing an end of display and where data are transferred out, the pointer provides an end position for transferred data.

As represented at block 1012, an inquiry then is made as to whether instrument 10 remains in a transfer mode, in the event that it does, then as represented at block 1014 an inquiry is made as to the presence of a request to send signal and where no such signal or flag is present, as represented by loop line 1016, the routine dwells. Where an affirmative response is received from block 1014, as represented at loop line 1018, the subroutine is repeated for a next block of data. This routine continues until a full schedule is transmitted to the memory of instrument 10. Where the inquiry at block 1012 is in the negative, the transfer mode will have been changed and the subroutine exits to an initiation routine represented by terminal 822 as described in conjunction with FIG. 17.

In keeping with the philosophy of the system within which instrument 10 operates, all peripheral devices will appear essentially as identical. By this arrangement, the instrument may be utilized with less expensive peripheral devices such as sophisticated tape recorders or the printer 32, or, ultimately, may be used in conjunction with more advanced processing arrangements as described at 34 in FIG. 1. Looking to FIG. 28, the transfer send utility routine is illustrated, this routine representing a "duct" to any peripheral device which is entered by the operator actuating the transfer start key of assembly 20.

To achieve a formatted output for use with less sophisticated devices as printer 32, the same output format is utilized for all transfer of data from instrument 10. Accordingly, as represented at block 1020, the output buffer initially is loaded with spaces which are overwritten at all locations where a data bit is desired. This achieves the requisite constant format for operating either in conjunction with a printer as at 32 or more sophisticated devices as processor 34. Of course, the latter devices will retain a capability for carrying on more sophisticated manipulation of data received. The routine then carries out the instructions at block 1022 wherein the line counter is initialized to provide for monitoring of lines transmitted and, as represented at block 1024, the date and schedule number are written to the buffer. The routine then progresses to the instructions at block 1026 wherein the buffer contents representing the first line of data are outputted.

As represented at block 1028, the buffer again is filled with spaces and as represented at block 1030, the next line of data provides for the writing of a string of column headings initially establishing the format for any output to a printer. As represented at block 1032, these data then are transmitted from the buffer and, as represented at block 1034, the buffer again is filled with spaces. The routine then commences to carry out actual collected data transfer, the initial information being submitted to the buffer being a line number as represented at block 1036. This line number is computed by the simple expedient of incrementing the line counter. As represented at block 1038, the routine then reads and increments the data pointer by one block length and, as represented at block 1040 the count limit pointer is read to determine whether or not the routine is at the end of the data to be transmitted. In the latter regard, as represented at block 1042, the query is made as to whether the current address is greater than the end of data maximum count. In the event that it is not, then the pertinent data set is retrieved, formatted and written into the output buffer as represented at block 1044. The retrieved data then are transferred from the buffer represented at block 1046, the line counter is incremented as represented at line 1048 and the routine commences to fill the buffer with spaces again as represented by return line 1050 leading to block 1034. Where a max count is determined in conjunction with the query at block 1042, as represented at line 1052 and terminal 1054 labeled "XFRDN", the program enters a dwell awaiting for a key command from assembly 20, as discussed in conjunction with block 990 of FIG. 26.

The circuit implementation of instrument 10 is revealed in more detail in the discourse to follow. Looking to FIG. 30, the arrangement of FIGS. 29A–29C for consideration in the following discussion is presented. These figures, when combined, represent the microprocessor function, particularly as described in conjunction with border 52 in FIG. 3B. The microprocessor, which has earlier been described as a type 8085A, is reproduced in FIG. 29A having the same identifying number 210. The selected model is structured such that it incorporates a capability for receiving serially presented data from along line 1100 at its serial input data terminal, SID. In similar fashion, the microprocessor 210 provides for the outputting of data in serial form from its corresponding SOD terminal through a buffer stage containing line 1102. The reset output of microprocessor 210 is represented at line 1104 and serves to carry a signal providing for the resetting of all supporting electronic devices including I/O ports and the like on power up of the instrument 10. In conventional fashion, the read ($\overline{RD}$) terminal of microprocessor 210 is utilized to enable appropriate supporting components during a read sequence and is operatively coupled to line 1106 as well as to line 1105 extending to dual buffering stages 1107. The outputs of these stages are coupled to lines 1108 and 1110. Correspondingly, the write terminal, labeled $\overline{WR}$ of microprocessor 210 is coupled for signal output to line 1112 as well as through an OR gate stage 1113 to lines 1114 and 1116. Note that line 1112 is coupled through a pull-up resistor to +5 v. supply. The signal input to the reset input terminal of microprocessor 210 is derived from a +5 v. voltage supply and is provided from a pulse generating network 1118 and buffer stage which is activated upon each powering up procedure. An internal clock for the microprocessor is provided at terminals X1 and X2 operating in conjunction with a 1.2 MHz crystal arrangement represented at 1120. Ports AD0–AD7 of microprocessor 210 are coupled as shown by a bus system including 8 lead bus path 1122 which extends to the I/O ports of a grouping of four 2048-word × 8-bit high speed static CMOS random access memories (RAM) identified at 218a–218d. The $\overline{WE}$ and $\overline{OE}$ terminals of RAM components 218a–218d are shown coupled with respective lines 1116 and 1110 carrying write and read mode inputs from microprocessor 210.

As shown in FIG. 29C, bus path 1122 further extends to the data output ports $O_0$–$O_7$ of a grouping of four CMOS read only memories (ROM) 220a–220d. ROMS 220a–220d, may have a 2048 × 8 organization and may be provided, for example, as a type 2716. Additionally, bus path 1122 extends as represented at 1124 to the DV0–DV7 inputs of a liquid crystal display module, again represented by the number 22. Module 22 may, for example, be of a type LM032H marketed by Hitachi Corp. and provides a two-row, 20 character, 5×7 dot matrix readout in conventional fashion. The module at 22 is of LSI architecture and is readily data accessible in 8-bit fashion as shown.

Ports AD0–AD7 of microprocessor 210 also are coupled via bus path 1126 to the DI1–DI8 ports of an 8-bit I/O port 214a. Serving a decoder function, component 214a, may, for example, be provided as a type MM74PC12, 8-bit input/output port marketed by National Semi-Conductor Corp. Ports D01–D08 of decoder 214a are coupled through bus path 1128 to the address ports A0–A10 of RAM grouping 218a–218d. Bus path 1128 is shown in FIG. 29C further to extend as represented at path 1130 to the A0–A7 address ports of ROM components 220a–220d. The remaining address ports of the memory components are accessed from ports A8–A10 of microprocessor 210 from bus path 1132.

Figure 29A:
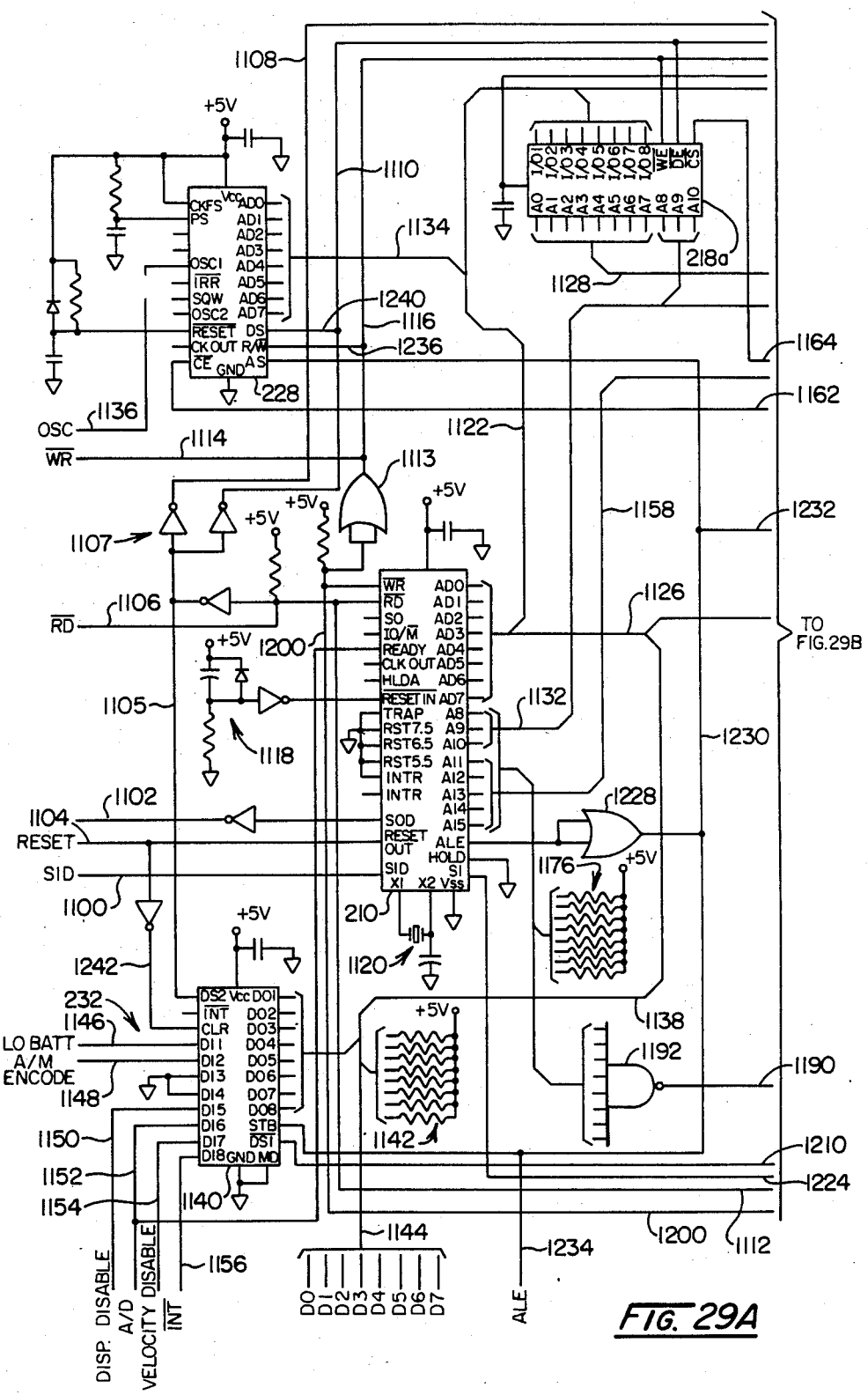

Looking to FIG. 29A, 8-bit bus path 1122 additionally is seen branching, as represented at path 1134, to the data ports AD1–AD7 of a real time calendar clock component represented, as in FIG. 3B by the number 228. Component 228 is of LSI architecture, providing calendar and time data at its output ports and operating in conjunction with an independent oscillatory input as submitted from along line 1136.

Bus path 1126, extending from the AD0–AD7 ports of microprocessor 210, additionally extends by a path represented at 1138 to ports D01–D08 of another type MM74PC12 I/O port 1140 serving as a first of two status registers for the circuitry of instrument 10. The inputs to these ports are associated with discrete pull-up resistors for connection with a +5 v. source as represented at resistor grouping 1142. Bus path 1138 further is shown to extend, as represented at path 1144, to a second status register 1250 described later herein in conjunction with FIG. 31A. Status register 1140 is shown to monitor the condition of a variety of functional components, for example, the low battery status is monitored at its terminal $DI_1$ as represented at line 1146, the automatic or manual orientation of function switch 26 is monitored at terminal D12 as represented at line 1148, the enablement of integrator stage 162 is monitored at terminal D15 as represented at line 1150, the activity of the analog to digital converter stage 106 at line 1152 is monitored at terminal $DI_6$; the velocity integration stage 124 enablement is monitored at line 1154 extending to terminal $DI_7$ and an interrupt signal input is monitored at line 1156 extending to terminal $DI_8$.

Figure 29B:
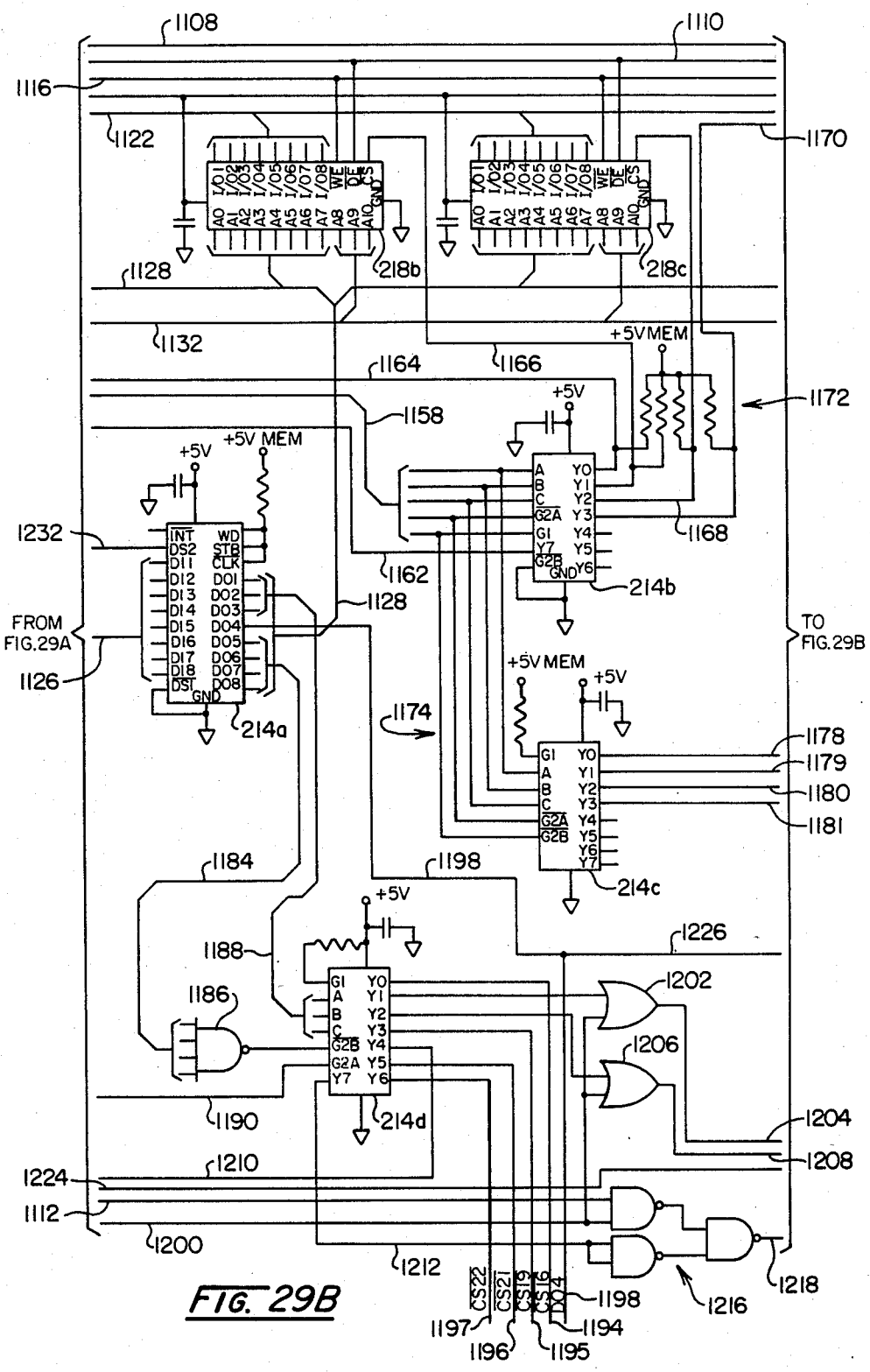

Address ports A11–A15 of microprocessor 210 are operatively coupled by a 5-lead bus path 1158 to the select and enable input ports of a decoder 214b shown in FIG. 29B. Decoder 214b may be provided, for example, as a type MM74PC138 3-line to 8-line decoder marketed by National Semi-Conductor Corp. and serves to provide for the selection of RAM components 218a–218c as well as calendar component 220a. In this regard, note that enabling line 1162 extends to the $\overline{CE}$ terminal of calendar component 228 (FIG. 29A), while select line 1164 extends to the chip select terminal of RAM 218a in that figure. Similarly, line 1166 serves to enable RAM 218b, while line 1168 serves to selectively elect RAM 218c and line 1170 serves to provide chip select input to RAM 218d (FIG. 29C). The output lines 1164, 1166, 1168 and 1170 as associated with the random access memory function are individually coupled with pull-up resistors and +5 v. voltage supply as shown at resistor grouping 1172. It may be noted that the power supply associated with these resistors is labeled +5 v. MEN. This particular power supply is associated with the random access memory function and is continuously asserted notwithstanding whether or not instrument 10 is in use. This continuous power supply is provided inasmuch as schedules and readings need to be maintained over a period of days.

Operative association with the enable and select inputs of another decoder 214c with microprocessor 210 terminals A11–A15 is provided by line grouping 1174 in consequence of its connection with appropriate leads of bus path 1158 as shown in FIG. 29B. Decoder 214, of the same type as decoder 214b, receives its power supply from the above-noted +5 v.MEN and functions to select appropriate ROMs within a grouping 220A–220D from along corresponding select lines 1178–1181. In this regard, note in FIG. 29C that line 1178 extends to the chip enable input of ROM 220a, line 1179 extends to the chip enable input of ROM 220b, line 1180 extends to the chip enable input of ROM 220c and line 1181 extends to the chip enable input of ROM 220d.

Returning to decoder 214a, it may be observed that ports D0₆–D0₈ thereof are operationally associated via bus path 1184 and NOR gate 1186 with the G2A enable input of a decoder 214d. The select input terminals, A–C of decoder 214d are operationally coupled through bus path 1188 with the DO₁–DO₃ ports of decoder 214a. The G2A terminal of decoder 214d is operationally associated with the A8–A15 address ports of microprocessor 210 through line 1190 and commonly coupled NOR gate 1192 (FIG. 29A). Note that the eight input lies to gate 1192 are each coupled through a pull up resistor of grouping 1176 to +5 v. supply.

Decoder 214d as above, may be of a type MM74PC138 3-line to 8-line variety and the outputs thereof serve to develop enabling type signal logic to a variety of components within the circuitry of instrument 10. For this purpose, chip select lines 1194–1197 are represented extending from respective terminals Y0, Y3, Y5, and Y6. Of these, line 1194 provides for a select function in conjunction with keyboard assembly 22, line 1195 provides for chip select input to the analog-to-digital function represented at block 106 in FIG. 3A, line 1196 provides input to the earlier discussed second status register 1250 and line 1197 provides one chip select function to the RS232 related circuitry associated with data transfer terminal 28 as described in conjunction with FIG. 31B. In the latter regard, line 1198 extending from the DO₄ terminal of decoder 214a additionally provides an enabling input to the same data transfer circuitry.

The Y1 output terminal output of decoder 214d is logically combined with a corresponding output of the write, $\overline{WR}$ terminal of microprocessor 210 at line 1200 as represented at OR gate 1202, to provide a units select enablement signal at line 1204. Similarly, the Y2 terminal of decoder 214d is combined at OR gate 1206 with the write logic signal at line 1200 to provide an amplitude range select logic signal at line 1208. The Y4 terminal of decoder 214d provides a selection input along line 1210 to the corresponding DS1 terminal of status register 1140 (FIG. 29A). Finally, the Y7 terminal of decoder 214d provides enabling signals along line 1212 in combination with the write signals at line 1200 and the read signals at line 1112 of microprocessor 210. These inputs are directed to NOR gate grouping 1216 to provide an output at line 1218 which is directed as shown in FIG. 29C through NOR gate 1220 and line 1222 to the DBO terminal of display module 22. In similar fashion, the E terminal of module 22 is coupled to the S1 terminal of microprocessor 210 from along line 1224. As an additional input to module 22, it may be noted that the signal at line 1198 extending from decoder 214a terminal D04 is directed via line 1226 to the RS terminal of module 22.

Returning to FIG. 29A, the latch enable output to the decoders, status registers and calendar component 228 is derived from the ALE terminal of microprocessor 210 and is directed through the common inputs of gate 1228 to line 1230. It may be observed that line 1230 is directed to the AS terminal of calendar component 228 as well as to the STB input terminal of status register 1140. Line 1230 further is coupled via line 1232 to the DS₂ terminal of decoder 214a and extends via line 1234 to the second status register 1250 described in connection with FIG. 31A.

Looking in further detail to the read and write terminals of microprocessor 210, it may be observed that the latter connection through gate 1113 to line 1116 also is coupled through line 1236 to the R/W terminal of calendar component 228. Similarly, the read, $\overline{RD}$, terminal of microprocessor 210 extends to the DS2 input of status register 1140 as well as through buffer stages 1107, line 110 and line 1240 to the DS terminal of calendar component 1228. Note additionally that the reset out terminal of microprocessor 210 extends through buffered line 1242 to the clear, $\overline{CLR}$, terminal of decoder 1140.

Figure 31A:
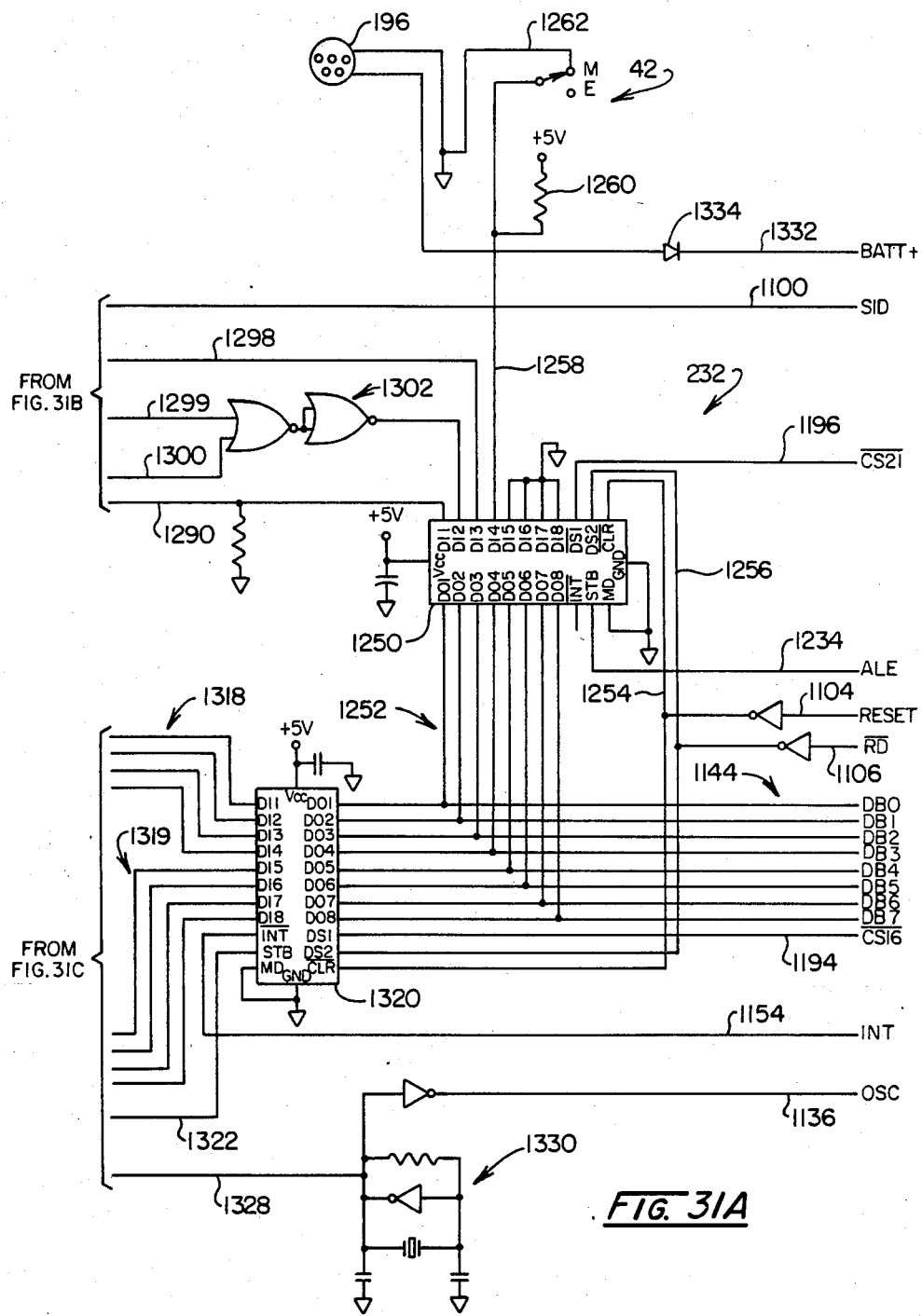
Figure 31C:
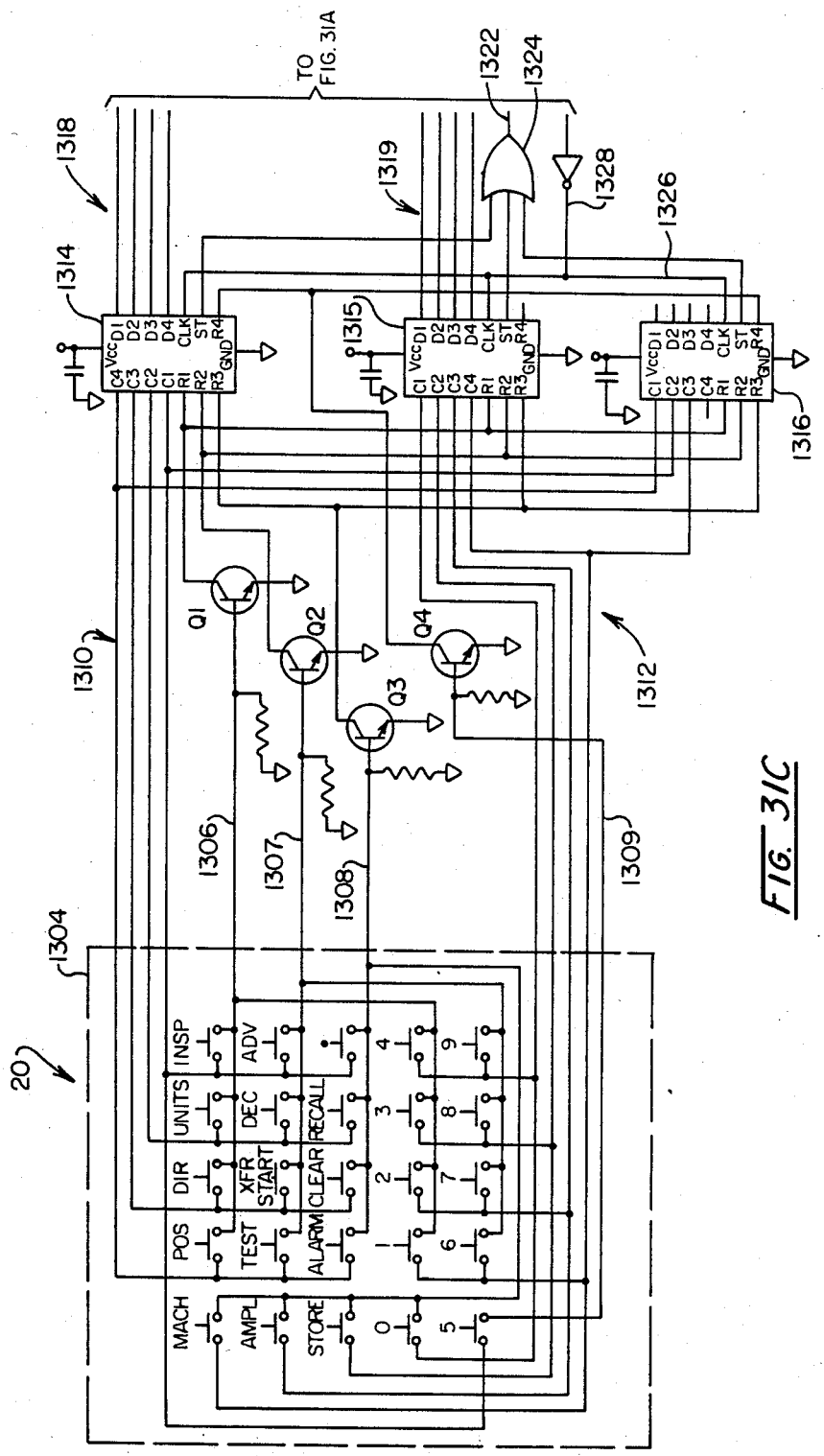

Referring to FIGS. 31A–31C, the second status register and further decoding functions are revealed, as well as circuitry for providing drive to RS232 connection 28 are illustrated. These figures should be considered in the orientations revealed in FIG. 32. FIG. 31A incorporates a variety of the input and output lines described above in conjunction with the description of FIGS. 29A–29C. In this regard, identical numeration is utilized to show the commonality of these lines. The second status register of instrument 10 is revealed at 1250 and is provided as a type MM82PC12 decoder in identical fashion as the decoder provided at 1140 in FIG. 29A. The D01–D08 terminals of decoder 1250 are coupled by line grouping 1252 to the corresponding leads of bus path 1144 shown extending from path bus 1138 and microprocessor 210 in FIG. 29A. In similar fashion as status register 1140, register 1250 receives the latch enable signal from line 1234, a reset input to the clear terminal thereof from along lines 1104 and 1254 and a read signal input from along lines 1106 and 1256, the latter line leading to the DS2 terminal of the component. The chip select signal derived from line 1196 (FIG. 29B) is directed to the DS1 terminal of the decoder. Component 1250 serves, inter alia, to monitor the status of the English/metric switch 42 which is schematically portrayed in the figure as being coupled through line 1258 to terminal D14. Note that line 1258 is conventionally coupled through a pull-up resistor 60 to a +5 v. source. The metric terminal of switch 42 is coupled to ground via line 1262. Accordingly, for an English unit orientation of the switch, a logic high level will be monitored by the status register 1250.

Looking to FIG. 31B, the drive circuitry for RS232 connector 28 is revealed, such circuitry additionally being associated with status register 1250. The driver arrangement includes a quad line driver 1264 utilized for the transmission of data to peripheral devices and a quad line receiver 1266 utilized for the reception of data from peripheral devices. Receiver 1266 may be provided, for example, as a type MC1489 line receiver silicon monolithic integrated circuit marketed by Motorola, Inc., while driver 1264 may be provided as a type MC1488 quad MDTL line driver marketed by Motorola, Inc. Looking to the transmission components, it may be observed that driver 1264 receives ±15 volts from along lines 1268 and 1269. This power is available to the driver only in a transfer mode orientation of switch 26. Data to be transmitted are derived ultimately from the serial SOD terminal of microprocessor 210 as presented from line 1102. A transmit enablement signal is provided to driver 1264 from along line 1270 which, in turn, extends from the $\overline{Q}$ terminal of a D flip-flop 1272. The d terminal of flip-flop 1272 is coupled to line 1198 which, in turn, derives from decoder 214*a* (FIG. 29B). Additionally, the clock terminal of flip-flop 1272 is coupled with the output of a NOR gate 1274 the inputs to which are provided from lines 1114 and 1197. It may be recalled that line 1114 is a write signal from microprocessor 210, while line 1197 derives from decoder 214*d* (FIG. 29B). With the arrangement, serially transmitted data signals are provided at line 1276 along with transmission or RTS type signals at line 1278. Flip-flop 1272 is reset from line 1280 in conjunction with the reception of data from connector 28.

Line receiver 1266 is coupled to connector 28 from along line grouping 1282 and is selectively powered in the transfer mode from a +5 v. source as represented at line 1284. The individual channel gates of component 1266 are coupled with this +5 v. power supply from along line 1286 through discrete resistors of the grouping shown at 1288. Line 1286 additionally is coupled to line 1290 and to the common inputs of NOR gate 1292, the output of which is coupled to the earlier-described line 1280 which serves a resetting function to flip-flop 1272. Line 1290 additionally extends to the DI1 terminal of status register 1250 to provide an indication of the presence of a transfer mode receiving condition. Line 1280 also extends to one input of each of a grouping of NOR gates shown at 1296, the opposite inputs to which are derived from the outputs of receiver 1266. Output lines 1298–1300 extending from gate grouping 1296 are coupled to status register 1250. Referring momentarily to FIG. 31A, it may be seen that line 1298 extends to terminal DI3, while lines 1299 and 1300 extend through NOR gate stages 1302 to the DI2 terminal of the register. These signals provide "hand shake" signal reception from more sophisticated peripheral devices as described in conjunction with processor 34 (FIG. 1). Additionally, line 1100, carrying serial input data (SID) from gate grouping 1296 to the microprocessor 210 corresponding terminal is shown extending across FIG. 31A. (FIG. 29A).

Referring to FIG. 31C, the decoding arrangement for keypad assembly 20 is revealed. The individual keys of the assembly are shown labeled within dashed border 1304 and may be seen to be structured such that one terminal each of the key switches is associated in combination with a select grouping of others with a transistor driver arrangement. In this regard, note that lines 1306–1309 extend, respectively, to the base electrodes of NPN transistors Q1–Q4. The opposite terminals of the key switches are provided from along line groupings 1310 and 1312. Transistors Q1–Q4 are configured to provide a driving arrangement for the key derived signals to avoid the development of false signalling which might otherwise be generated therefrom. The collector electrodes of transistors Q1–Q4 as well as the discrete lines within line groupings 1310 and 1312 are decoded by two-of-eight keypad-to-binary encoders 1314–1316. Encoders 1314–1316 may, for example, be provided as type MC14419 encoders marketed by Motorola, Inc. The D1–D4 output terminals of encoders 1314 and 1315 are coupled via respective line groupings 1318 and 1319 to the input terminals of I/O port 1320 shown in FIG. 31A. I/O port 1320 may be provided as an earlier-described type MM82PC12. The strobe input (STB) terminal of port 1320 is coupled through line 1322 to the output of an OR gate 1324 (FIG. 31C), the inputs to which derive from the strobe (ST) output terminals of encoders 1314–1316. Talking signals to encoders 1314–1316 are provided from along line 1326 and buffer containing line 1328.

Returning to FIG. 31A, it may be observed that line 1328 receives a clock signal from an oscillator network identified generally at 1330. Network 1330 operates in conjunction with a 32.768 KHz crystal and serves additionally to provide the oscillatory signal at line 1136 utilized by calendar component 228 (FIG. 29A). FIG. 31A additionally reveals the presence of the battery input connector plug 196. This plug receives a d.c. recharging input from a recharging device and transmits it along line 1332 which additionally incorporates a unidirectional diode 1334. Line 1332 is directed to the terminals of the rechargeable battery of the power supply of instrument 10 as described in conjunction with FIG. 35.

Figure 33A:
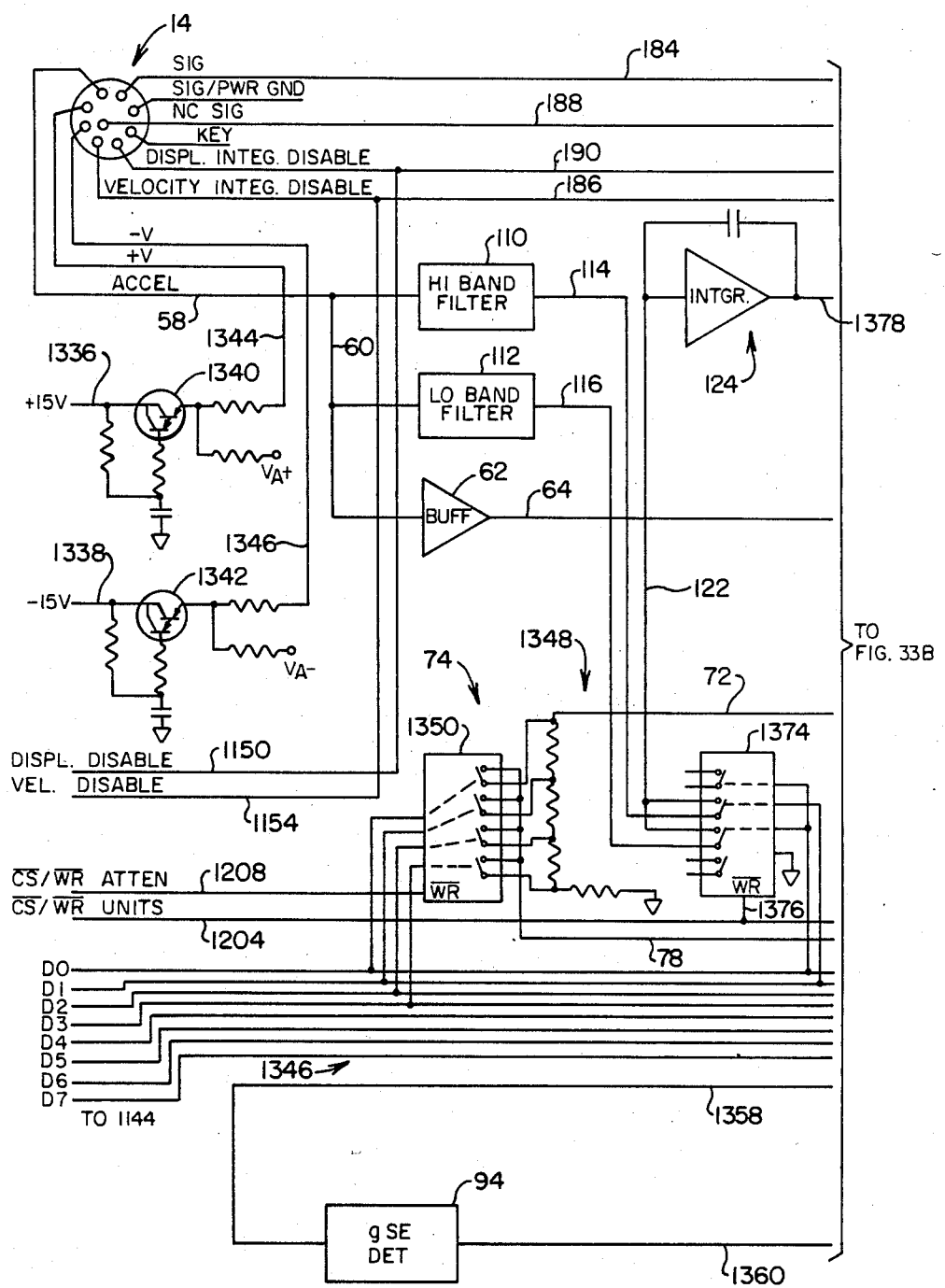
FIGS. 33A–33C are a block schematic diagram of the signal treatment circuit of the apparatus of the invention.
Figure 33B:
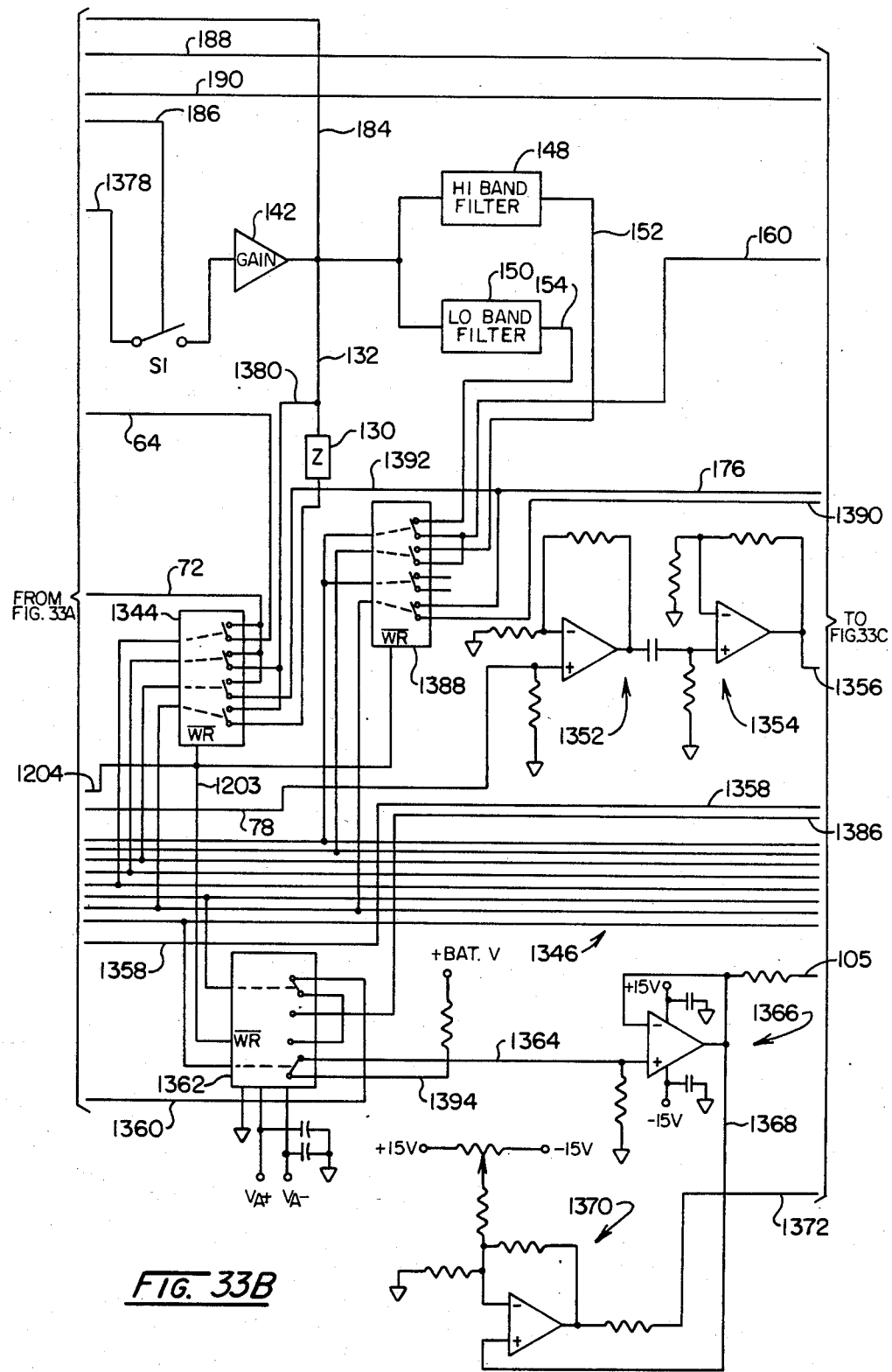
Figure 33C:
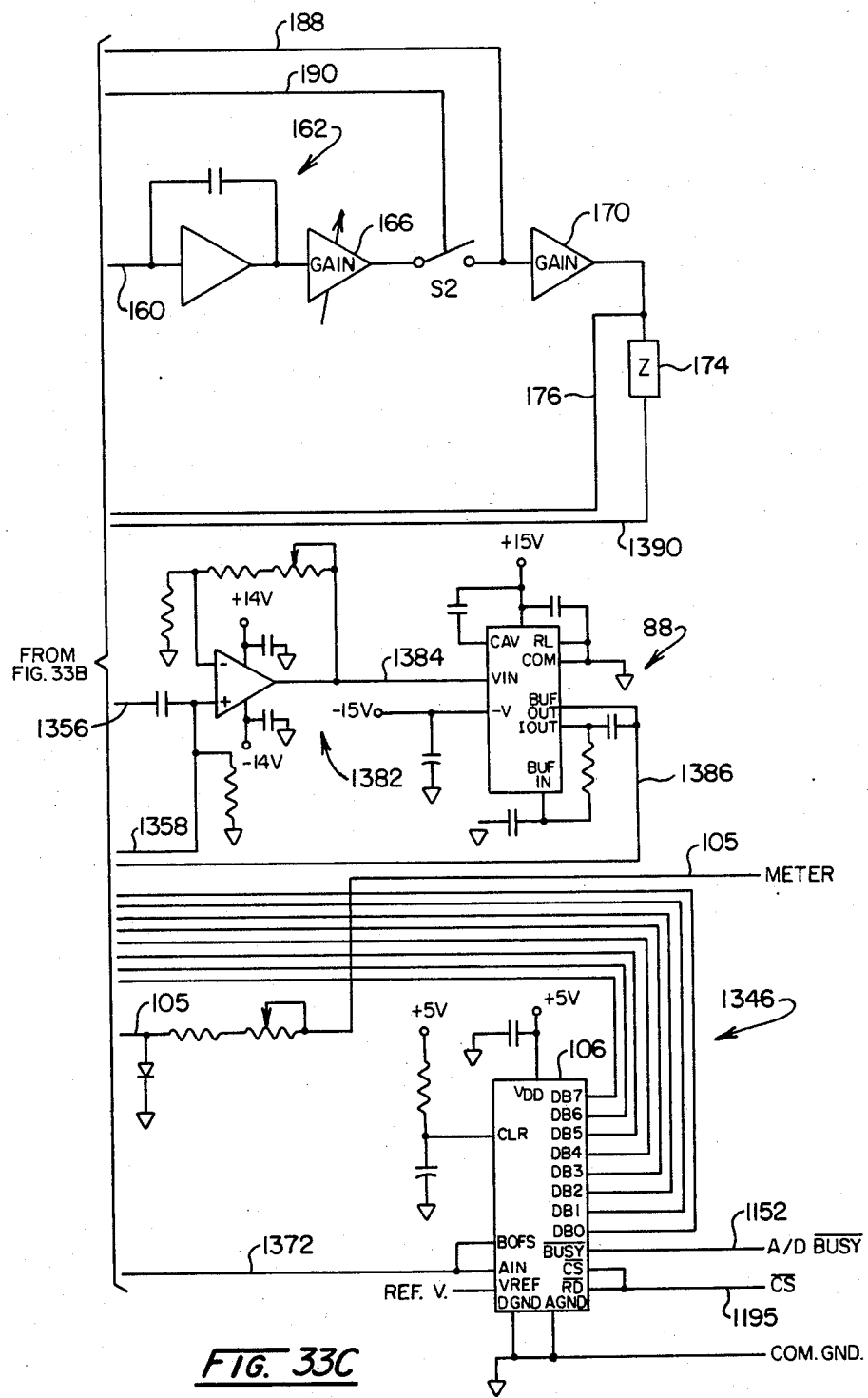

Referring to FIGS. 33A–33C, the signal conditioning function of instrument 10 is revealed in enhanced detail. These figures should be considered in conjunction with the side-by-side alignment of them shown in FIG. 34. Inasmuch as the signal conditioning features have been described in conjunction with FIG. 3A, where identical components are reproduced in these figures, the same numeration is retained. The figures, however, look in enhanced detail to the analogue switching as controlled from microprocessor 210.

Figure 35:
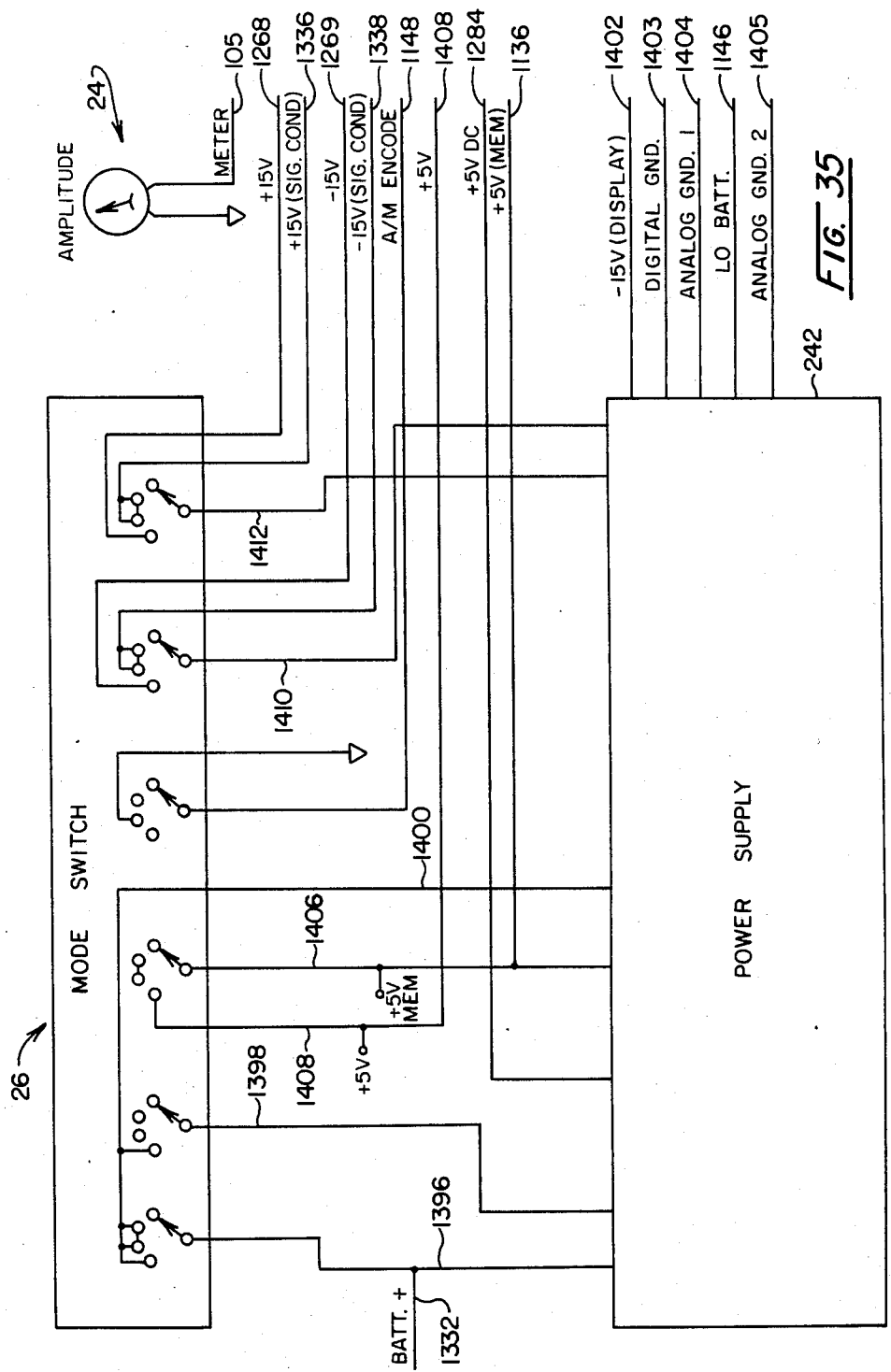
FIG. 35 is a schematic diagram of the mode switch, power supply and amplitude meter components of the apparatus.

Referring to FIG. 33A, the transducer connector is shown having labeled output line as in FIG. 3A. In this regard, line 188 carries a "non-contact" signal which serves to indicate a displacement type of transducer. Line 190 carries a displacement integration stage 162 disabling signal and line 186 carries the same form of signal for use in conjunction with integration stage 124. Power to the transducer is provided from instrument 10 and is asserted from lines 1336 and 1338 deriving from the power supply (FIG. 35). Lines 1336 and 1338 are shown, respectively, directed to the collector input of Darlington transistor networks shown, respectively, at 1340 and 1342. From these networks, the power supply is asserted to connector 14 from respective lines 1344 and 1346. The latter networks serve a protective function for the circuitry of instrument 10. Note that lines 1150 and 1154 which are coupled with status register stage 1250 in FIG. 31A extend, respectively, to a connection with lines 190 and 186.

As discussed above, for an accelerative transducer input and where acceleration units have been elected for readout, then the resultant signal at line 58 is directed to line 60, through buffer 62 and along line 64 to one switching input of an analog switch 1344. Switch 1344 serves the function of switches 66 and 178 described in conjunction with FIG. 3A. The switch may be provided as an analogue switching component incorporating a plurality of dielectrically isolated CMOS SPST analog switches. Such switches are marketed as type AD7590 by Analog Devices, Inc. Switch 1344 is enabled at its $\overline{WR}$ terminal from line 1203 and the connection thereof with line 1204. Line 1204 carries a units select signal as described in conjunction with FIG. 29C. Controlled from microprocessor 210 from bus path 1346 which, in turn, is associated with the microprocessor through the output described at 1144 in FIG. 29A, for the acceleration units output, the uppermost switch of analog switch 1344 provides an output at line 72 which, as represented in FIG. 33A, is directed through select resistors of the attenuating network 1348. The election of the amount of signal attenuation is made from microprocessor 210 in conjunction with its control of another analog switch 1350. Switch 1350 may, for example, be present as the earlier-described type AD7590 and is enabled from line 1208, the amplitude range select enabling signal carried thereby being derived as discussed in conjunction with FIG. 29C. The output of switch 1350, as described in conjunction with block 74 in FIG. 3A, is provided at line 78 and is directed through gain amplification stages 1352 and 1354. The output of stage 1354 at line 1356 is tapped at line 1358 and directed as shown in FIG. 33A to the input of an acceleration and "Spike Energy" detection network represented by block 94. The output of network 94 is represented at line 1360 as being directed to the uppermost switch component of another analog switch 1362. As before, the multiple component switch 1362 may be a type AD7592 and is enabled at its $\overline{WR}$ terminal from line 1203 while remaining under the control of microprocessor 210 from bus path 1346. From switch 1362, the acceleratively categorized signal is directed along line 1364 and through amplification stage 1366 and line 1368 to an offset and gain stage 1370. From stage 1370, the signal is directed along line 1372 to the analog-to-digital converter 106 shown in FIG. 33C. Coupled to a reference input voltage input and ground as labeled, the eight data output terminals, DB0–DB7 are coupled with bus path 1346 and the earlier described busy signal is provided by converter 106 at line 1152 for monitoring by status register 1140 (FIG. 29A). The enablement of converter 106 is provided from line 1195 and a chip select signal, the derivation of which is described in conjunction with FIG. 29B.

Returning to FIG. 33A, where velocity units are elected in conjunction with an accelerative input at line 58, then an appropriate high or low band pre-integration stage filtering is elected by analog switch 1374. Switch 1374 may be provided as the earlier-described type AD7590 and is enabled at its $\overline{WR}$ terminal from lines 1208 and 1376. Controlled from leads D0 and D1 of bus path 1346, switch 1374 then directs the electrically filtered signal along line 122 to integration stage 124. Looking to FIG. 33B, the output at stage 124 at line 1378 is directed through analog switch S1 and selectively through gain stage 142 to be directed along line 132 through either impedance 130 or without such impedance as represented at line 1380 to analog switch 1344. The velocity categorized signal then is directed, as before, along line 72 to the range selection function shown generally at 74 in FIG. 33A. From range selection function 74, the signal is directed along line 78 and through gain stages 1352 and 1354 to line 1356 and thence through gain stage 1382. The output of gain stage 1382 at line 1384 is directed to the input of a true RMS to d.c. converter 88. Converter 88 computes the true root-mean-square level of the complex a.c. input signal and provides an equivalent d.c. output level at line 1386. The converter may be provided, for example, as a type AD536A marketed by Analog Devices, Inc. Looking to FIG. 33C, line 1386 is directed to analog switch 1362 and from that switch along lines 1364 and the amplification stage 1366 and 1370 to be directed along line 1372 into analog-to-ditigal converter 106.

Where displacement units are elected for readout in conjunction with an acceleration categorized signal at line 58, then the earlier-described integration occurs at stages 124 and 162 in conjunction with the closure of switches S1 and S2. Accordingly, the signal following initial integration is directed to second stage integration filters as represented at blocks 148 and 150. The appropriate high or low band is elected in conjunction with lines 152 and 154 by analog switch 1388 as shown in FIG. 33B. Switch 1388 may be the earlier-described type AD7509 and is enabled at its $\overline{WR}$ terminal from line 1204 while being controlled from bus path 1346. From switch 1388, the filtered signal is directed along line 160 to integration stage 162 as shown in FIG. 33C, thence through gain stage 166, switch S2 and gain stage 170 to be presented to lines 176 and 174 for providing an English/metric election. In this regard, a line 1390 is coupled with impedance 174 which in combination with line 176 is directed to switch 1388 for English/metric election. From switch 1388, the signal is directed along line 1392 to analog switch 1344, whereupon it is directed as below described in conjunction with the velocity categorized signal through the amplitude range function 74 and subsequent signal treatment functions to analog-to-digital converter 106.

Returning to FIG. 33A, where a velocity transducer is provided and a velocity units is elected, then the resultant signal at line 184 is directed through the English/metric selection procedure described in conjunction with line 132, 1380 and analog switch 1344. The resultant signal as presented at line 72 then is processed as described in conjunction with the earlier-discussd velocity units election by amplitude range select stage 74, gain stages 1366 and 1370 and is converted to digital form at analog-to-digital converted 106.

Where, as indicated in FIG. 33A, a displacement type transducer is provided, then the displacement categorized signal is directed along line 188 to gain stage 170 whereupon an English/metric election is made in conjunction with lines 176 and impedance 174 as connected with amplitude switch 1388. From switch 1338, the resultant signal is directed along line 1392 through switch 1344 and thence, to amplitude range selection function 74. The signal then is treated as described in conjunction with the displacement signal derived from a velocity or accelerometer type transducer 18.

FIG. 33B also shows that analog switch 1362 receives a plus battery voltage signal from line 1394. This input is for the purpose of low battery level testing and the signal representing the battery condition is directed by switch 1362 along line 1364, through amplification stage 1366 and line 105 for the purpose of driving amplitude meter 24. Alternately, the amplitude of any signal derived from the transducer connected at connector 14 as treated by the circuitry is similarly displayed at meter 105.

Referring to FIG. 35, the arrangement of mode switch 26 is represented along with a block representation of power supply 242. Mode switch 26 is of a multideck variety as shown in conjunction with the block identified at 26. The contacts which are simultaneously made represent, looking from left to right, transfer, manual, automatic, and off. Line 1332 is shown extending to line 1396 which is directed to the positive terminal of the rechargeable battery within power supply 242 for recharging purposes. The switch deck associated with line 1398 serves to provide a +5 v. power supply at line 1284 which is directed to the data transmission circuit described in conjunction with FIG. 31B. Line 1400 which is associated with the switch banks above discussed provides power input from the battery supply through regulators to develop the outputs as labeled at lines 1402–1405 and 1146. In this regard, line 1146 provides an output condition which is monitored by status register 1140 (FIG. 29A), while line 1403 develops a ground utilized in conjunction with digital categorized components and lines 1404 and 1405 develop a corresponding ground for use in conjunction with analog signal treatment components. Line 1402 provides a power input to the display 22 described in conjunction with FIG. 29C.

Line 1406 is associated with the switch bank deriving a +5 v. (MEM) power supply at line 1136 which is continuously on for maintaining the memory function of instrument 10. The same switch bank, operating in conjunction with line 1408, provides a +5 v. source for use in conjunction with the logic components in all active modes of operation, ie. transfer, manual and automatic. Line 1148 leads to a switch bank which provides an output condition identifying the manual mode which is monitored by status register 1140 (FIG. 29A). Line 1410 is associated with a switch bank which serves to selectively develop the ±15 v. signal outputs which are utilized selectively to avoid battery drain. Note, that this higher voltage power is provided at earlier-described lines 1269 and 1338. Line 1412 provides for the positive values of higher power supply voltage, line 1268 looking to the drive imparted to the data transfer function described in connection with FIG. 31B and line 1268 providing power input for the signal conditioning components described in connection with FIGS. 33A–33C. FIG. 35 also shows the amplitude meter 24 and the line 105 input thereto as described in conjunction with FIG. 33c.

Since certain changes may be made in the above system and apparatus without departing from the scope of the invention herein involved, it is intended that all matter contained in the above description or shown in the accompanying drawings shall be interpreted as illustrative and not in a limiting sense.

We claim:

1. In a system for carrying out maintenance data collection at identifiable machines and test locations thereon wherein a select type vibration transducer is operationally contacted with a predetermined sequence of said machines and said locations for generating vibration signals in connection with a maintenance data program and a data processing and collection scheduling facility is provided for treating machine data, the improved hand held data collection apparatus comprising:
  a housing;
  input connector means for operationally coupling said housing with a said vibration transducer and receiving vibration signals therefrom;
  signal treatment means within said housing for receiving said vibration signals and selectively treating them when actuated to derive predetermined units categorized amplitude signals;
  converter means within said housing, responsive to said amplitude signals for generating digital signals corresponding therewith;
  visually perceptible readout means mounted upon said housing for displaying readout characters corresponding with character signals submitted thereto;
  keyed means mounted upon said housing and manually actuable for deriving select function and numeric signals;
  data transfer connector means mounted upon said housing for selectively receiving and transferring data signals;
  mode selection means actuable to derive data input and data transfer mode conditions;
  memory means for selectively retaining data submitted thereto;
  control circuit means within said housing,
  responsive in the presence of said data transfer mode condition when said data transfer connector means is operationally coupled in data transfer relationship with said scheduling facility for selectively effecting the receipt therethrough of schedule data representing a said predetermined sequence of identified said machines, each said test location thereon, the direction of mounting of said vibration transducer for each said test location, the vibration parameter unit for each said test location, and alarm threshold data for said test locations, for effecting the submittal of said schedule data to said memory means for retention,
  responsive in said data input mode condition to said keyed means actuation deriving an advance said function signal for accessing predetermined said memory means retained schedule data and submitting said schedule data as character signals to said readout means,
  responsive to said schedule data representing a said vibration parameter unit derived by said advance function signal to actuate said signal treatment means in correspondence therewith,
  responsive in said data input mode condition to said converter means digital signals for deriving character signals corresponding therewith and effecting the submittal thereof to said readout means, and
  responsive further in said data input mode condition to said keyed means actuation deriving a store said function signal for effecting the retention by said memory means of data corresponding with said character signals effecting said readout display.

2. The hand held data collection apparatus of claim 1 in which said control circuit means is responsive in the presence of said data transfer mode condition when said data transfer connector means is operationally coupled in data transfer relationship with said scheduling facility for selectively effecting the transmittal therethrough of said data corresponding with said digital data character signals in conjunction with said submitted schedule data.

3. The hand held data collection apparatus of claim 2 including;
calendar circuit means within said housing for providing a calendar output signal corresponding with real calendar and time information; and
said control circuit means is responsive to said calendar output signals for effecting the transmittal thereof though said data transfer connector means to said scheduling facility in the said presence of said data transfer mode condition and when said data corresponding with said digital data character signals are transmitted through said connector means.

4. The data hand held collection apparatus of claim 1 in which:
said control circuit means is responsive in the presence of said data input mode condition to effect a comparison of the value of each said digital signal with corresponding said alarm threshold data for selectively deriving an alarm indication character signal and effecting the submittal thereof to said readout means.

5. The hand held data collection apparatus of claim 1 in which:
said control circuit means is responsive in the presence of said data input mode condition:
to the coupling of said select type transducer therewith for actuating said select signal treatment means to derive said predetermined units categorized amplitude signals in correspondence with said memory means retained predetermined units data; and
for deriving an error indication character signal and the submittal thereof to said readout means in the presence of said data input mode condition when said signal treatment means is incapable of deriving said amplitude signals in correspondence with said vibration parameter unit derived by said advance function signal.

6. The hand held data collection apparatus of claim 1 in which:
said control circuit means is responsive in the presence of said data input mode condition to said keyed means actuation deriving a recall said function signal for accessing said memory means retained data representing said digital data character signals and submitted schedule data corresponding with a next previous said location with respect to that location identified at said readout means.

7. In a system for carrying out maintenance data collection at identifiable machines and test locations thereon wherein a select type vibration transducer is operationally contacted with a predetermined sequence of said locations for generating vibration signals in connection with a maintenance data program and wherein a data processing and collection scheduling facility is provided for treating collected maintenance data, the improved hand held data collection apparatus comprising;

a housing;
input connector means for operationally coupling said housing with a said vibration transducer and receiving vibration signals therefrom;
signal treatment means within said housing for receiving said vibration signals and including velocity integration stage means, displacement integration stage means and switch means actuable to selectively enable said integration stage means to effect treatment of said vibration signals to derive predetermined units categorized d.c. amplitude signals;
converter means within said housing, responsive to said amplitude signals for generating digital signals corresponding therewith;
visually perceptible readout means mounted upon said housing for displaying readout characters corresponding with character signals submitted thereto;
keyed means mounted upon said housing and manually actuable for deriving select function and numeric signals;
data transfer connector means mounted upon said housing for selectively receiving and transferring data signals;
mode switch means mounted upon said housing and selectively actuable to derive data input, program and data transfer operational mode conditions;
memory means for selectively retaining machine and schedule data submitted thereto;
control circuit means within said housing,
responsive in the presence of said program mode condition to said keyed means actuation deriving said function and numeric signals as machine data representing a said machine, the identification of a said test location upon said machine, the identification of the direction of mounting of said transducer for said test location, the identification of a machine inspection code and the identification of a selected vibration parameter unit for said test location for deriving character signals corresponding with said function and numeric signals and effecting the submittal thereof to said readout means, responsive to said converter means digital signals in the presence of said program operational mode condition for deriving digital data character signals corresponding therewith and effecting the submittal thereof to said readout means, responsive in the presence of said program operational mode condition to said keyed means actuation deriving a store said function signal for effecting the retention by said memory means of location associated character signals and data character signals displayed at said readout means,
responsive in the presence of said data transfer operational mode condition when said data transfer connector means is operationally coupled in data transfer relationship with said scheduling facility for selectively effecting the receipt therethrough of schedule data representing a said predetermined sequence of identified said machines, each said test location thereon, the direction of mounting of said vibration transducer for each said test location, the vibration parameter unit for each said test location and alarm threshold data corresponding with each said test location for effecting the submittal of said schedule data to said memory means for retention, and said control circuit means being responsive in the presence said data input mode condition to said keyed means actuation deriving an advance said function signal for accessing predetermined said memory retained machine data including schedule data and submitting said accessed data as character signals to said readout means, said control circuit means being responsive in said data input mode condition to memory retained said vibration parameter unit for each test location for actuating said signal treatment means switch means in correspondence therewith to effect the said derivation of said units categorized d.c. amplitude signals said control circuit means being responsive in said data input mode condition to said converter means digital signals for deriving digital data character signals corresponding therewith and effecting submittal thereof to said readout means, and said control circuit means being further responsive in said data input mode condition to said keyed means actuation deriving a store said function signal for effecting the retention by said memory means of data corresponding with said digital data character signals in conjunction with said submitted data.

8. The hand held data collection apparatus of claim 7 in which said control circuit means is responsive in the presence of said data transfer operational mode condition when said data transfer connector means is operationally coupled in data transfer relationship with said scheduling facility for selectively effecting the transmittal thereto of said data corresponding with said digital data character signals in conjunction with said submitted schedule data.

9. The data collection apparatus of claim 8 including;

calendar circuit means within said housing for providing a calendar output signal corresponding with real calendar and time information; and said control circuit means is responsive to said calendar output signals for effecting the transmittal thereof though said data transfer connector means to said scheduling facility in the said presence of said data transfer mode condition and when said data corresponding with said digital data character signals are transmitted through said connector means.

10. The hand held data collection apparatus of claim 7 in which:

said control circuit means is responsive in the presence of said data input mode condition to effect a comparison of the value of each said digital signal with corresponding said memory means retained alarm threshold data for selectively deriving an alarm indication character signal and effecting the submittal thereof to said readout means.

11. The hand held data collection apparatus of claim 7 in which said control circuit means effects the derivation of an error indication character signal and the submittal thereof to said readout means where said signal treatment means is incapable of deriving said amplitude signals in correspondence with said memory means retained predetermined units data.

12. The hand held data collection apparatus of claim 11 in which:

said control circuit means is responsive in the presence of said data input mode condition to effect a comparison of the value of each said digital signal with corresponding said memory means retained alarm threshold data for selectively deriving an alarm indication character signal and effecting the submittal thereof to said readout means.

* * * * *